US010232517B2

(12) United States Patent
Akaha et al.

(10) Patent No.: US 10,232,517 B2
(45) Date of Patent: Mar. 19, 2019

(54) ROBOT AND ROBOT SYSTEM

(71) Applicant: Seiko Epson Corporation, Tokyo (JP)

(72) Inventors: Kazushige Akaha, Azumino (JP);
Kazuto Yoshimura, Matsumoto (JP);
Hiroaki Fujimori, Suwa (JP); Akio
Niu, Matsumoto (JP)

(73) Assignee: Seiko Epson Corporation (JP)

( * ) Notice: Subject to any disclaimer, the term of this patent is extended or adjusted under 35 U.S.C. 154(b) by 14 days.

(21) Appl. No.: 15/335,889

(22) Filed: Oct. 27, 2016

(65) Prior Publication Data
US 2017/0120458 A1 May 4, 2017

(30) Foreign Application Priority Data

Oct. 30, 2015 (JP) ................................ 2015-213927
Nov. 2, 2015 (JP) ................................ 2015-215952

(51) Int. Cl.
B25J 18/04 (2006.01)
B25J 9/00 (2006.01)
B25J 17/00 (2006.01)
B25J 18/00 (2006.01)
B25J 9/04 (2006.01)
B25J 13/08 (2006.01)
B25J 19/02 (2006.01)

(52) U.S. Cl.
CPC .............. *B25J 18/04* (2013.01); *B25J 9/0009* (2013.01); *B25J 9/0018* (2013.01); *B25J 9/046* (2013.01); *B25J 13/085* (2013.01); *B25J 17/00* (2013.01); *B25J 18/005* (2013.01); *B25J 19/023* (2013.01)

(58) Field of Classification Search
CPC .......... B25J 9/0009; B25J 17/00; B25J 18/04
USPC ........................................................ 414/735
See application file for complete search history.

(56) References Cited

U.S. PATENT DOCUMENTS

| 9,037,293 B2 | 5/2015 | Gomi et al. |
| 9,285,416 B2 | 3/2016 | Lee et al. |
| 2003/0221504 A1 | 12/2003 | Stoianovici et al. |
| 2004/0191032 A1* | 9/2004 | Foulke ................. B65G 1/04 414/280 |
| 2014/0277713 A1* | 9/2014 | Kouno ................. B25J 9/0084 700/248 |
| 2014/0277729 A1* | 9/2014 | Nakamura ............ G01L 5/0076 700/258 |

FOREIGN PATENT DOCUMENTS

| JP | 2013-156084 A | 8/2013 |
| JP | 2013-219354 A | 10/2013 |
| JP | 2014-046401 A | 3/2014 |

* cited by examiner

Primary Examiner — Saul Rodriguez
Assistant Examiner — Ronald P Jarrett
(74) Attorney, Agent, or Firm — Harness, Dickey & Pierce, P.L.C.

(57) ABSTRACT

A robot includes a robot arm having a first member rotatably provided on a base, a second member rotatably provided on the first member, a third member rotatably provided on the second member, and a fourth member rotatably provided on the third member. The fourth member has an arm rotatable about a rotation axis in an axis direction different from an axis direction of a rotation axis of the first member with respect to the base. In a first state, the first member, the second member, and the third member overlap. In a second state, at least one of a distal end of the robot arm and an end effector provided on the distal end of the robot arm overlaps with the second member.

12 Claims, 38 Drawing Sheets

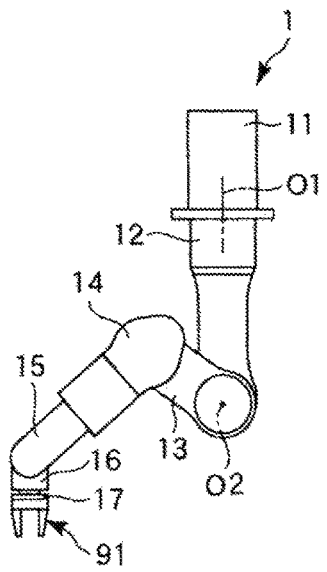 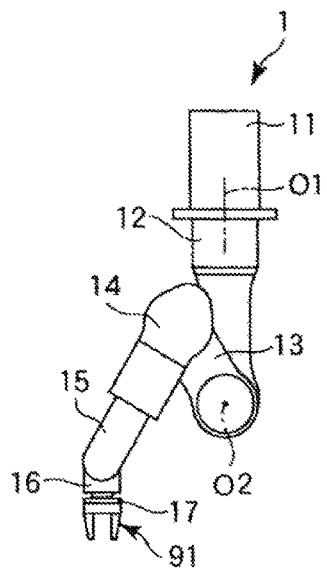 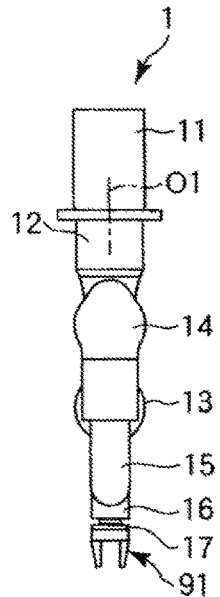
FIG.13A  FIG.13B  FIG.13C
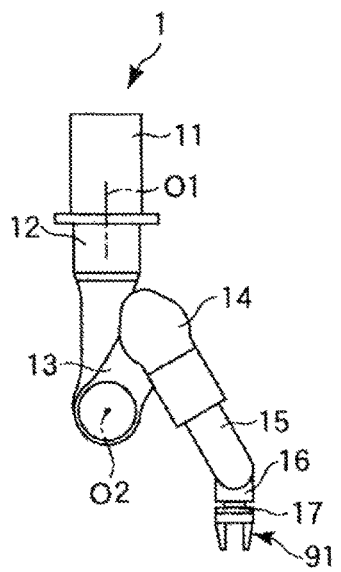 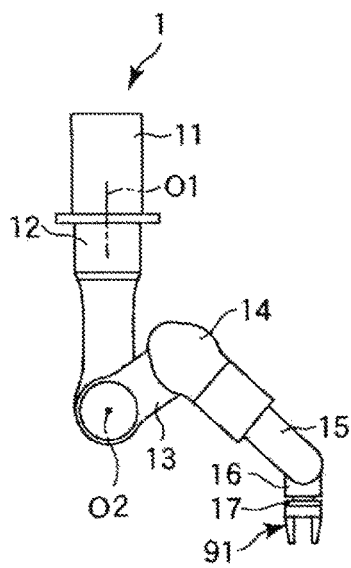
FIG.13D  FIG.13E

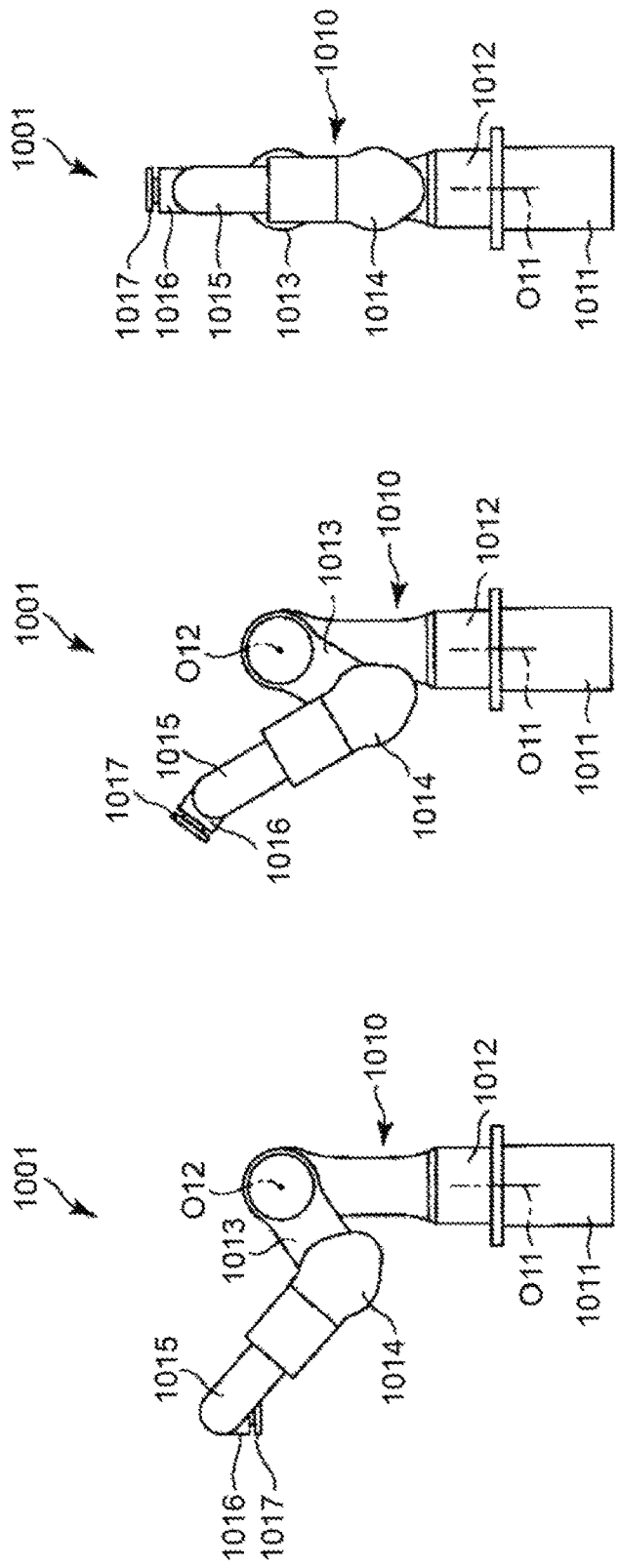

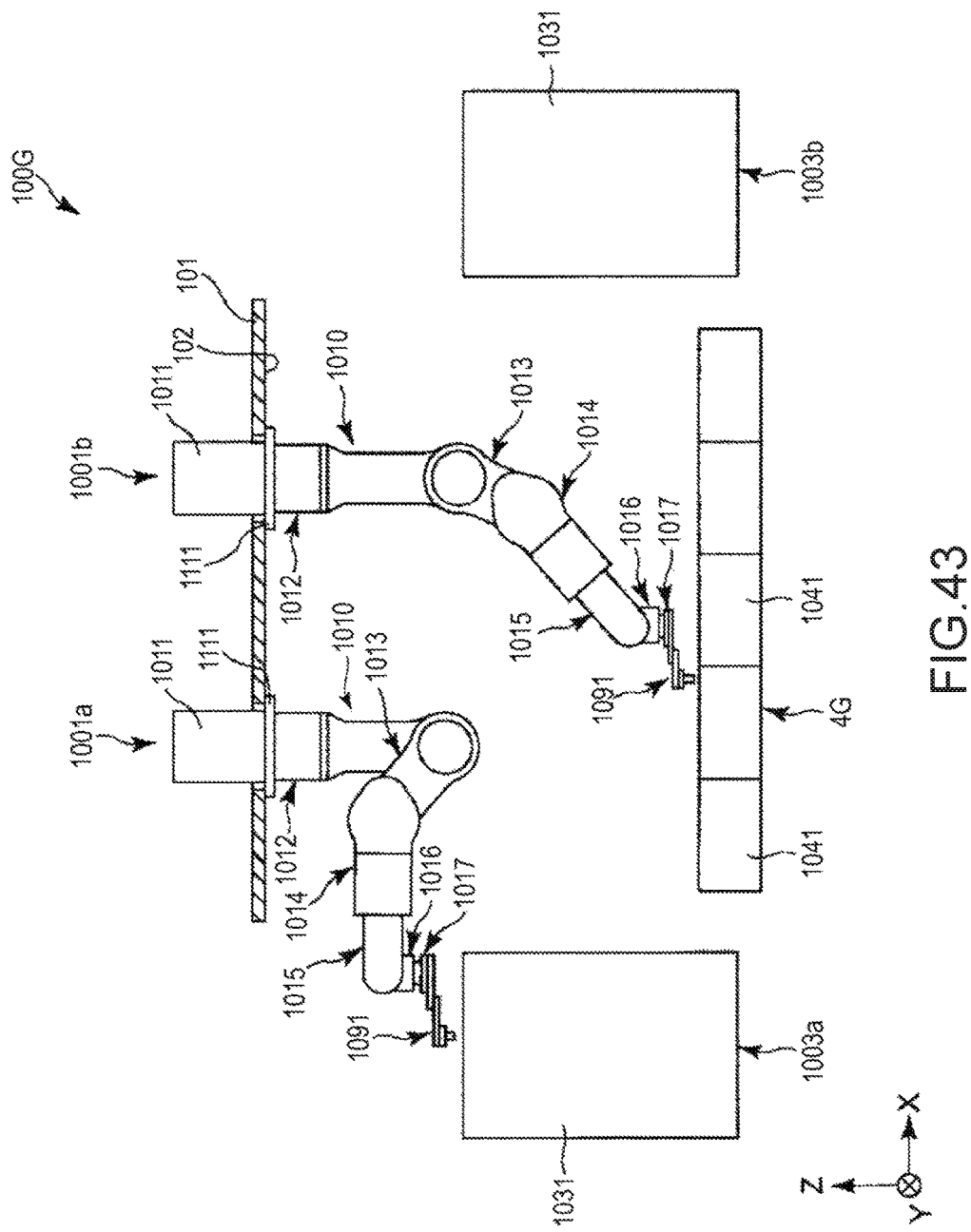

ROBOT AND ROBOT SYSTEM

BACKGROUND

1. Technical Field

The present invention relates to a robot and a robot system.

2. Related Art

In related art, robots with robot arms are known. In the robot arm, a plurality of arms (arm members) are coupled via joint parts and, as an end effector, e.g. a hand is attached to the arm on the most distal end side (on the most downstream side). The joint parts are driven by motors and the arms rotate by the driving of the joint parts. Then, for example, the robot grasps an object with the hand, moves the object to a predetermined location, and performs a predetermined work such as assembly.

As the robot, Patent Document 1 (JP-A-2014-46401) discloses a vertical articulated robot. The robot described in Patent Document 1 is adapted, when moving a hand with respect to a base to a position different by 180° about a first rotation axis as a rotation axis (rotation axis extending in vertical directions) on the most proximal end side (on the most upstream side), to rotate a first arm as an arm on the most proximal end side (base side) with respect to the base about the first rotation axis.

In the robot described in Patent Document 1, when the hand is moved to the position different by 180° about the first rotation axis with respect to the base, a large space for preventing interferences of the robot is required.

SUMMARY

An advantage of some aspects of the invention is to solve at least a part of the problems described above, and the invention can be implemented as the following forms or application examples.

Application Example 1

A robot according to this application example includes a robot arm having a first member including at least one arm and rotatably provided on a base, a second member including at least one arm different from that of the first member and rotatably provided on the first member, a third member including at least one arm different from those of the first member and the second member and rotatably provided on the second member, and a fourth member including at least one arm different from those of the first member, the second member, and the third member and rotatably provided on the third member, wherein the fourth member has an arm rotatable about a rotation axis in an axis direction different from an axis direction of a rotation axis of the first member with respect to the base, as seen from an axis direction of a rotation axis of the second member with respect to the first member, a first state in which the first member, the second member, and the third member overlap can be assumed, and, in the first state, as seen from the axis direction of the rotation axis of the first member with respect to the base, a second state in which at least one of a distal end of the robot arm and an end effector provided on the distal end of the robot arm overlaps with the second member can be assumed.

According to the robot, the first state can be assumed, and the space for preventing interferences of the robot may be made smaller. Further, in the robot of the application example, the second state can be assumed, and, in a region of the second member opposite to the base formed in the first state (hereinafter, also referred to as "distal end region"), the wider range in which the distal end of the robot arm and the end effector can move may be taken.

Application Example 2

In the robot of the application example, it is preferable that the fourth member has a proximal end side arm rotatably provided on the third member and a distal end side arm rotatably provided on the proximal end side arm, in the second state, the rotation axis of the first member and a rotation axis of the distal end side arm with respect to the proximal end side arm can be orthogonal, and, in a state in which the rotation axis of the first member and the rotation axis of the distal end side arm are orthogonal, letting a distance between at least one of the distal end of the robot arm and the end effector and the second member be Y, a relationship of 3 $[mm] \leq Y$ is satisfied.

With this configuration, the rotation axis of the first member and the rotation axis of the distal end side arm can be orthogonal, and the range in which the distal end of the robot arm and the end effector can move in the distal end region may be made wider. Further, the distance Y satisfies the relationship, and thereby, the wider range in which at least one of the distal end of the robot arm and the end effector can move without interferences with the first member and the second member may be secured.

Application Example 3

In the robot of the application example, it is preferable that a relationship of 5 $[mm] \leq Y$ is satisfied.

The relationship is satisfied, and thereby, even when the end effector or a work grasped by the end effector has a relatively large configuration, the wider range in which at least one of the distal end of the robot arm and the end effector can move without interferences with the first member and the second member may be secured.

Application Example 4

In the robot of the application example, it is preferable that, letting a length of the third member in the axis direction of the rotation axis of the first member be R3, a relationship of $Y \leq (R3/2)$ is satisfied.

With this configuration, the wider movement range of at least one of the distal end of the robot arm and the end effector in the distal end region may be secured while upsizing of the robot arm is prevented.

Application Example 5

In the robot of the application example, it is preferable that a length of the first member in the axis direction of the rotation axis of the first member is longer than a length of the second member in the axis direction of the rotation axis of the first member.

With this configuration, the first state may be assumed while interferences with the robot itself (e.g. the first member and the base supporting the first member) and peripherals are avoided.

Application Example 6

In the robot of the application example, it is preferable that a length of the third member in the axis direction of the rotation axis of the first member is longer than a length of the second member in the axis direction of the rotation axis of the first member.

With this configuration, in the first state, the distal end of the robot arm may be protruded toward the distal end region side than the second member. Accordingly, the wider range in which at least one of the distal end of the robot arm and the end effector can move without interferences with the first member and the second member may be secured.

Application Example 7

In the robot of the application example, it is preferable that the length of the third member is twice or more of the length of the second member.

With this configuration, in the first state, the distal end of the robot arm may be sufficiently protruded toward the distal end region side than the second member. Accordingly, even when the end effector or the work has a relatively large configuration, the wider range in which at least one of the distal end of the robot arm and the end effector can move without interferences with the first member and the second member may be secured.

Application Example 8

In the robot of the application example, it is preferable that the first member has a first portion extending in a direction different from that of the rotation axis of the first member, a second portion extending in a direction along the rotation axis of the first member, and a third portion extending in a direction different from those of the first portion and the second portion.

The third portion is provided, and thereby, even when various apparatuses are placed around the third portion, interferences of the first member with the various apparatuses may be avoided.

Application Example 9

In the robot of the application example, it is preferable that the first member is a first arm rotatable about a first rotation axis, the second member is a second arm rotatable about a second rotation axis in a different axis direction from that of the first rotation axis, the third member has a third arm rotatable about a third rotation axis in parallel to the axis direction of the second rotation axis and a fourth arm provided on the third arm rotatably about a fourth rotation axis in an axis direction different from an axis direction of the third rotation axis, and the fourth member has a fifth arm rotatable about a fifth rotation axis in an axis direction different from that of the fourth rotation axis and a sixth arm rotatable about a sixth rotation axis in an axis direction different from that of the fifth rotation axis.

With this configuration, the drive range of the distal end of the robot arm may be wider and the higher workability may be exerted.

Application Example 10

In the robot of the application example, it is preferable that the robot arm has an attachment part to which a plate member can be attached.

With this configuration, the plate member may be easily attached to the robot arm. Further, when the plate member is a reference plate used for setting of origins of the respective rotation axes (origins of respective encoders), the setting may be performed with higher accuracy.

Application Example 11

A robot according to this application example includes a robot arm having an n-th (n is an integer equal to or more than one) arm rotatable about an n-th rotation axis, and an (n+1)th arm provided on the n-th arm to be rotatable about an (n+1)th rotation axis in an axis direction different from an axis direction of the n-th rotation axis, wherein the n-th arm and the (n+1)th arm can overlap as seen from the axis direction of the (n+1)th rotation axis, and objects can be mounted on respective of a plurality of mounting units of a mounting apparatus having the plurality of mounting units arranged in a vertical direction.

According to the robot, the n-th arm and the (n+1)th arm can overlap as seen from the axis direction of the (n+1)th rotation axis, and thereby, the space for preventing interferences of the robot may be made smaller. Further, the n-th arm and the (n+1)th arm can overlap as seen from the axis direction of the (n+1)th rotation axis, and thereby, even when the distance of the robot with respect to the mounting apparatus is relatively small, the robot may perform a work of mounting objects on relatively many mounting units arranged in the vertical direction or the like while avoiding interferences with the mounting apparatus.

Application Example 12

In the robot according to the application example 11, it is preferable that a length of the n-th arm is longer than a length of the (n+1)th arm.

With this configuration, the (n+1)th arm can overlap with the n-th arm as seen from the axis direction of the (n+1)th rotation axis while avoiding interferences with the n-th arm.

Application Example 13

In the robot according to the application example 11 or 12, it is preferable that works can be performed in a work unit of a work apparatus provided in a position different from that of the mounting apparatus.

As described above, the n-th arm and the (n+1)th arm can overlap, and thereby, even in the case where the distance of the robot with respect to the work apparatus is relatively small, when the end effector is provided on the distal end of the robot arm, the robot may perform various works on the objects in the work unit while avoiding interferences with the work apparatus. Further, even in the case where the distances of the robot with respect to both the mounting apparatus and the work apparatus are relatively small, the robot may move the distal end of the robot arm to between the mounting apparatus and the work apparatus while avoiding interferences with the mounting apparatus and the work apparatus and peripheral members.

Application Example 14

In the robot according to one of the application examples 11 to 13, it is preferable that the distal end of the robot arm is movable in respective directions of the horizontal direction and the vertical direction.

With this configuration, for example, the robot may perform the work of mounting objects on the plurality of mounting units arranged in the horizontal direction and the vertical direction or the like.

Application Example 15

In the robot according to one of the application examples 11 to 14, it is preferable that a base is provided and the n-th arm (n is one) is provided on the base rotatably about the n-th rotation axis.

With this configuration, the n-th arm and the (n+1)th arm may be rotated with respect to the base.

Application Example 16

In the robot according to the application example 15, it is preferable that the base is supported by a movement mechanism that can move the base.

With this configuration, the robot may perform the work of mounting objects on the mounting units or the like in a wider range.

Application Example 17

In the robot according to one of the application examples 11 to 16, it is preferable that an imaging unit having an imaging function is provided in the robot arm.

With this configuration, for example, objects, the mounting units, etc. may be imaged, and thus, the robot may properly perform the work of mounting objects on the mounting units or the like based on the imaged data.

Application Example 18

In the robot according to one of the application examples 11 to 17, it is preferable that a force detector is provided in the robot arm.

With this configuration, for example, when the end effector is provided on the distal end of the robot arm, the robot may recognize a contact condition of the end effector with the object, and thus, the robot may grasp the object by the end effector with a proper grasping force.

Application Example 19

A robot system according to this application example includes the robot according to one of the application examples 11 to 18, and mounting apparatuses provided side by side in the horizontal direction with respect to the robot and having a plurality of mounting units arranged in the vertical direction.

According to the robot system, the n-th arm and the (n+1)th arm can overlap as seen from the axis direction of the (n+1)th rotation axis, and thereby, the space for preventing interferences of the robot may be made smaller. Accordingly, the compact robot system having the larger number of mounting units on which the robot can mount objects may be realized.

Application Example 20

In the robot system according to the application example 19, it is preferable that the mounting apparatus includes an inspection unit that inspects the object.

With this configuration, the object mounted on the mounting unit may be inspected by the inspection unit.

Application Example 21

In the robot system according to the application example 19 or 20, it is preferable that the mounting apparatus has a plurality of mounting rows having the plurality of mounting units arranged in the vertical direction, the plurality of mounting rows are provided side by side in a direction different from the arrangement direction of the robot and the mounting apparatus in the horizontal direction, and the number of mounting units of the mounting row provided in a position farthest from the n-th rotation axis of the plurality of mounting rows is smaller than the number of mounting units of the mounting row provided in a position closest to the n-th rotation axis.

With this configuration, the plurality of mounting units may be efficiently placed in a movable range of the distal end of the robot arm.

Application Example 22

In the robot system according to one of the application examples 19 to 21, it is preferable that the mounting rows are arranged in arc forms.

With this configuration, the plurality of mounting units may be efficiently placed in the movable range of the distal end of the robot arm.

Application Example 23

In the robot system according to one of the application examples 19 to 22, it is preferable that a plurality of the robots are provided.

With this configuration, the work of mounting objects on the mounting units or the like may be performed by the plurality of robots, and thereby, the robot system with the larger number of works per unit time may be provided.

Application Example 24

In the robot system according to one of the application examples 19 to 23, it is preferable that a supply apparatus to which the object is supplied is provided.

With this configuration, for example, the robot may select and feed the object from the supply apparatus and carries the object to the mounting apparatus.

Application Example 25

In the robot system according to one of the application examples 19 to 23, it is preferable that the mounting apparatus is a supply apparatus that supplies the object.

With this configuration, for example, the robot may carry the object to the supply apparatus and perform assembly of components etc. in the supply apparatus.

Application Example 26

In the robot system according to one of the application examples 19 to 25, it is preferable that an installation area is equal to or less than 4 m$^2$.

With this configuration, even in the relatively small installation area, the robot system may sufficiently secure the number of mounting units on which the robot may mount objects.

Application Example 27

In the robot system according to one of the application examples 19 to 26, it is preferable that the installation area is equal to or more than 0.5 m$^2$.

With this configuration, the mounting apparatus having relatively many mounting units may be provided while interferences of the robot with the mounting apparatus are avoided.

BRIEF DESCRIPTION OF THE DRAWINGS

The invention will be described with reference to the accompanying drawings, wherein like numbers reference like elements.

FIGS. 13A to 13E are diagrams for explanation of actions of the robot shown in FIG. 1.

FIGS. 26A to 26E are diagrams for explanation of actions of the robot shown in FIG. 21.

FIG. 43 is a schematic view showing a robot system according to a tenth embodiment of the invention.

DESCRIPTION OF EXEMPLARY EMBODIMENTS

As below, a robot and a robot system according to the invention will be explained in detail based on preferred embodiments shown in the accompanying drawings.

First Embodiment

Robot

Figure 1:
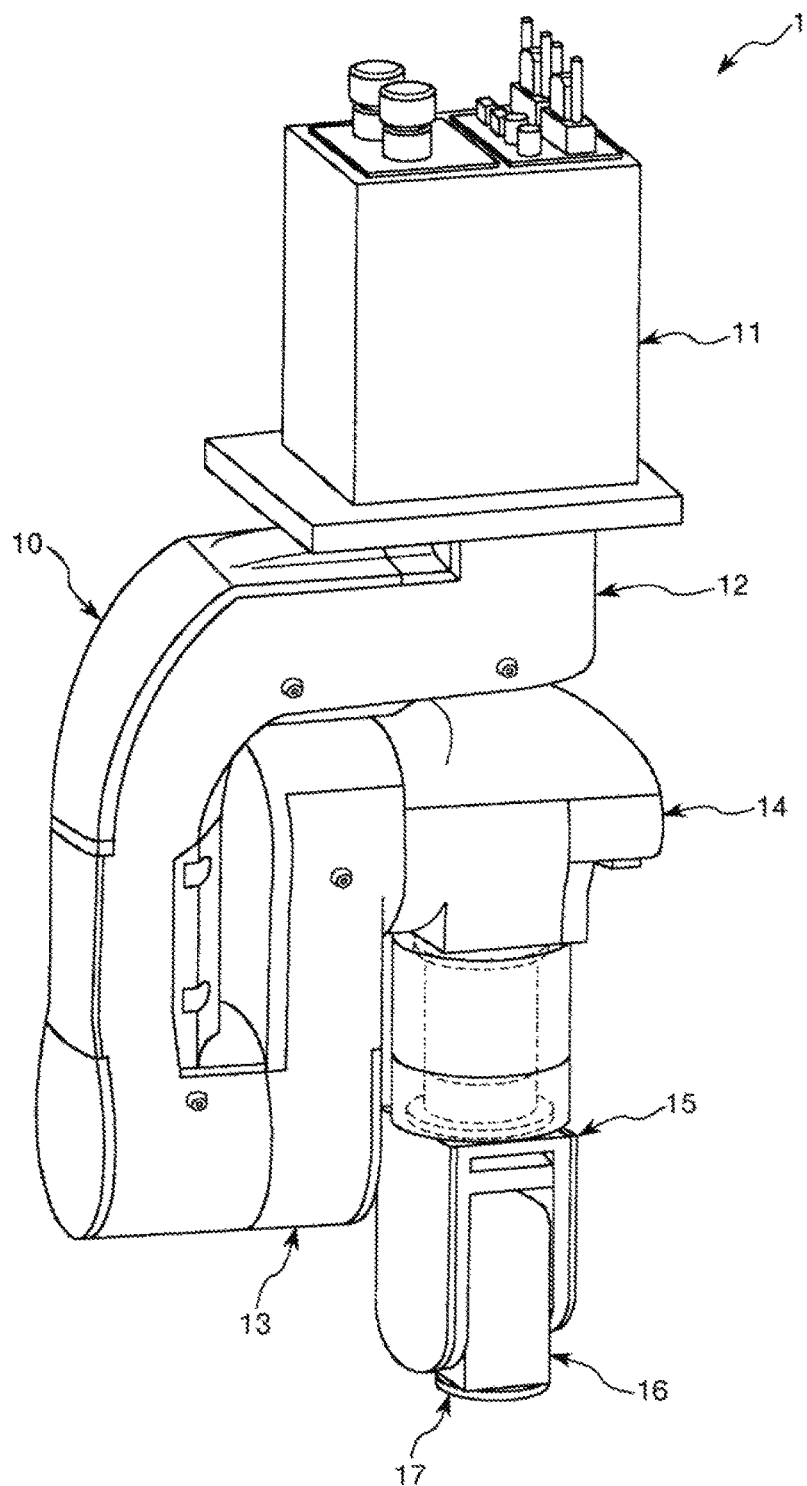
FIG. 1 is a perspective view showing a robot according to a first embodiment of the invention.
Figure 2:
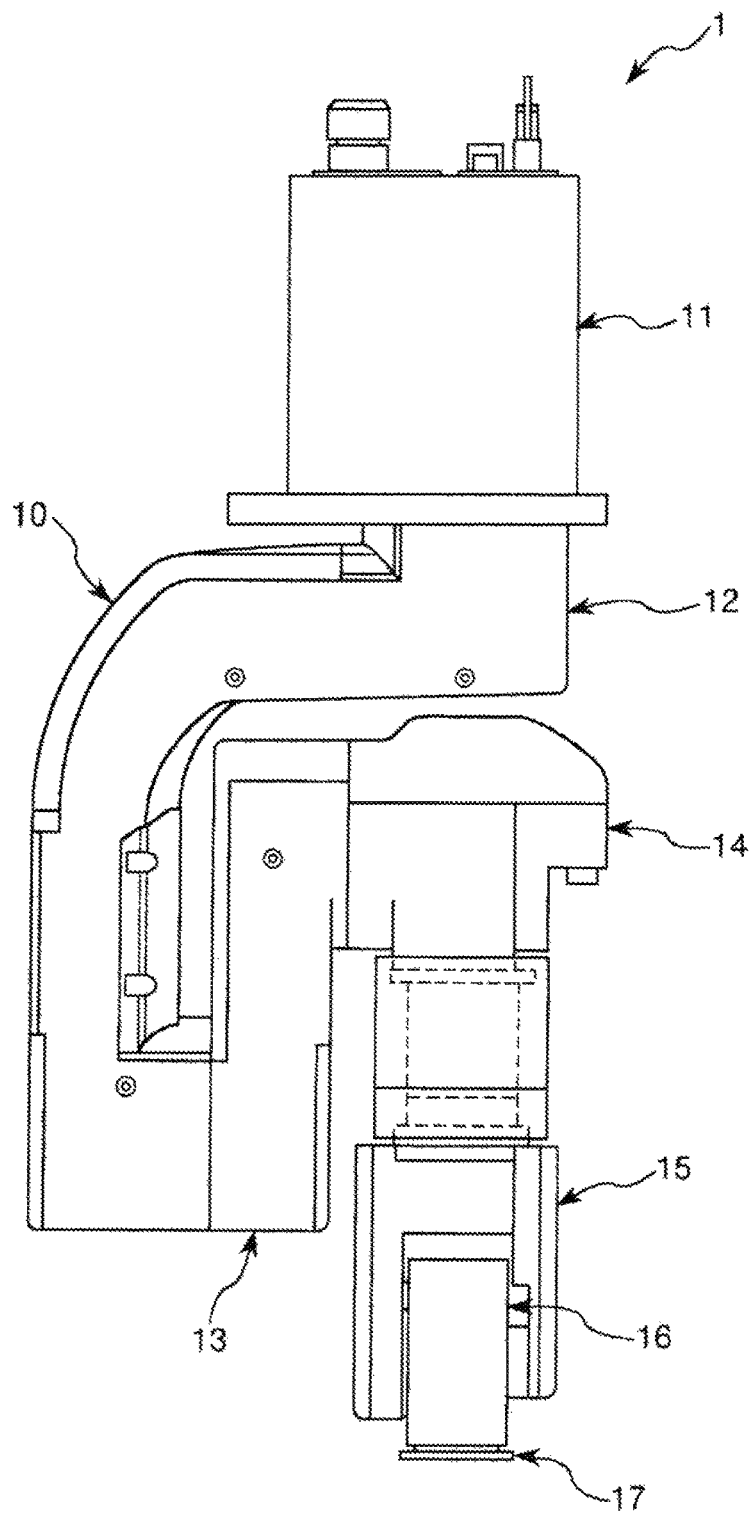
FIG. 2 is a front view of the robot shown in FIG. 1.
Figure 3:
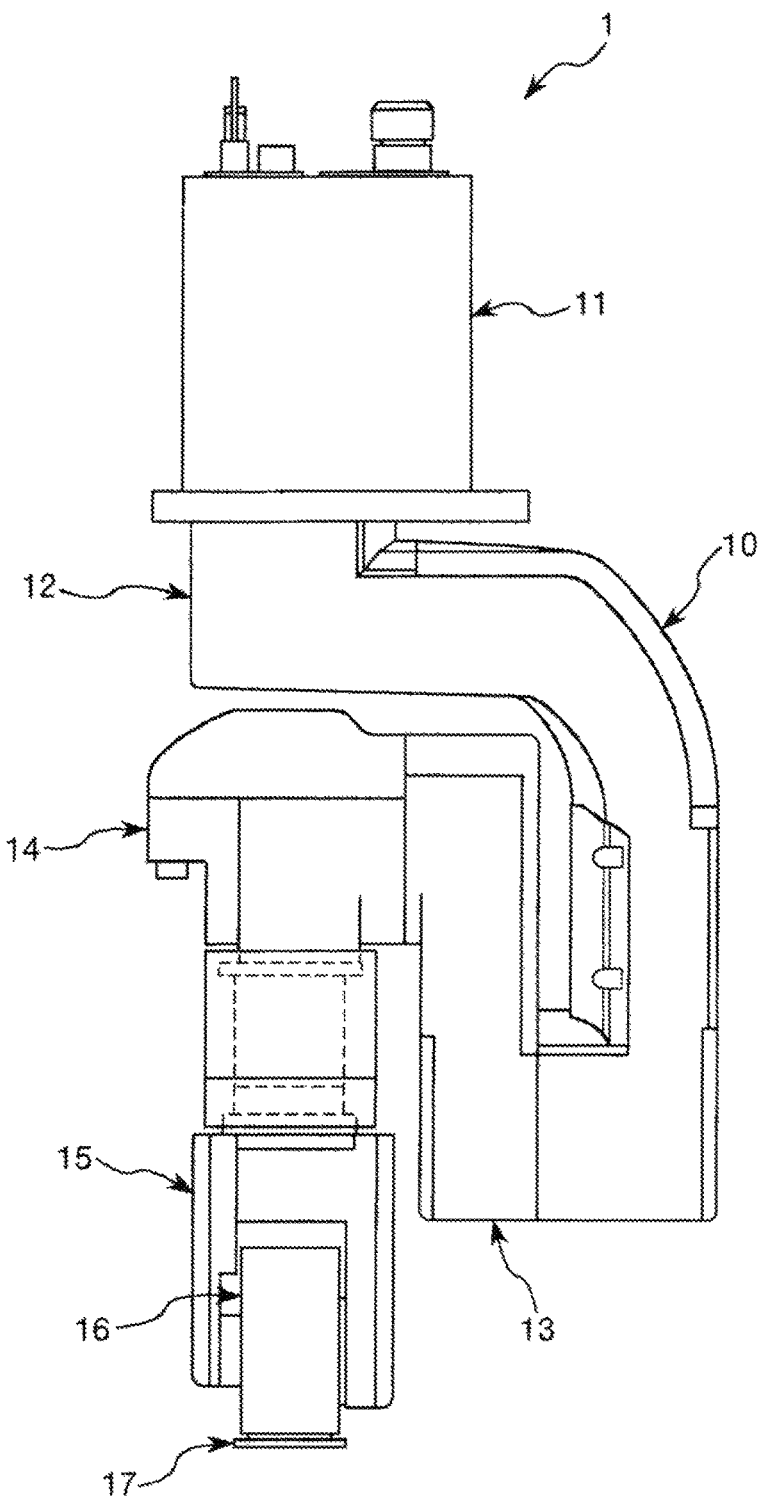
FIG. 3 is a rear view of the robot shown in FIG. 1.
Figure 4:
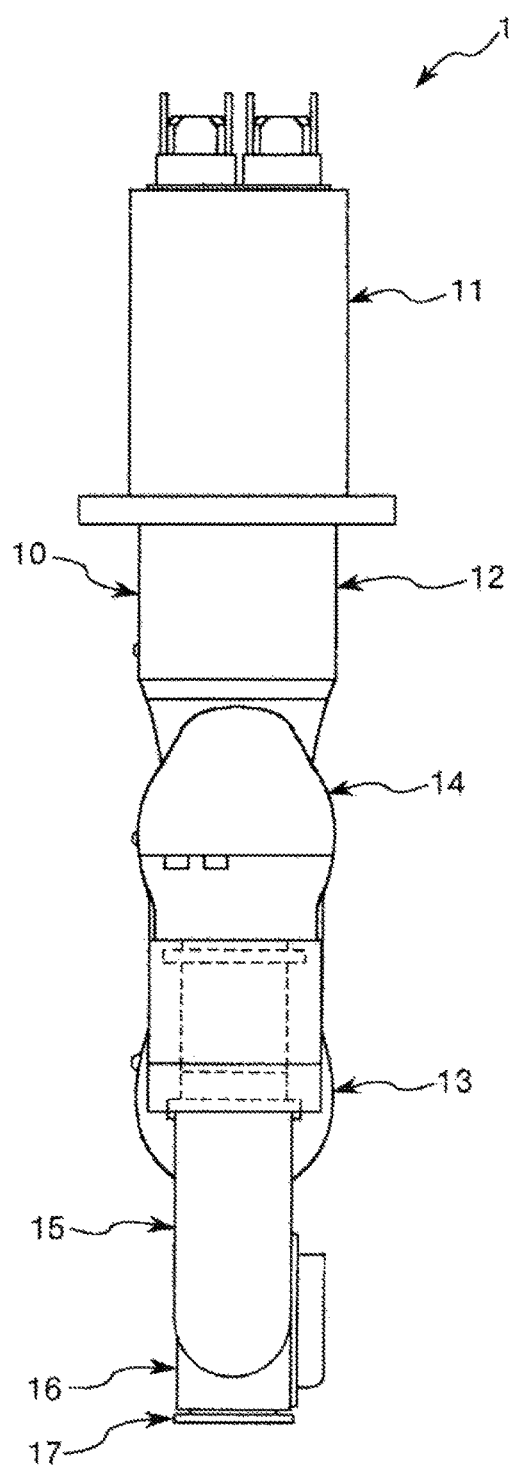
FIG. 4 is a right side view of the robot shown in FIG. 1.
Figure 5:
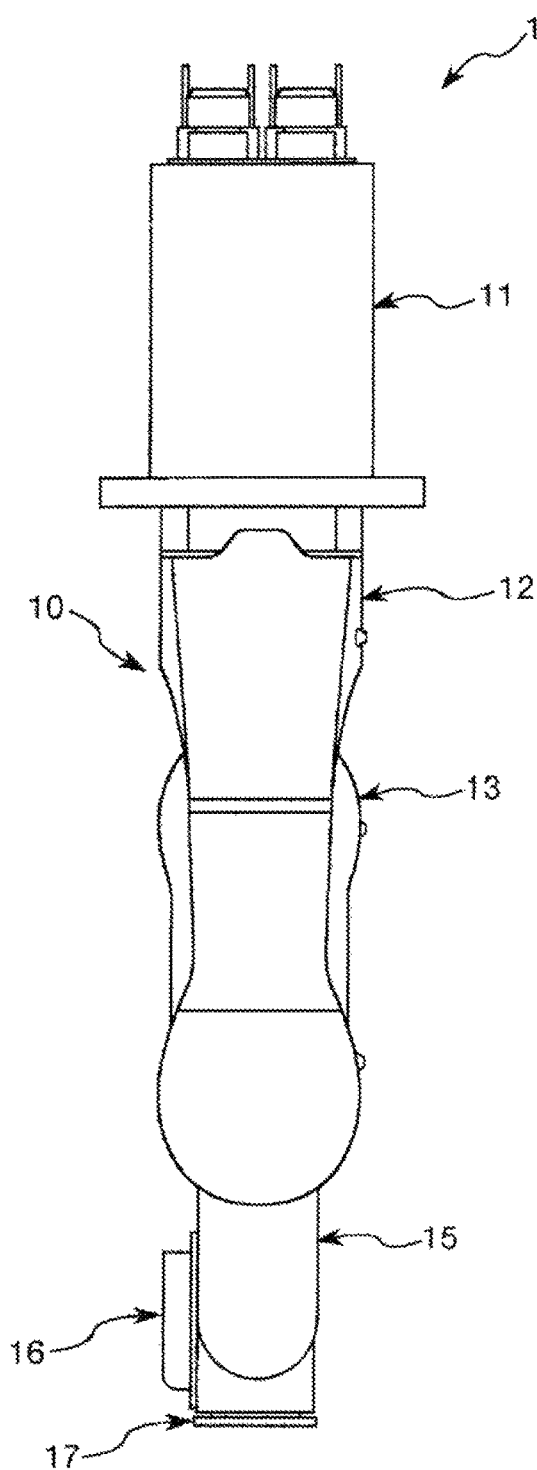
FIG. 5 is a left side view of the robot shown in FIG. 1.
Figure 6:
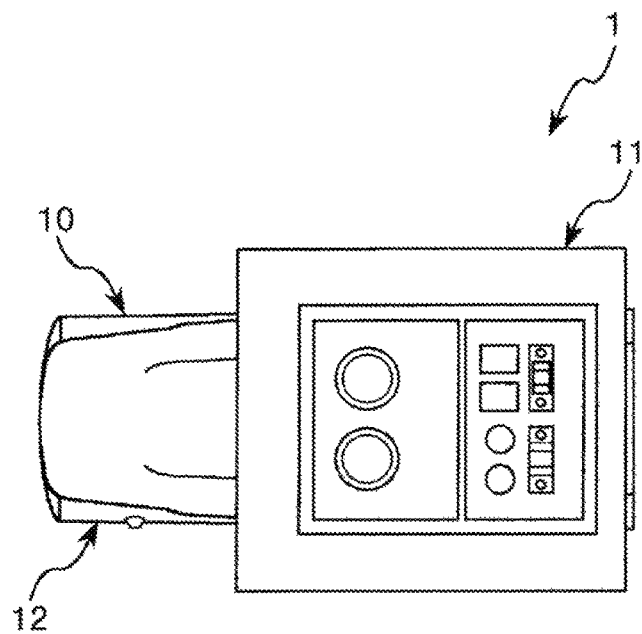
FIG. 6 is a plan view of the robot shown in FIG. 1.
Figure 7:
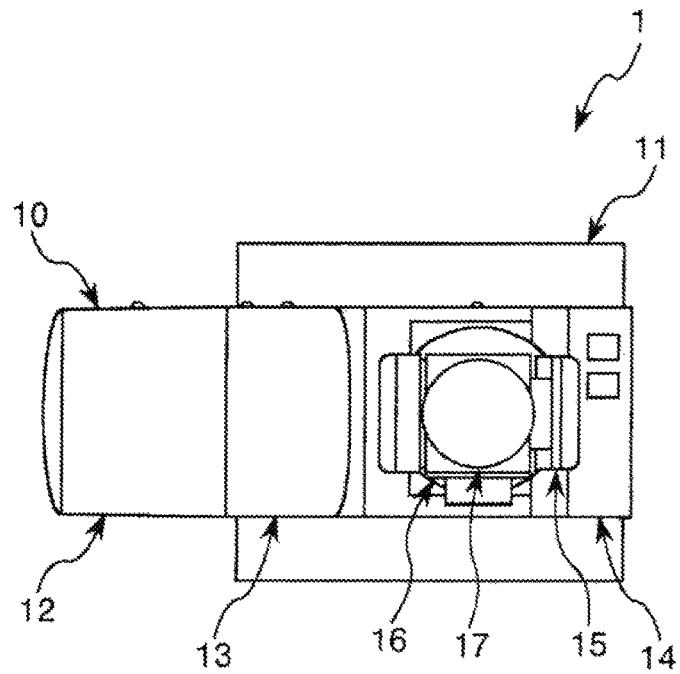
FIG. 7 is a bottom view of the robot shown in FIG. 1.
Figure 8:
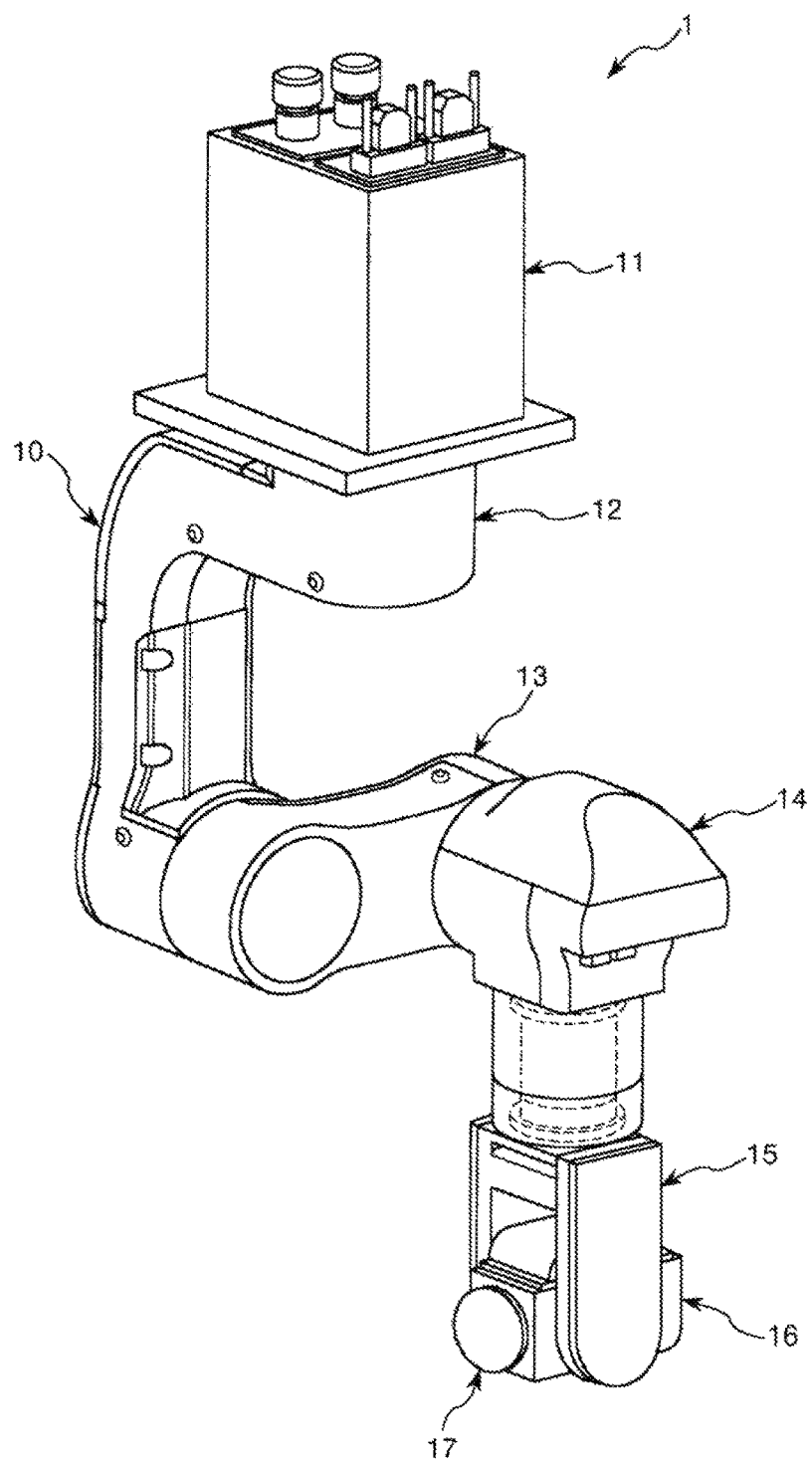
FIG. 8 is a perspective view from the front side of a state in the middle of a change or a state after the change of the robot shown in FIG. 1.
Figure 9:
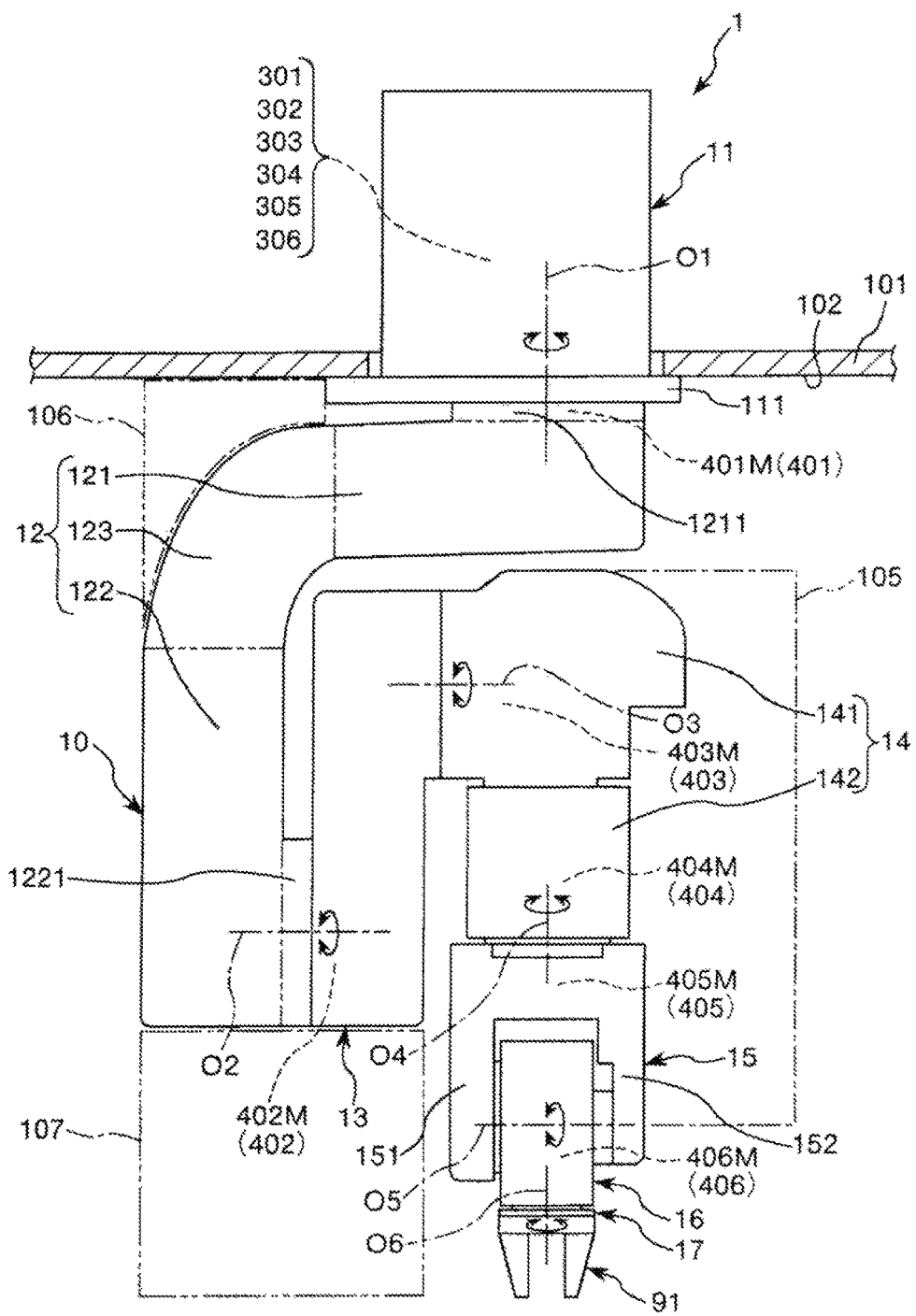
FIG. 9 is a schematic configuration diagram of the robot shown in FIG. 1.
Figure 10:
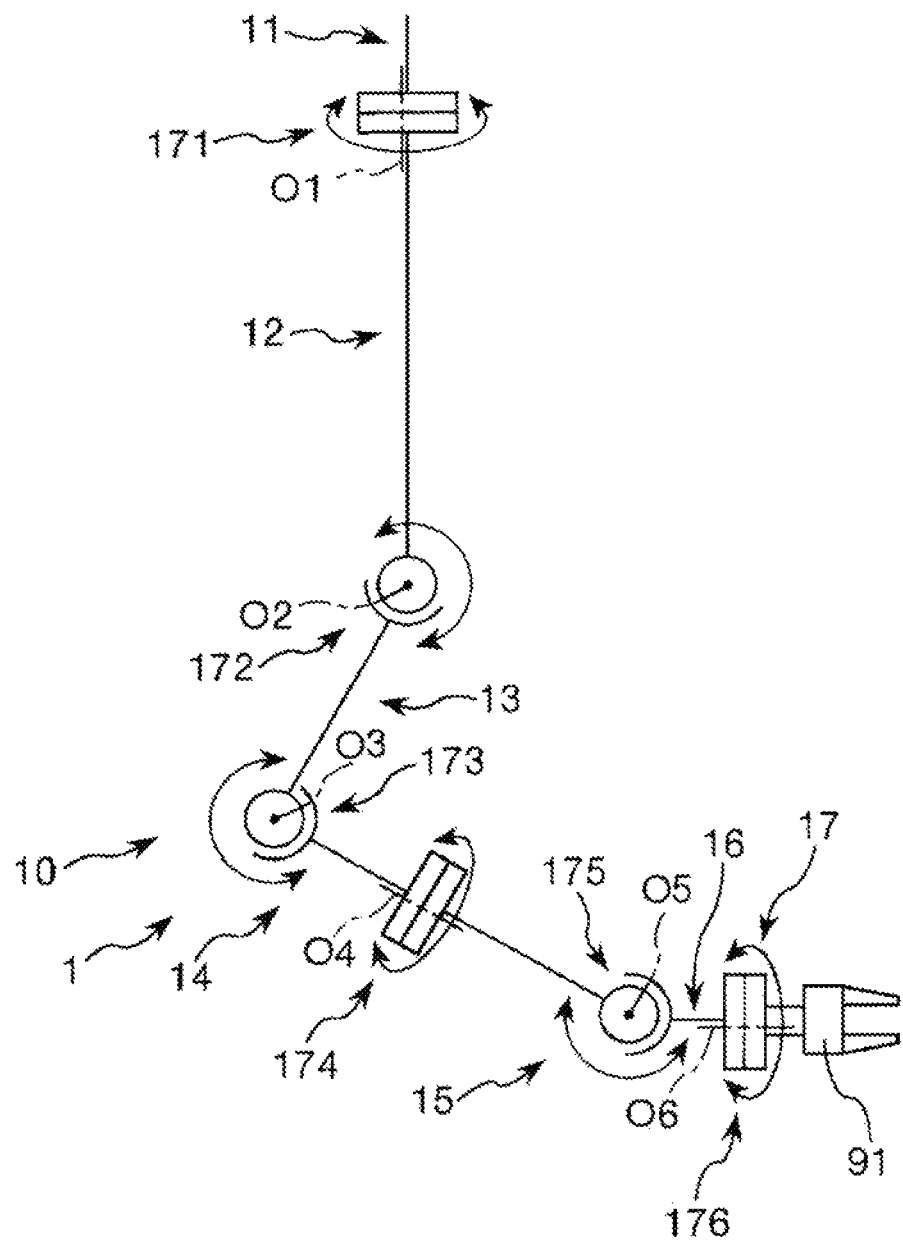
FIG. 10 is a schematic view of the robot shown in FIG. 1.

FIG. 1 is a perspective view showing a robot according to the first embodiment of the invention. FIG. 2 is a front view of the robot shown in FIG. 1. FIG. 3 is a rear view of the robot shown in FIG. 1. FIG. 4 is a right side view of the robot shown in FIG. 1. FIG. 5 is a left side view of the robot shown in FIG. 1. FIG. 6 is a plan view of the robot shown in FIG. 1. FIG. 7 is a bottom view of the robot shown in FIG. 1. FIG. 8 is a perspective view from the front side of a state in the middle of a change or a state after the change of the robot shown in FIG. 1. FIG. 9 is a schematic configuration diagram of the robot shown in FIG. 1. FIG. 10 is a schematic view of the robot shown in FIG. 1.

Hereinafter, for convenience of explanation, the upside in FIGS. 1 to 5, 8, and 9 is referred to as "up" or "upper" and the downside is referred to as "low" or "lower". Further, the base side in FIGS. 1 to 5, 8, and 9 is referred to as "proximal end" or "upstream" and the opposite side (the hand side) is referred to as "distal end" or "downstream". Furthermore, upward and downward directions in FIGS. 1 to 5, 8, and 9 are referred to as "vertical directions" and rightward and leftward directions are referred to as "horizontal directions". Note that, in the specification, the case where two axes are "in parallel" with each other includes the case where one axis of the two axes is inclined within a range of 5° or less with respect to the other axis.

A robot 1 shown in the embodiment may be used in a manufacturing process of manufacturing precision apparatuses such as wristwatches or the like, for example. Further, the robot 1 may perform works of feeding, removing, carrying, assembly, etc. of the precision apparatuses and components (objects) forming the apparatuses.

The robot 1 has a base 11 and a robot arm 10. The robot arm 10 includes a first arm 12 formed by a first member, a second arm 13 formed by a second member, a third arm 14 and a fourth arm 15 formed by a third member, a fifth arm 16 and a sixth arm 17 formed by a fourth member.

That is, the robot 1 is a vertical articulated (six-axis) robot in which the base 11, the first arm 12, the second arm 13, the third arm 14, the fourth arm 15, the fifth arm 16 (proximal end side arm), and the sixth arm 17 (distal end side arm) are sequentially coupled from the proximal end side toward the distal end side.

As shown in FIG. 9, for example, an end effector such as a hand 91 that grasps a precision apparatus, a component, or the like may be detachably attached to the distal end of the sixth arm 17. Further, the robot 1 includes a first drive source 401, a second drive source 402, a third drive source 403, a fourth drive source 404, a fifth drive source 405, and a sixth drive source 406 (six drive sources).

Furthermore, the robot 1 includes a robot control apparatus (control unit) (not shown) that controls actions of the respective parts of the robot 1. The robot control apparatus may be formed using e.g. a personal computer (PC) containing a CPU (Central Processing Unit) or the like. Note that the robot control apparatus may be built in the robot 1 or provided separately from the robot 1.

Hereinafter, the first arm 12, the second arm 13, the third arm 14, the fourth arm 15, the fifth arm 16, and the sixth arm 17 are respectively also referred to as "arm". The first drive source 401, the second drive source 402, the third drive source 403, the fourth drive source 404, the fifth drive source 405, and the sixth drive source 406 are respectively also referred to as "drive source (drive unit)".

Base

The robot 1 of the embodiment is a suspended vertical articulated robot, and placed in a ceiling 101 of an installation space on an attachment surface 102 as a lower surface of the ceiling 101. As shown in FIG. 9, the base 11 is a part located uppermost in the robot 1 and fixed (member attached) to the attachment surface 102 of the robot 1.

Note that, in the embodiment, a plate-like flange 111 provided in the lower part of the base 11 is fixed to the attachment surface 102. The part fixed to the attachment surface 102 is not limited to that, but may be e.g. an upper surface of the base 11. The fixing method is not particularly limited, but e.g. a fixing method using a plurality of bolts or the like may be employed.

The location to which the base 11 is fixed is not limited to the ceiling of the installation space, but may be e.g. a wall, a floor, a ground of the installation space.

Robot Arm

The robot arm 10 shown in FIG. 9 is rotatably supported with respect to the base 11 and the arms 12 to 17 are respectively supported to be independently displaceable with respect to the base 11.

The first arm 12 has a curving or bending shape. The first arm 12 has a first portion 121 provided on the base 11 and extending in the horizontal direction (first direction), a second portion 122 provided on the second arm 13 and extending in the vertical direction (second direction different from the first direction), and a third portion 123 located between the first portion 121 and the second portion 122 and extending in a direction tilted with respect to the horizontal direction and the vertical direction (a direction different from the first direction and the second direction). More specifically, the first arm 12 has the first portion 121 connected to the base 11 and extending downward in the vertical direction from the base 11 and extending in the horizontal direction, the third portion 123 extending downward in the vertical direction while inclining from an opposite end of the first portion 121 to the connecting part to the base 11 in a direction away from the first portion 121, and the second portion 122 extending downward in the vertical direction from the distal end of the third portion 123. These first portion 121, second portion 122, and third portion 123 are integrally formed. Further, the first portion 121 and the second portion 122 are nearly orthogonal (crossing) as seen from the near side of the paper surface of FIG. 9 (in a front view orthogonal to both a first rotation axis O1 and a second rotation axis O2, which will be described later).

The first portion 121 is connected to the base 11 via a first connecting portion 1211 (connecting portion). Further, the second portion 122 is connected to the second arm 13 via a second connecting portion 1221 (connecting portion).

The second arm 13 has a longitudinal shape and is connected to the distal end of the first arm 12 (the opposite end of the second portion 122 to the third portion 123).

The third arm 14 has a longitudinal shape and is connected to the opposite end of the second arm 13 to the end to which the first arm 12 is connected. The third arm 14 has a first portion 141 connected to the second arm 13 and extending from the second arm 13 in the horizontal direction and a second portion 142 extending from the first portion 141 in the vertical direction. These first portion 141 and second portion 142 are integrally formed. Further, the first portion 141 and the second portion 142 are nearly orthogonal (crossing) as seen from the near side of the paper surface of FIG. 9 (in a front view orthogonal to both a third rotation axis O3 and a fourth rotation axis O4, which will be described later).

The fourth arm 15 is connected to the opposite end of the third arm 14 to the end to which the second arm 13 is connected. The fourth arm 15 has a pair of supporting portions 151, 152 opposed to each other. The supporting portions 151, 152 are used for connection to the fifth arm 16.

The fifth arm 16 is located between the supporting portions 151, 152 and connected to the supporting portions 151, 152, and thereby, coupled to the fourth arm 15. Note that the structure of the fourth arm 15 is not limited to the structure, but may have a single supporting portion (cantilever), for example.

The sixth arm 17 has a flat plate shape and is connected to the distal end of the fifth arm 16. Further, the hand 91 is detachably attached to the distal end of the sixth arm 17 (the opposite end to the fifth arm 16). The hand 91 includes, but not particularly limited to, e.g. a configuration having a plurality of finger portions (fingers).

Each of the exteriors (the members forming the outer shapes) of the above described respective arms 12 to 17 may be formed by a single member or a plurality of members.

Next, referring to FIG. 10, the drive sources 401 to 406 with driving of the arms 12 to 17 will be explained.

As shown in FIG. 10, the base 11 and the first arm 12 are coupled via a joint (connecting part) 171. The base 11 may include the joint 171 or not.

The joint 171 has a mechanism that rotatably supports the first arm 12 coupled to the base 11 with respect to the base 11. Thereby, the first arm 12 is rotatable around the first rotation axis O1 (n-th rotation axis) in parallel to the vertical direction (about the first rotation axis O1) with respect to the base 11. The first rotation axis O1 is a rotation axis on the most upstream side of the robot 1. The rotation about the first rotation axis O1 is performed by driving of the first drive source 401 having a motor 401M. Further, the motor 401M is electrically connected to a motor driver 301 via a cable (not shown) and controlled by a control unit (not shown) via the motor driver 301. Note that the first drive source 401 may be adapted to transmit the drive power from the motor 401M by a reducer (not shown) provided with the motor 401M, or the reducer may be omitted.

The first arm 12 and the second arm 13 are coupled via a joint (connecting part) 172. The joint 172 has a mechanism that rotatably supports one of the first arm 12 and the second arm 13 coupled to each other with respect to the other. Thereby, the second arm 13 is rotatable around the second rotation axis O2 ((n+1)th rotation axis) in parallel to the horizontal direction (about the second rotation axis O2) with respect to the first arm 12. The second rotation axis O2 is orthogonal to the first rotation axis O1. The rotation about the second rotation axis O2 is performed by driving of the second drive source 402 having a motor 402M. Further, the motor 402M is electrically connected to a motor driver 302 via a cable (not shown) and controlled by a control unit (not shown) via the motor driver 302. Note that the second drive source 402 may be adapted to transmit the drive power from the motor 402M by a reducer (not shown) provided with the motor 402M, or the reducer may be omitted. The second rotation axis O2 may be parallel to an axis orthogonal to the first rotation axis O1, or the second rotation axis O2 may be different in axis direction from the first rotation axis O1, not orthogonal thereto.

The second arm 13 and the third arm 14 are coupled via a joint (connecting part) 173. The joint 173 has a mechanism that rotatably supports one of the second arm 13 and the third arm 14 coupled to each other with respect to the other. Thereby, the third arm 14 is rotatable around the third rotation axis O3 in parallel to the horizontal direction (about the third rotation axis O3) with respect to the second arm 13. The third rotation axis O3 is parallel to the second rotation axis O2. The rotation about the third rotation axis O3 is performed by driving of the third drive source 403 having a motor 403M. Further, the motor 403M is electrically connected to a motor driver 303 via a cable (not shown) and controlled by a control unit (not shown) via the motor driver 303. Note that the third drive source 403 may be adapted to transmit the drive power from the motor 403M by a reducer (not shown) provided with the motor 403M, or the reducer may be omitted.

The third arm 14 and the fourth arm 15 are coupled via a joint (connecting part) 174. The joint 174 has a mechanism that rotatably supports one of the third arm 14 and the fourth arm 15 coupled to each other with respect to the other. Thereby, the fourth arm 15 is rotatable around the fourth rotation axis O4 in parallel to the center axis direction of the third arm 14 (about the fourth rotation axis O4) with respect to the third arm 14. The fourth rotation axis O4 is orthogonal to the third rotation axis O3. The rotation about the fourth rotation axis O4 is performed by driving of the fourth drive source 404 having a motor 404M. Further, the motor 404M is electrically connected to a motor driver 304 via a cable (not shown) and controlled by a control unit (not shown) via the motor driver 304. Note that the fourth drive source 404 may be adapted to transmit the drive power from the motor 404M by a reducer (not shown) provided with the motor 404M, or the reducer may be omitted. The fourth rotation axis O4 may be parallel to an axis orthogonal to the third rotation axis O3, or the fourth rotation axis O4 may be different in axis direction from the third rotation axis O3, not orthogonal thereto.

The fourth arm 15 and the fifth arm 16 are coupled via a joint (connecting part) 175. The joint 175 has a mechanism that rotatably supports one of the fourth arm 15 and the fifth arm 16 coupled to each other with respect to the other. Thereby, the fifth arm 16 is rotatable around a fifth rotation axis O5 orthogonal to the center axis direction of the fourth arm 15 (about the fifth rotation axis O5) with respect to the fourth arm 15. The fifth rotation axis O5 is orthogonal to the fourth rotation axis O4. The rotation about the fifth rotation axis O5 is performed by driving of the fifth drive source 405 having a motor 405M. Further, the motor 405M is electrically connected to a motor driver 305 via a cable (not shown) and controlled by a control unit (not shown) via the motor driver 305. Note that the fifth drive source 405 may be adapted to transmit the drive power from the motor 405M by a reducer (not shown) provided with the motor 405M, or the reducer may be omitted. The fifth rotation axis O5 may be parallel to an axis orthogonal to the fourth rotation axis O4, or the fifth rotation axis O5 may be different in axis direction from the fourth rotation axis O4, not orthogonal thereto.

The fifth arm 16 and the sixth arm 17 are coupled via a joint (connecting part) 176. The joint 176 has a mechanism that rotatably supports one of the fifth arm 16 and the sixth arm 17 coupled to each other with respect to the other. Thereby, the sixth arm 17 is rotatable around a sixth rotation axis O6 (about the sixth rotation axis O6) with respect to the fifth arm 16. The sixth rotation axis O6 is orthogonal to the fifth rotation axis O5. The rotation about the sixth rotation axis O6 is performed by driving of the sixth drive source 406 having a motor 406M. Further, the motor 406M is electrically connected to a motor driver 306 via a cable (not shown) and controlled by a control unit (not shown) via the motor driver 306. Note that the sixth drive source 406 may be adapted to transmit the drive power from the motor 406M by a reducer (not shown) provided with the motor 406M, or the reducer may be omitted. The sixth rotation axis O6 may be parallel to an axis orthogonal to the fourth rotation axis O4, the sixth rotation axis O6 may be parallel to an axis orthogonal to the fifth rotation axis O5, or the sixth rotation axis O6 may be different in axis direction from the fifth rotation axis O5, not orthogonal thereto.

The robot 1 driving in the above described manner controls the actions of the respective arms 12 to 17 etc. while grasping a precision apparatus, a component, or the like with the hand 91 connected to the distal end of the sixth arm 17, and thereby, may perform respective works of carrying the precision apparatus, the component, etc. The driving of the hand 91 is controlled by a control unit (not shown).

As above, the basic configuration of the robot 1 is briefly explained. The robot 1 having the configuration is the vertical articulated robot having the six (plurality of) arms 12 to 17 as described above, and thereby, the drive range is wider and higher workability may be exerted.

Further, as described above, in the robot 1, the proximal end side of the first arm 12 is attached to the base 11, and thereby, the respective arms 12 to 17 may be rotated with respect to the base 11. Furthermore, in the embodiment, the robot 1 is of the suspended type with the base 11 attached to the ceiling 101, and the joint 171 as the connecting part between the base 11 and the first arm 12 is located above the joint 172 as the connecting part between the first arm 12 and the third arm 13 in the vertical direction. Accordingly, the work range of the robot 1 below the robot 1 in the vertical direction may be made wider.

Next, referring to FIGS. 11, 12, 13A to 13E, 14, and 15, the relationships among the respective arms 12 to 17 will be explained.

Figure 11:
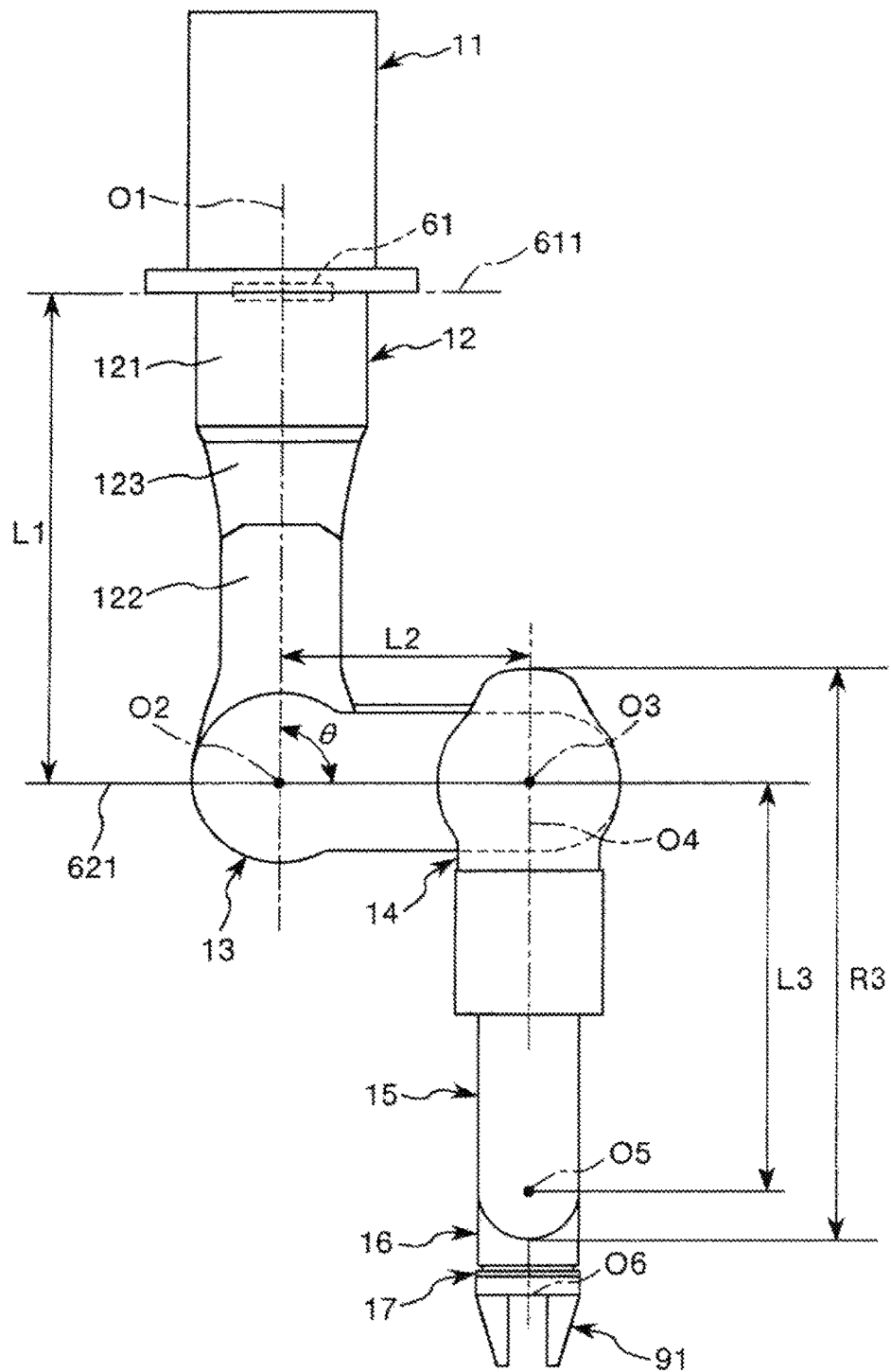
FIG. 11 is a schematic side view of a state in which a first arm, a second arm, and a third arm of the robot shown in FIG. 1 do not overlap.
Figure 12:
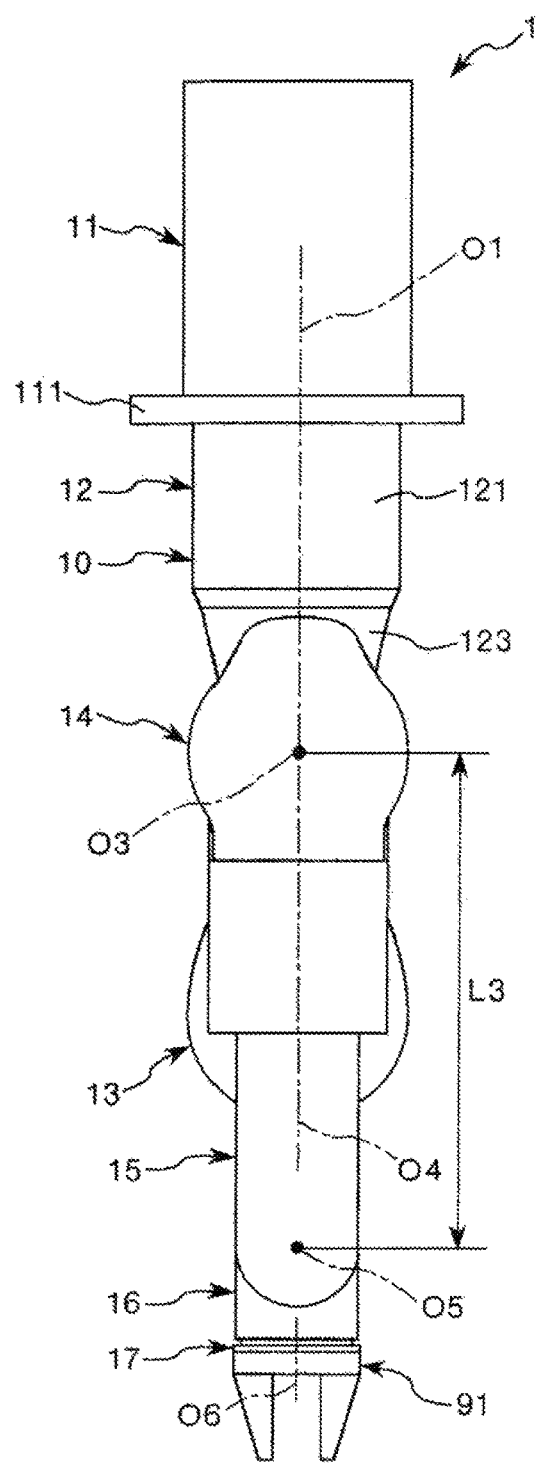
FIG. 12 is a schematic side view of a state in which the first arm, the second arm, and the third arm of the robot shown in FIG. 1 overlap.
Figure 14:
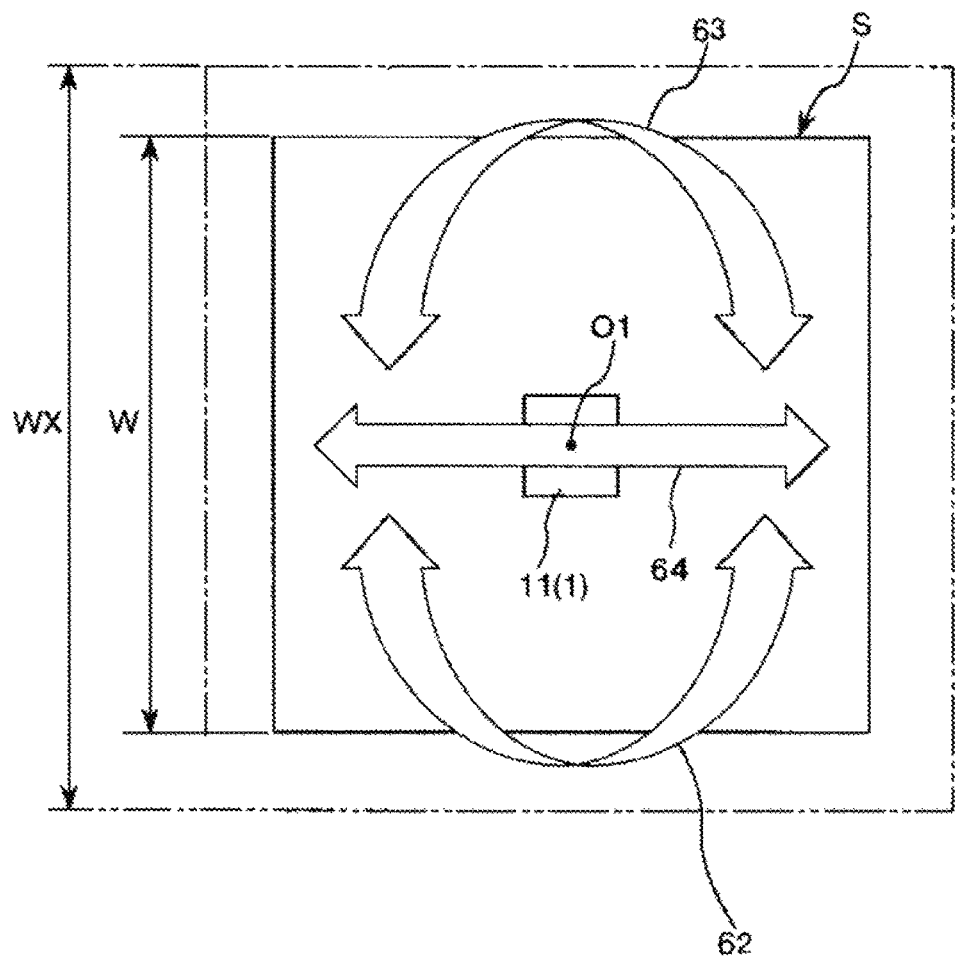
FIG. 14 shows movement paths of a hand in the actions of the robot shown in FIGS. 13A to 13E.
Figure 15:
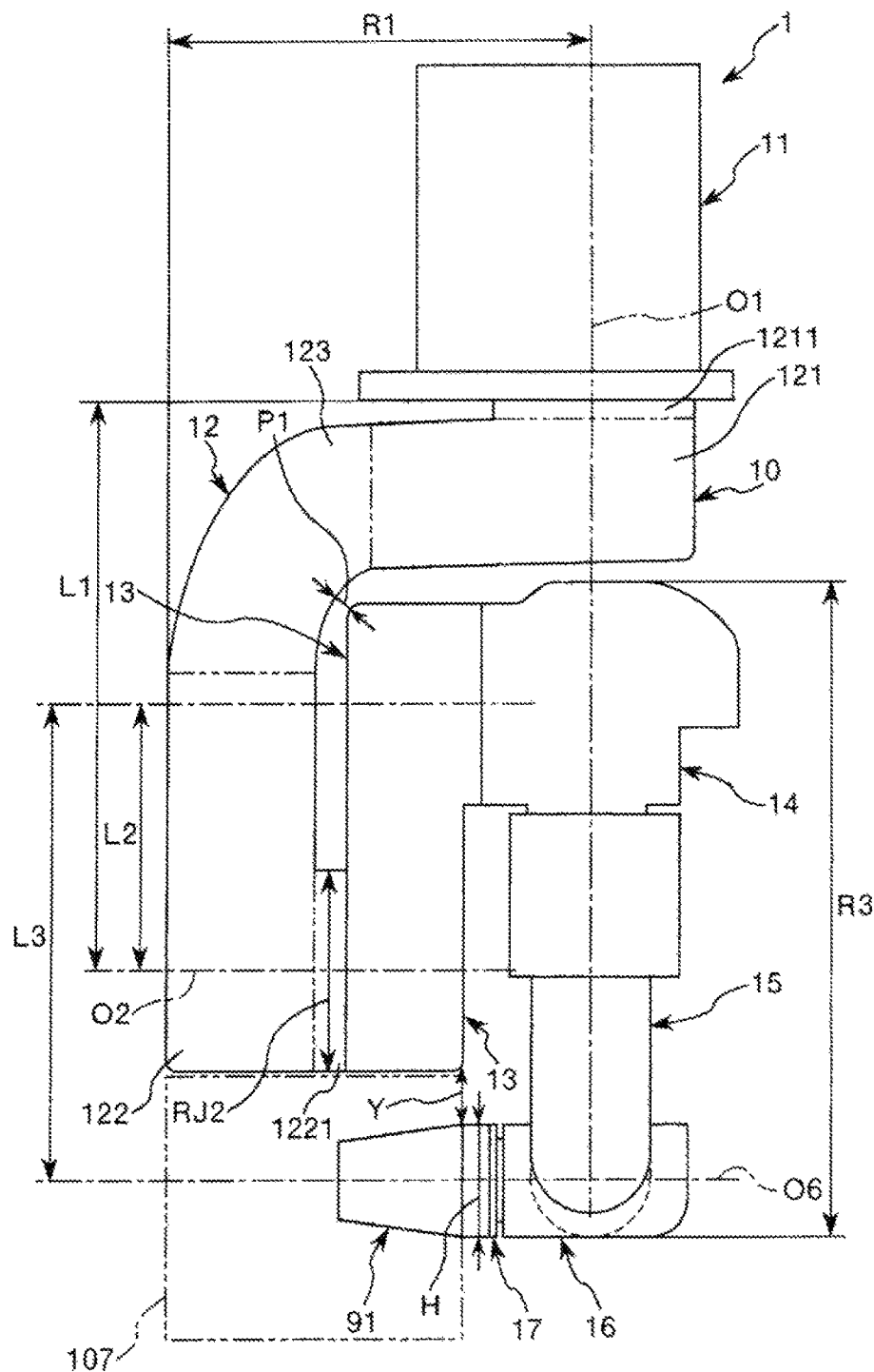
FIG. 15 is a diagram for explanation of lengths and arrangement of the arms of the robot shown in FIG. 1.

FIG. 11 is a schematic side view of a state in which the first arm, the second arm, and the third arm of the robot shown in FIG. 1 do not overlap. FIG. 12 is a schematic side view of a state in which the first arm, the second arm, and the third arm of the robot shown in FIG. 1 overlap. FIGS. 13A to 13E are diagrams for explanation of actions of the robot shown in FIG. 1. FIG. 14 shows movement paths of the hand in the actions of the robot shown in FIGS. 13A to 13E. FIG. 15 is a diagram for explanation of lengths and arrangement of the arms of the robot shown in FIG. 1.

In the following explanation, the third arm 14, the fourth arm 15, the fifth arm 16, and the sixth arm 17 are considered in a condition that the arms are stretched straight, in other words, in a condition that the fourth rotation axis O4 and the sixth rotation axis O6 are aligned or in parallel as shown in FIGS. 11 and 12.

First, as shown in FIG. 11, a length L1 of the first arm 12 is set to be longer than a length L2 of the second arm 13.

Here, the length L1 of the first arm 12 is a distance between the second rotation axis O2 and the attachment surface 102 as seen from the axis direction of the second rotation axis O2. Further, the length L2 of the second arm 13 is a distance between the second rotation axis O2 and the third rotation axis O3 as seen from the axis direction of the second rotation axis O2.

Note that the length L1 of the first arm 12 may be regarded as a distance between the second rotation axis O2 and a center line 611 extending in the leftward and rightward directions in FIG. 11 of a bearing part 61 (a member of the joint 171) that rotatably supports the first arm 12 as seen from the axis direction of the second rotation axis O2. Or, the length L1 of the first arm 12 may be regarded as a distance between the distal end surface of first arm 12 (the opposite end surface to the bearing part 61) and the attachment surface 102 as seen from the axis direction of the second rotation axis O2 and the length L2 of the second arm 13 may be regarded as a distance between the distal end surface of the second arm 13 and the proximal end surface of the second arm 13 as seen from the axis direction of the second rotation axis O2.

Further, as shown in FIGS. 11 and 12, the robot 1 is adapted so that an angle θ formed between the first arm 12 and the second arm 13 can be 0° as seen from the axis direction of the second rotation axis O2. That is, the robot 1 is adapted so that the first arm 12 and the second arm 13 can overlap as seen from the axis direction of the second rotation axis O2.

Furthermore, in the state in which the first arm 12 and the second arm 13 overlap as seen from the axis direction of the second rotation axis O2 (hereinafter, referred to as "state A"), a predetermined gap is provided between the first arm 12 and the second arm 13. In other words, the robot 1 is adapted so that the second arm 13 may not interfere with the first arm 12 in the state A.

Particularly, as described above, the length L1 of the first arm 12 is set to be longer than the length L2 of the second arm 13, and a predetermined space may be provided between the second arm 13 and the first portion 121 in the state A. Accordingly, the state A may be assumed while the interference of the second arm 13 with the first portion 121 is avoided.

Here, the angle θ formed by the first arm 12 and the second arm 13 is an angle formed by a straight line 621 passing through the second rotation axis O2 and the third rotation axis O3 (a center axis of the second arm 13 as seen from the axis direction of the second rotation axis O2) and the first rotation axis O1 as seen from the axis direction of the second rotation axis O2 (see FIG. 11).

Further, as shown in FIG. 12, the robot 1 is adapted so that the second arm 13 and the third arm 14 can overlap as seen from the axis direction of the second rotation axis O2.

In the state in which the second arm 13 and the third arm 14 overlap as seen from the axis direction of the second rotation axis O2 (hereinafter, referred to as "state B"), a predetermined gap is provided between the second arm 13 and the third arm 14. In other words, the robot 1 is adapted so that the second arm 13 and the third arm 14 may not interfere with each other in the state B.

Therefore, as shown in FIG. 12, the robot 1 is adapted so that the first arm 12, the second arm 13, and the third arm 14 can overlap at the same time as seen from the axis direction of the second rotation axis O2. In the state in which the first arm 12, the second arm 13, and the third arm 14 overlap as seen from the axis direction of the second rotation axis O2 (hereinafter, referred to as "state C (first state)", the first portion 121 of the first arm 12, the second arm 13, and the third arm 14 overlap as seen from the first rotation axis O1. A predetermined gap is also provided between the first portion 121 of the first arm 12 and the third arm 14. In other words, the robot 1 is adapted so that the first arm 12 and the third arm 14 may not interfere with each other in the state C.

As shown in FIG. 11, a total length L3 of the third arm 14, the fourth arm 15, and the fifth arm 16 is set to be longer than the length L2 of the second arm 13. Further, a total length R3 of the third arm 13 and the fourth arm 15 is also set to be longer than the length L2 of the second arm 13. Accordingly, as shown in FIG. 12, the distal end of the robot arm 10 may be protruded from the second arm 13 more downwardly than the proximal end of the second arm 13. Thereby, as shown in FIG. 9, in a region of the second arm 13 formed in the state C opposite to the base 11 (hereinafter, also referred to as "distal end region 107"), the wider range in which the distal end of the robot arm 10 and the hand 91 can move without interferences with the first arm 12 and the second arm 13 may be secured.

Here, the total length L3 of the third arm 14, the fourth arm 15, and the fifth arm 16 is a distance between the third rotation axis O3 and the fifth rotation axis O5 as seen from the axis direction of the second rotation axis O2 (see FIG. 12). Note that the length L3 may be regarded as a distance between the proximal end surface of the third arm 14 and the distal end surface of the fifth arm 16 as seen from the axis direction of the second rotation axis O2. In this case, regarding the third arm 14, the fourth arm 15, and the fifth arm 16, the fourth rotation axis O4 and the sixth rotation axis O6 are aligned or in parallel as shown in FIG. 12.

In the robot 1 having the robot arm 10, as described above, the first arm 12, the second arm 13, and the third arm 14 can overlap as seen from the axis direction of the second rotation axis O2. Accordingly, as shown in FIGS. 13A to 13E, by rotation of the second arm 13 and the third arm 14 without rotation of the first arm 12, the distal end of the robot arm 10 and the hand 91 may be moved to positions different by 180° about the first rotation axis O1 through the state in which the first arm 12, the second arm 13, and the third arm 14 overlap as seen from the axis direction of the second rotation axis O2.

By the driving of the robot arm 10, as shown in FIG. 14, the robot 1 may perform an action of moving the hand 91 as shown by an arrow 64 without actions of moving the hand 91 as shown by arrows 62, 63. That is, the robot 1 may perform the action of moving the hand 91 (the distal end of the robot 10) linearly as seen from the axis direction of the first rotation axis O1. Thereby, the space for preventing interferences of the robot 1 may be made smaller. Accordingly, the area S of the installation space for installation of the robot 1 (installation area) may be made smaller than that of related art.

Specifically, as shown in FIG. 14, the width W of the installation space of the robot 1 may be made smaller than a width WX of the installation space of related art, e.g. 80% of the width WX or less. Accordingly, the operation region of the robot 1 in the width direction (the direction of the production line) may be made smaller. Thereby, the larger number of robots 1 may be arranged along the production line per unit length and the production line may be shortened.

Further, similarly, the height of the installation space of the robot 1 (the length in the vertical direction) may be made lower than the height of related art, specifically, e.g. 80% of the height of related art or less.

The action of moving the hand 91 as shown by the arrow 64 can be performed, and, when the hand 91 is moved to a position different by 180° about the first rotation axis O1, for example, it may be possible that the first arm 12 is not rotated or the rotation angle (amount of rotation) of the first arm 12 is made smaller. The rotation angle of the first arm 12 about the first rotation axis O1 is made smaller, and thereby, the rotation of the first arm 12 having portions protruding outward than the base 11 (the second portion 122 and the third portion 123) may be made smaller as seen from the axis direction of the first rotation axis O1, and interferences of the robot 1 with peripherals may be reduced.

Further, the action of moving the hand 91 as shown by the arrow 64 can be performed and the movement of the robot 1 may be reduced, and thereby, the robot 1 may be efficiently driven. Accordingly, the takt time may be shortened and the work efficiency may be improved. Furthermore, the distal end of the robot arm 10 may be linearly moved and the movement of the robot 1 may be easily recognized.

Here, to execute the above described action of moving the hand 91 of the robot 1 (the distal end of the robot arm 10) to a position different by 180° about the first rotation axis O1 by simply rotating the first arm 12 about the first rotation axis O1 like the robot of related art, the robot 1 may interfere with the peripherals, and thus, it is necessary to teach the robot 1 an evacuation point for avoiding the interference. For example, in the case where, when only the first arm 12 is rotated to 90° about the first rotation axis O1, the robot 1 also interferes with the peripherals, it is necessary to teach the robot 1 many evacuation points to prevent interferences with the peripherals. As described above, in the robot of related art, it is necessary to teach many evacuation points, an enormous number of evacuation points are necessary, and a lot of effort and time are taken for teaching.

On the other hand, in the robot 1, when the action of moving the hand 91 to a position different by 180° about the first rotation axis O1 is executed, the number of regions and portions that may interfere is very small and the number of evacuation points to teach may be reduced and effort and time taken for teaching may be reduced. That is, in the robot 1, the number of evacuation points to teach may be about ⅓ of that of the robot of related art, for example, and teaching is dramatically easier.

In the robot 1, a region (part) 105 of the third arm 14 and the fourth arm 15 surrounded by a dashed-two dotted line on the right in FIG. 9 is a region (part) in which the robot 1 does not or is hard to interfere with the robot 1 itself or the other members. Accordingly, when a predetermined member is mounted on the region 105, the member is hard to interfere with the robot 1 and peripherals or the like. Therefore, in the robot 1, a predetermined member can be mounted on the region 105. Particularly, the case where the predetermined member is mounted on the region of the third arm 14 on the right in FIG. 9 of the region 105 is more effective because the probability that the member interferes with peripherals (not shown) is lower.

Further, in the robot 1, a region (part) 106 between the ceiling 101 and the first arm 12 surrounded by a dashed-two dotted line on the left in FIG. 9 is also a region (part) in which the robot 1 does not or is hard to interfere with the robot 1 itself or the other members like the above described region 105. This is because, in the region 106, the first arm 12 has the third portion 123.

Objects that can be mounted on the region 105 include e.g. a controller for controlling driving of a sensor of a hand, a hand eye camera, or the like, a solenoid valve for a suction mechanism, etc.

As a specific example, for example, when a suction mechanism is provided on the hand, if a solenoid valve or the like is provided in the region 105, the solenoid valve causes no obstruction when the robot 1 is driven. The region 105 is highly convenient as described above.

Further, as shown in FIG. 15, in the robot 1, the hand 91 may be positioned below the second arm 13. Specifically, as shown in FIG. 15, in the state C, a state in which the hand 91 overlaps with the second arm 13 (hereinafter, referred to as "state D (second state)" can be assumed as seen from the axis direction of the first rotation axis O1.

According to the robot 1, the wider range in which the distal end of the robot arm 10 and the hand 91 can move may be taken.

Further, as shown in FIG. 15, in the robot 1, the sixth rotation axis O6 can be orthogonal to the first rotation axis O1 in the state D. Accordingly, the range in which the distal end of the robot arm 10 and the hand 91 can move may be made wider in the distal end region 107.

Letting the distance (minimum distance) between the hand 91 and the second arm 13 when the first rotation axis O1 and the fifth rotation axis O5 are orthogonal be Y, the following expression (1) is preferably satisfied and the following expression (2) is more preferably satisfied.

$$3 \text{ [mm]} \leq Y \quad (1)$$

$$5 \text{ [mm]} \leq Y \quad (2)$$

The above expression (1) is satisfied, and thereby, the range in which the distal end of the robot arm 10 and the hand 91 can move without interferences with the first arm 12 and the third arm 13 may be made wider in the distal end region 107. Further, the above expression (2) is satisfied, and thereby, even when the hand 91 and the work (not shown) grasped by the hand 91 have relatively large configurations, the range in which the distal end of the robot arm 10 and the hand 91 can move without interferences with the first arm 12 and the third arm 13 may be made wider.

Or, for example, even in the case where the wires, pipes (not shown), etc. connected to the hand 91 are provided outside of the fifth arm 16 and the sixth arm 17, the distance Y satisfies the relationship, and thereby, interferences of the wires, pipes, etc. with the first arm 12 and the third arm 13 may be avoided and an extreme restriction of the movement range of the hand 91 in the distal end region 107 may be reduced.

Further, in the state D, the distance Y more preferably satisfies the following expression.

$$Y \leq (R3/2) \quad (3)$$

Thereby, the movement range of the distal end of the robot arm 10 in the distal end region 107 may be made wider while upsizing of the robot arm 10 because of the total length R3 of the third arm 14 and the fourth arm 15 getting excessively longer is prevented.

Further, as described above, in the robot 1, the length L3 is set to be longer than the length L2 of the second arm 13, and particularly, the length L3 is preferably twice or more of the length L2. Thereby, in the state C, the distal end of the robot arm 10 may be sufficiently protruded toward the distal end region 107 side than the second arm 13. Accordingly, even when the configurations of the hand 91 and the work have relatively large configurations, the wider range in which the distal end of the robot arm 10 and the hand 91 can move without interferences with the first arm 12 and the third arm 13 may be secured in the distal end region 107.

Examples of dimensions of the respective parts of the robot 1 that satisfies the above described relationships are shown in the following table 1, table 2. Table 1 shows examples of the dimensions of the respective parts of the robot 1, for example, in the case where the wires, pipes, etc. connected to the hand 91 are provided inside of the robot arm 10. Further, Table 2 shows examples of the dimensions of the respective parts of the robot 1, for example, in the case where the wires, pipes, etc. connected to the hand 91 are provided outside of the robot arm 10.

and the end (distal end) of the second arm 13 opposite to the second rotation axis O2, and, in the embodiment, the distance P1 refers to the minimum distance between the third portion 123 and the second arm 13.

Second Embodiment

Next, the second embodiment of the invention will be explained.

Figure 16:
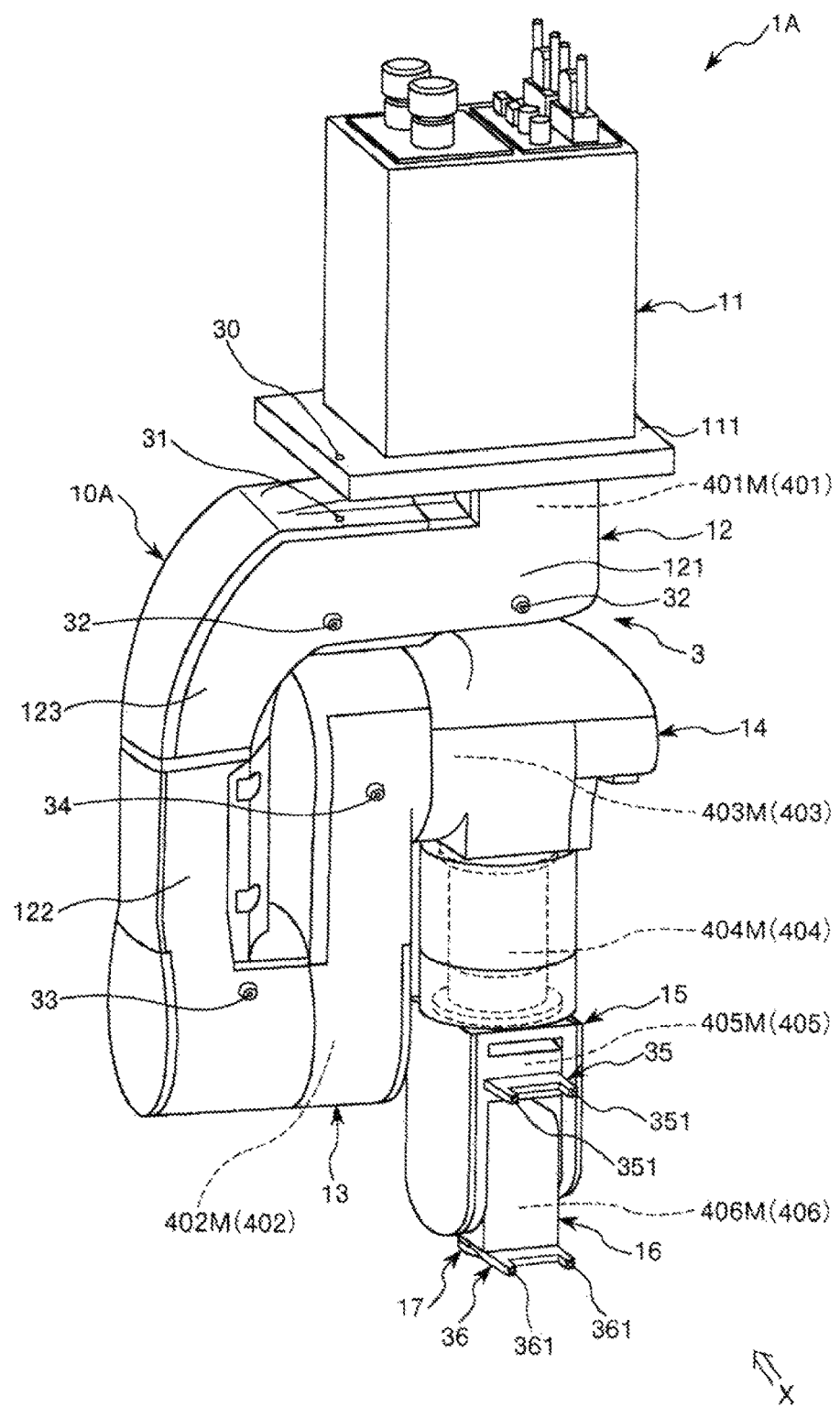
FIG. 16 is a perspective view showing a robot according to a second embodiment of the invention.
Figure 17:
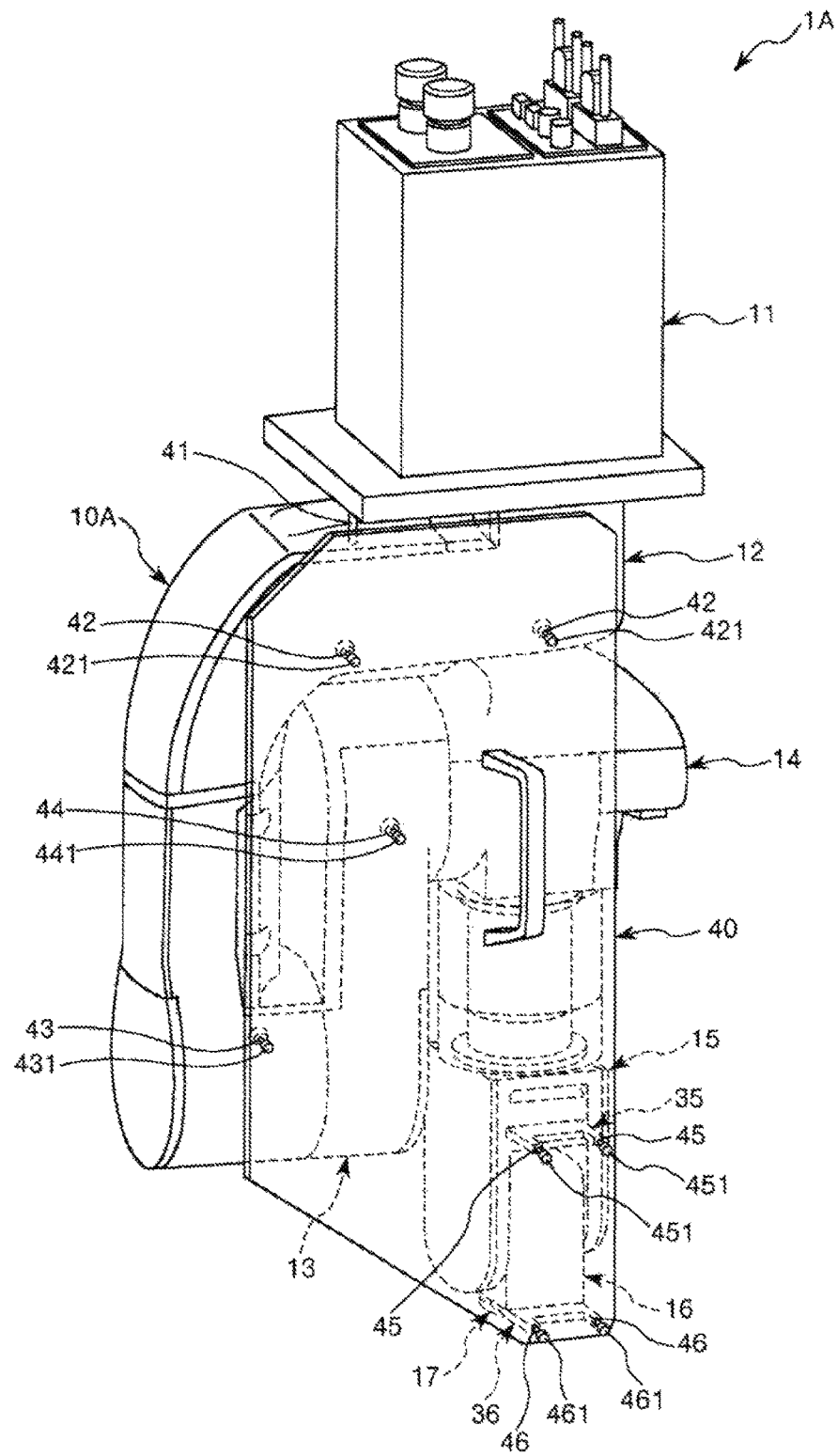
FIG. 17 is a perspective view showing a state in which a plate member is attached to the robot shown in FIG. 16.
Figure 20:
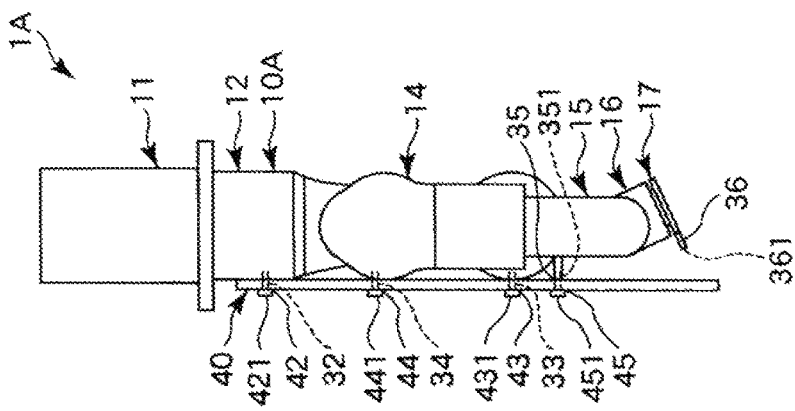
FIG. 20 is a schematic side view for explanation of the mechanical calibration of the robot shown in FIG. 16.
Figure 19:
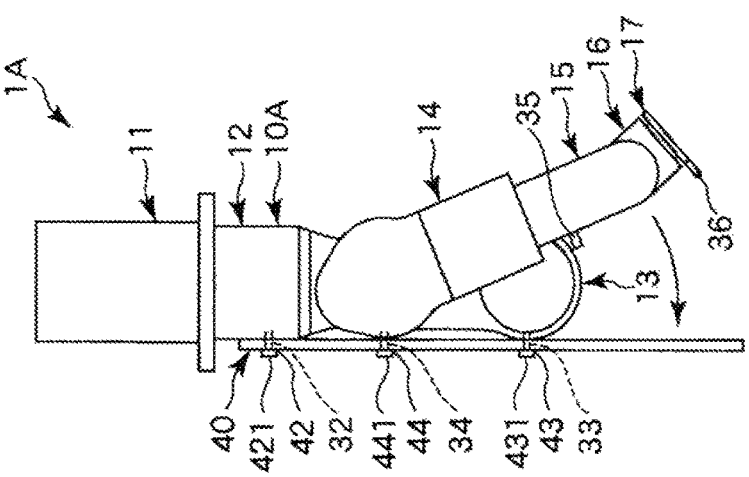
FIG. 19 is a schematic side view for explanation of the mechanical calibration of the robot shown in FIG. 16.
Figure 18:
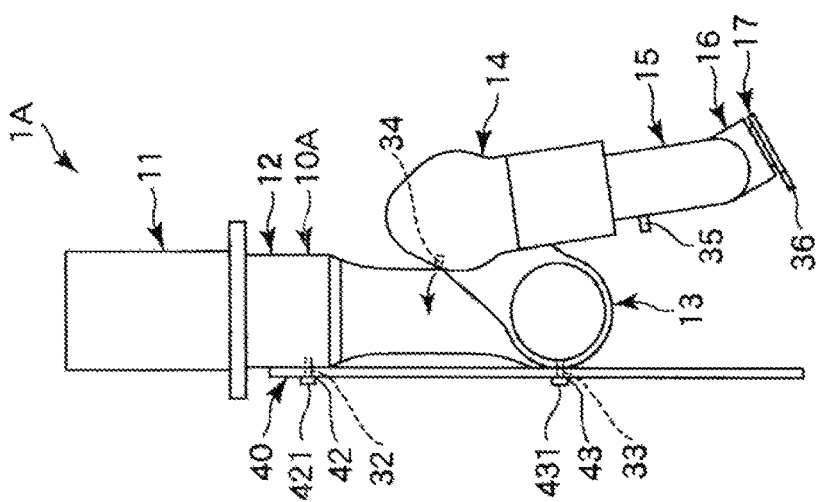
FIG. 18 is a schematic side view for explanation of mechanical calibration of the robot shown in FIG. 16.

FIG. 16 is a perspective view showing a robot according to the second embodiment of the invention. FIG. 17 is a perspective view showing a state in which a plate member is attached to the robot shown in FIG. 16. FIGS. 18, 19, and 20 are respectively schematic side views for explanation of mechanical calibration of the robot shown in FIG. 16.

The robot according to the embodiment is the same as that of the first embodiment except that the robot has attachment parts provided on the robot arm.

In the following description, the second embodiment will be explained with a focus on differences from the above described embodiment and the explanation of the same items will be omitted. Further, the same configurations as those of the above described first embodiment have the same signs in FIGS. 16 to 20.

A robot arm 10A of a robot 1A shown in FIG. 16 has an attachment mechanism 3 used for attachment of a plate member 40 to the robot arm 10A.

The attachment mechanism 3 is used for e.g. setting of origins (origins of the respective encoders) of the respective rotation axes (first rotation axis O1, second rotation axis O2, third rotation axis O3, fourth rotation axis O4, fifth rotation axis O5, and sixth rotation axis O6), the so-called mechanical calibration with the plate member 40 shown in FIG. 17.

TABLE 1

| | | | | | | | | | |
|---|---|---|---|---|---|---|---|---|---|
| Arm length L (L2 + L3) [mm] | 300 | 350 | 400 | 450 | 500 | 600 | 700 | 900 | 1000 |
| Length L2 [mm] | 100 | 120 | 135 | 160 | 185 | 228 | 278 | 378 | 428 |
| Length L3 [mm] | 200 | 230 | 260 | 290 | 315 | 372 | 422 | 522 | 572 |
| Width RJ2 [mm] | 100 | 100 | 110 | 110 | 110 | 140 | 140 | 140 | 140 |
| Hand diameter H [mm] | 80 | 98 | 126 | 140 | 140 | 140 | 140 | 140 | 140 |
| Maximum length R1 | 230 | 230 | 230 | 230 | 255 | 323 | 373 | 473 | 523 |
| Distance P1 | 5 | 6 | 7 | 8 | 9 | 11 | 14 | 19 | 21 |
| Distance Y | 5 | 5 | 5 | 5 | 5 | 4 | 4 | 4 | 5 |

TABLE 2

| | | | | | | | | | |
|---|---|---|---|---|---|---|---|---|---|
| Arm length L (L2 + L3) [mm] | 300 | 350 | 400 | 450 | 500 | 600 | 700 | 900 | 1000 |
| Length L2 [mm] | 90 | 120 | 140 | 160 | 185 | 228 | 278 | 378 | 428 |
| Length L3 [mm] | 210 | 230 | 260 | 290 | 315 | 372 | 422 | 522 | 572 |
| Width RJ2 [mm] | 30 | 30 | 50 | 50 | 50 | 70 | 70 | 70 | 70 |
| Hand diameter H [mm] | 190 | 189 | 166 | 184 | 182 | 186 | 180 | 170 | 166 |
| Maximum length R1 | 230 | 230 | 230 | 252 | 255 | 323 | 373 | 473 | 523 |
| Distance P1 | 5 | 6 | 7 | 8 | 9 | 11 | 14 | 19 | 21 |
| Distance Y | 5 | 5 | 5 | 5 | 5 | 5 | 5 | 5 | 5 |

"Arm length L" in Table 1 and Table 2 shows the total of the length L2 and the length L3. "Width RJ2" in Table 1 and Table 2 shows the width of the second connecting portion 1221 as shown in FIG. 15, and "RJ2/2" shows a length of a half of the width RJ2. "Hand diameter H" in Table 1 and Table 2 shows the maximum width of the hand 91 as shown in FIG. 15. "Maximum length R1" in Table 1 and Table 2 shows the maximum length of the first arm 12 from the first rotation axis O1 as seen from the axis direction of the first rotation axis O1. "Distance P1" in Table 1 and Table 2 shows a distance P1 (minimum distance) between the first arm 12

As shown in FIG. 16, the attachment mechanism 3 has an attachment part 30 provided in the flange 111 of the base 11, attachment parts 31, 32, 33, 34 provided in the robot arm 10A, and attachment parts 35, 36 detachably attached to the robot arm 10A.

The attachment part 30 is a through hole penetrating the lower surface and the upper surface of the flange 111. Note that, in the embodiment, the attachment part 30 is the through hole, however, may be e.g. a concave part opening in the side surface and the lower surface of the flange 111.

The attachment part 31 is a hole (concave part) formed in the upper surface of the first arm 12 and provided close to the motor 401M.

A rod-like member 41 shown in FIG. 17 can be inserted into the attachment parts 30, 31.

The attachment parts 32 are provided in the side surface (the front surface as seen from a direction of an arrow X in FIG. 16) of the first portion 121 of the first arm 12 and located close to the motor 401M. In the embodiment, two of the attachment parts 32 are formed. Further, the attachment part 33 is provided in the side surface (the front surface as seen from the direction of the arrow X in FIG. 16) of the second portion 122 of the first arm 12 and located close to the motor 402M.

Each of these two attachment parts 32 and attachment part 33 includes a convex portion projecting from the side surface of the first arm 12 and a hole (female screw) formed in the convex portion.

Further, the attachment part 34 is provided in the side surface of the distal end part of the second arm 13 and located close to the motor 403M. The attachment part 34 includes a convex portion projecting from the side surface of the second arm 13 and a hole (female screw) formed in the convex portion.

The attachment part 35 is a plate-like member having two convex portions 351. The attachment part 35 is attached to the fourth arm 15 so that the two convex portions 351 may project from the side surface (the front surface as seen from the direction of the arrow X in FIG. 16) of the fourth arm 15 and provided close to the motor 404M and the motor 405M. Further, holes (female screws) are formed in the convex portions 351.

The attachment part 36 is a plate-like member having two convex portions 361 like the attachment part 35. The attachment part 36 is attached to the sixth arm 17 so that the two convex portions 361 may project from the side surface (the front surface as seen from the direction of the arrow X in FIG. 16) of the fifth arm 16 and provided close to the motor 406M. Further, holes (female screws) are formed in the convex portions 361.

The attachment of the plate member 40 to the robot 1A having the attachment mechanism 3 with the configuration results in the state as shown in FIG. 17.

The plate member 40 is a reference plate used for e.g. mechanical calibration and a member that may be detachably attached to the robot arm 10A.

The plate member 40 has a plurality of holes 42, 43, 44, 45, 46 penetrating in the thickness direction thereof.

Two of the holes 42 are formed in the embodiment and the shapes and placements of the two holes 42 respectively correspond to the attachment parts 32. Similarly, the hole 43 corresponds to the attachment part 33 and the hole 44 corresponds to the attachment part 34. Further, similarly, two of the holes 45 are formed in the embodiment and the two holes 45 correspond to the convex portions 351. Furthermore, similarly, two of the holes 46 are formed in the embodiment and the two holes 46 correspond to the convex portions 361.

The plate member 40 may be opaque, for example, however, is preferably transparent, i.e., has light transmissivity. Thereby, the robot 1A may be visually recognized via the plate member 40.

As below, an example of the mechanical calibration will be explained. Note that the mechanical calibration is performed under a condition that driving of brakes of the respective arms 12 to 17 is stopped.

First, one end of the rod-like member 41 is inserted into the attachment part 30 and the other end is inserted into the attachment part 31. Thereby, the first arm 12 is positioned with respect to the base 11.

Then, as shown in FIG. 18, the plate member 40 is attached to the attachment parts 32, 33 provided in the first arm 12. In this regard, the plate member 40 is placed so that the holes 42 may correspond to the attachment parts 32 and the hole 43 may correspond to the attachment part 33. Further, the plate member 40 is attached by insertion and fastening of male screws 421 into the holes 42 and the holes of the attachment parts 32 and insertion and fastening (screwing) of a male screw 431 into the hole 43 and the hole of the attachment part 33.

Note that, before the plate member 40 is attached to the attachment parts 32, 33, the distal end part of the second arm 13 is placed in the position not in contact with the plate member 40 as shown in FIG. 18.

Then, as shown in FIG. 19, the second arm 13 is rotated about the second rotation axis O2 and the attachment part 34 provided in the distal end part of the second arm 13 is brought into contact with the plate member 40.

Then, the plate member 40 is attached to the attachment part 34. In this regard, the plate member 40 is placed so that the hole 44 may correspond to the attachment part 34. Further, the plate member 40 is attached by screwing using a male screw 441.

Note that, before the plate member 40 is attached to the attachment part 34, the proximal end part of the third arm 14, the fourth arm 15, the fifth arm 16, and the sixth arm 17 are placed in positions not in contact with the plate member 40 as shown in FIG. 19.

Then, as shown in FIG. 20, the third arm 14 is rotated about the third rotation axis O3 and the fourth arm 15 is rotated about the fourth rotation axis O4, and the attachment part 35 attached to the fourth arm 15 is brought into contact with the plate member 40.

Then, the plate member 40 is attached to the attachment part 35. In this regard, the plate member 40 is placed so that the holes 45 may correspond to the convex portions 351 of the attachment part 35. Further, the plate member 40 is attached by screwing using male screws 451.

Note that, before the plate member 40 is attached to the attachment part 35, the sixth arm 17 is placed in a position not in contact with the plate member 40 as shown in FIG. 20.

Then, the fifth arm 16 is rotated about the fifth rotation axis O5 and the sixth arm. 17 is rotated about the sixth rotation axis O6, and the attachment part 36 attached to the sixth arm 17 is brought into contact with the plate member 40.

Then, the plate member 40 is attached to the attachment part 36. In this regard, the plate member 40 is placed so that the holes 46 may correspond to the convex portions 361 of the attachment part 36. Further, the plate member 40 is attached by screwing using male screws 461.

As described above, the respective arms 12 to 16 are sequentially brought into contact to follow the plate member 40. Thereby, as shown in FIG. 17, the plate member 40 is attached to the robot arm 10A.

Then, the origins (zero points) of the respective encoders with respective motors 401M, 402M, 403M, 404M, 405M, and 406M are set. Thereby, the origins of the respective rotation axes are set.

The setting of the origins (zero points) of the respective encoders is ended, and then, the plate member 40 and the attachment parts 35, 36 are detached from the robot 1A.

In the above described manner, the mechanical calibration of the robot 1A ends.

As described above, the robot arm 10A has the attachment parts 32 to 36 to which the plate member can be attached, and thereby, the plate member 40 used for the setting of the origins of the respective rotation axes (the origins of the respective encoders) may be attached to the robot arm 10A. Particularly, the attachment parts 32 to 36 have the holes (female screws), and thereby, the plate member 40 may be attached by the relatively simple method of screwing.

Further, the mechanical calibration may be performed by the single plate member 40 brought into contact with the robot arm 10A, and thereby, accuracy of the calibration may be improved.

Furthermore, as described above, the plate member 40 has light transmissivity, and thereby, in the mechanical calibration, the correspondence relationships between the plurality of holes 42, 43, 44, 45, 46 and the attachment parts 32, 33, 34, 35, 36 are easily recognized. Accordingly, the plate member 40 may be easily attached to the robot arm 10A, and thereby, the mechanical calibration may be rapidly performed.

According to the robot 1A, the space for preventing interferences of the robot 1A may be made smaller.

Third Embodiment

Robot System

Figure 21:
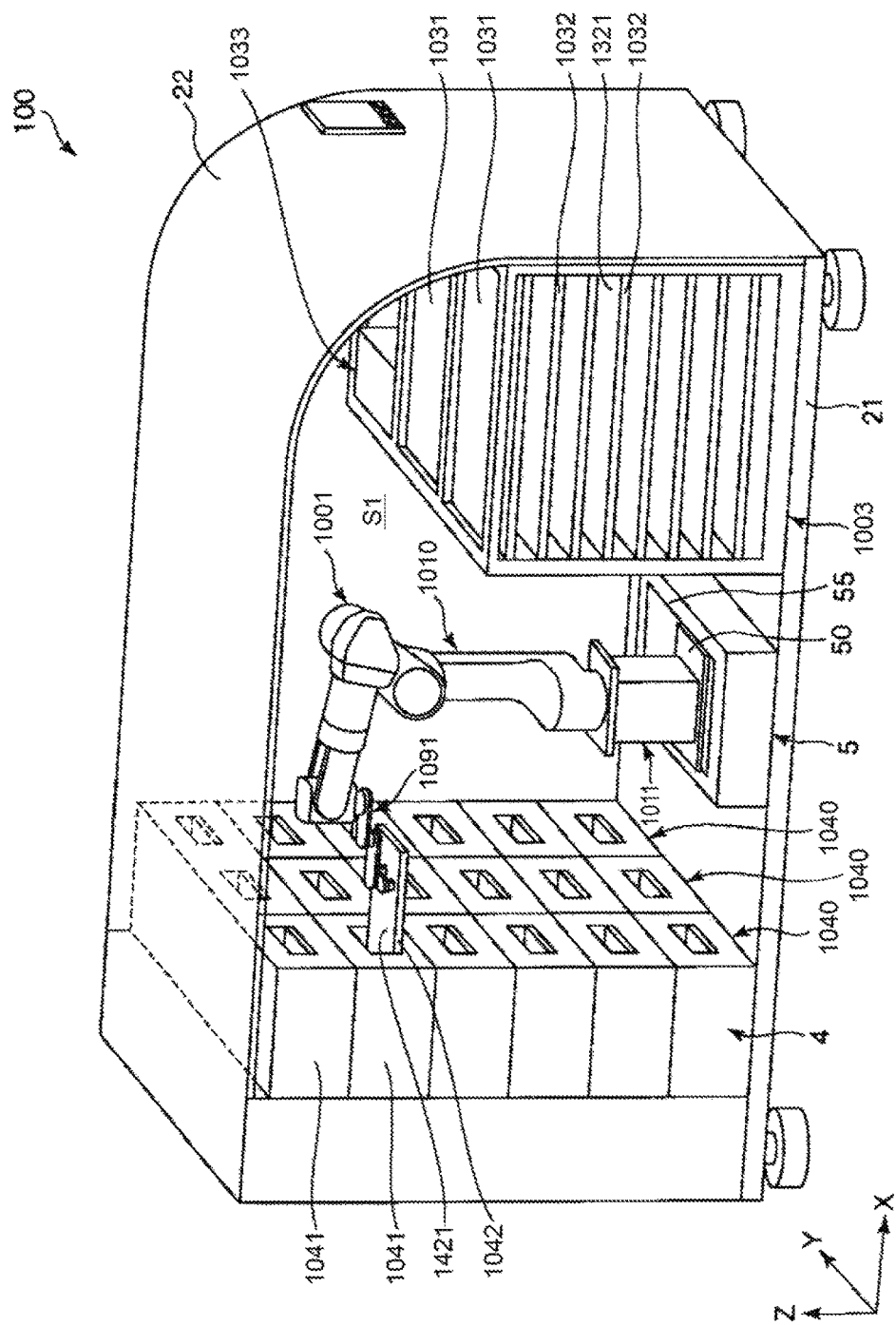
FIG. 21 is a perspective view showing a robot system according to a third embodiment of the invention.
Figure 22:
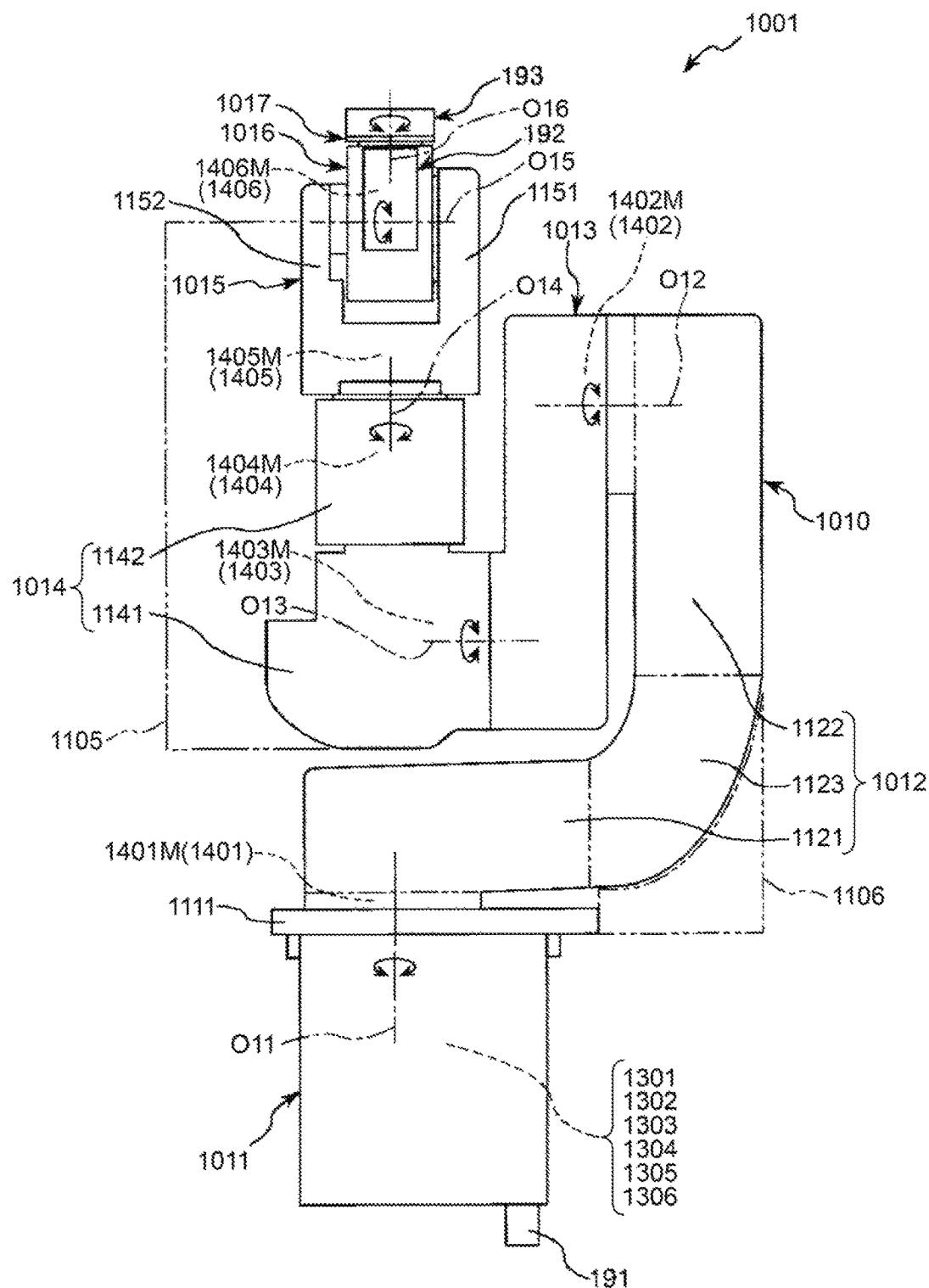
FIG. 22 is a schematic front view of the robot shown in FIG. 21.
Figure 23:
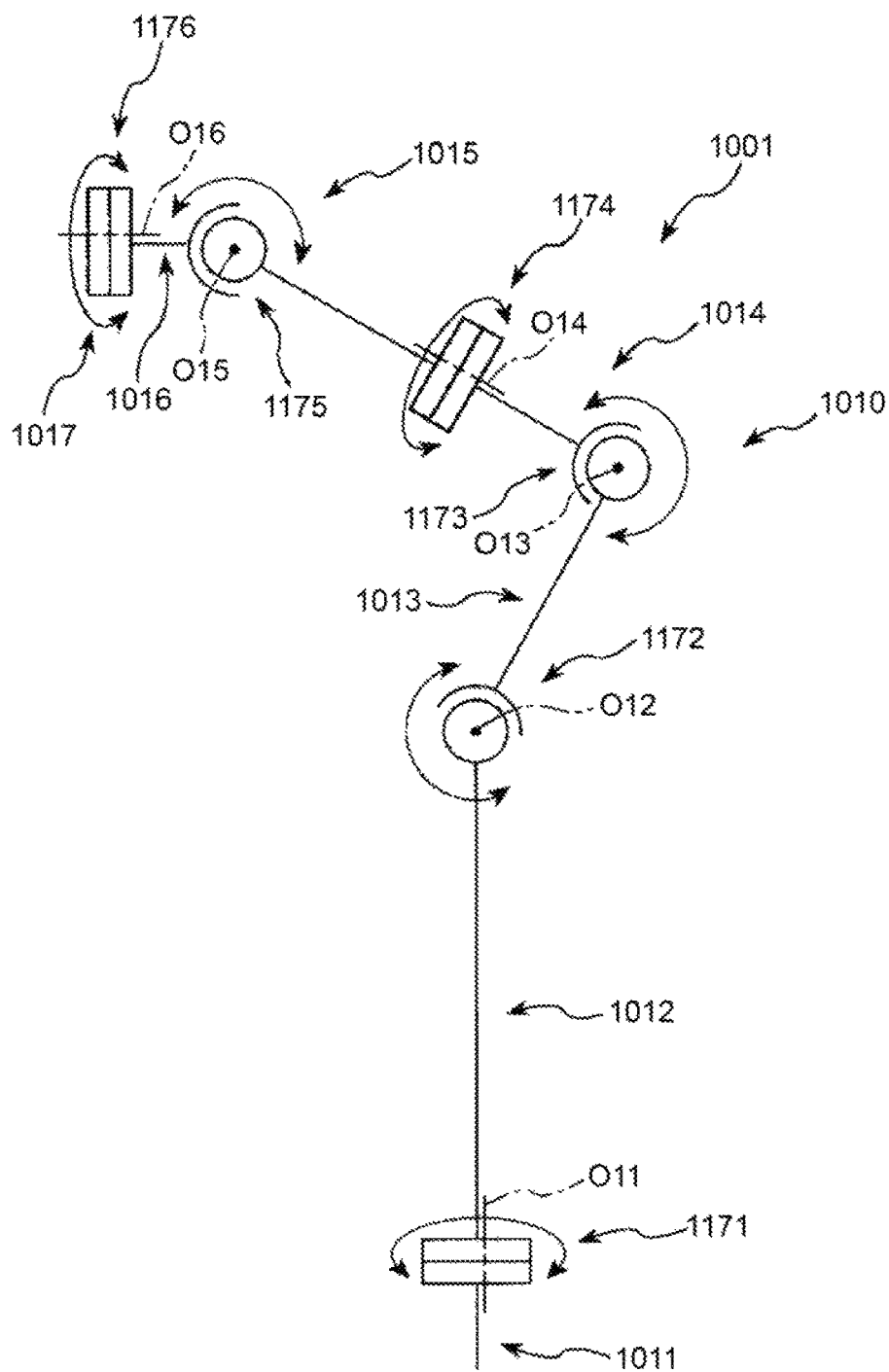
FIG. 23 is a schematic view of the robot shown in FIG. 21.

FIG. 21 is a perspective view showing a robot system according to the third embodiment of the invention. FIG. 22 is a schematic front view of the robot shown in FIG. 21. FIG. 23 is a schematic view of the robot shown in FIG. 21.

Hereinafter, for convenience of explanation, the upside in FIGS. 21 and 22 is referred to as "up" or "upper" and the downside is referred to as "low" or "lower". Further, the base side in FIGS. 21 and 22 is referred to as "proximal end" or "upstream" and the opposite side (the hand side) is referred to as "distal end" or "downstream".

In FIG. 21, for convenience of explanation, an X-axis, a Y-axis, and a Z-axis as three axes orthogonal to one another are shown by arrows, and the tip end sides of the arrows are "+(plus)" and the base end sides are "− (minus)". Further, hereinafter, directions in parallel to the X-axis are referred to as "X-axis directions", directions in parallel to the Y-axis are referred to as "Y-axis directions", and directions in parallel to the Z-axis are referred to as "Z-axis directions".

The XY-plane containing the X-axis and the Y-axis is horizontal and the Z-axis is vertical. Here, "horizontal" in the specification is not limited to the completely horizontal state, but includes inclined states within a range of 5° or less with respect to the horizontal state. Further, "vertical" in the specification is not limited to the completely vertical state, but includes inclined states within a range of 5° or less with respect to the vertical state.

The robot system 100 shown in FIG. 21 is an apparatus capable of performing inspections of objects used in an inspection process of inspecting objects including electronic components and electronic apparatuses or the like, for example.

The electronic components are components used for various electronic apparatuses including e.g. active components such as diodes and transistors, passive components such as capacitors, functional components such as packages and substrates, and components with combinations of those components (e.g. GPS (Global Positioning System) module substrates, SiP (System in Package) devices), etc. Further, the electronic apparatuses include e.g. personal computers, cell phones (including multifunctional cell phones (smartphones)), watches (e.g. GPS-equipped watches etc.), cameras, game machines, etc. Furthermore, the inspections of objects include e.g. voice inspections, image inspections, continuity inspections (electrical inspections), communication inspections, appearance inspections, functional inspections for checking drive statuses of respective parts of vibrators, sensors, etc.

As shown in FIG. 21, the robot system 100 has a base member 21, a cover member 22 (safety cover), a supply apparatus 1003 (work apparatus), an inspection apparatus 4, a robot 1001, and a movement mechanism 5. In the robot system 100 of the embodiment, the supply apparatus 1003, the robot 1001, and the inspection apparatus 4 are arranged from the +X-axis direction side toward the −X-axis direction side in this order. Further, the movement mechanism 5 is provided between the robot 1001 and the base member 21 and supports the robot 1001 from the lower side.

As below, the respective parts of the robot system 100 will be sequentially explained.

Base and Cover Members

The base member 21 supports the supply apparatus 1003, the inspection apparatus 4, the robot 1001, and the movement mechanism 5, and the cover member 22 has a function of protecting the supply apparatus 1003, the inspection apparatus 4, the robot 1001, and the movement mechanism 5.

As shown in FIG. 21, the supply apparatus 1003, the inspection apparatus 4, and the movement mechanism 5 supporting the robot 1001 are placed on the upper surface of the base member 21. Further, the cover member 22 is placed on the upper side of the base member 21 to cover the supply apparatus 1003, the inspection apparatus 4, the robot 1001, and the movement mechanism 5. Thereby, the supply apparatus 1003, the inspection apparatus 4, the robot 1001, and the movement mechanism 5 are housed within a space S1 surrounded by the base member 21 and the cover member 22. Note that, in FIG. 21, illustration of a part (surface) of the cover member 22 on the −Y-axis direction side is omitted.

Furthermore, doors or the like (not shown) that enable access to the supply apparatus 1003, the inspection apparatus 4, the robot 1001, and the movement mechanism 5 are provided in the cover member 22. For example, a door or the like that enables access to the supply apparatus 1003 is provided on the +X-axis direction side of the cover member 22.

Supply Apparatus

The supply apparatus 1003 is e.g. an apparatus to which a worker supplies objects. Further, the supply apparatus 1003 is a mounting apparatus on which the supplied objects are mounted, and furthermore, supply units 1031 function as housing devices that houses the objects.

As shown in FIG. 21, the supply apparatus 1003 has a plurality (three in the embodiment) of the supply units 1031 (work units) arranged in the Y-axis direction. Each of the plurality of supply units 1031 has a plurality of supply plates 1032 stacked in the Z-axis direction. A plurality of objects may be mounted on the supply plate 1032, and the upper surface of the supply plate 1032 functions as a mounting surface 1321 on which the plurality of objects are mounted.

The plurality of supply plates 1032 are detachably provided and the worker may place the supply plate 1032 from the door (not shown) provided on the +X-axis direction side of the cover member 22 into the supply unit 1031 or take out the supply plate 1032 from the supply unit 1031.

Further, in the embodiment, a tool changer 1033 is provided in the supply unit 1031 on the +Y-axis direction side. In the tool changer 1033, various end effectors to be attached to the robot 1001, which will be described later, are prepared.

As above, the supply apparatus 1003 is explained. Note that, in the embodiment, the supply apparatus 1003 is provided fixedly to the base member 21, however, the supply apparatus 1003 may include a conveyor (not shown) movable in the Y-axis direction, for example, or the supply apparatus 1003 may be adapted to move inside and outside of the space S1.

Inspection Apparatus

The inspection apparatus 4 (mounting apparatus) is an apparatus on which objects may be mounted and the mounted objects are inspected.

The inspection apparatus 4 includes a plurality of inspection units 1041 that inspect objects and an inspection unit control apparatus (not shown) that controls the respective inspection units 1041. The inspection unit control apparatus may be formed using e.g. a personal computer (PC) containing a CPU (Central Processing Unit) or the like. Note that the inspection unit control apparatus may be built in the inspection apparatus 4 or separately provided from the inspection apparatus 4.

As shown in FIG. 21, the plurality of inspection units 1041 are provided in a matrix form in which the units are arranged in the Y-axis direction (the direction different from the direction in which the robot 1001 and the inspection apparatus 4 are arranged in the horizontal directions) and the Z-axis direction. That is, a plurality (three in the embodiment) of inspection rows 1040 having the plurality (six in the embodiment) of inspection units 1041 arranged in the Z-axis direction are arranged in the Y-axis direction.

As described above, in the inspection apparatus 4, the plurality of inspection units 1041 are not only arranged in the Y-axis direction (horizontal direction) but also stacked in the Z-axis direction (vertical direction). Accordingly, the installation area of the inspection apparatus 4 in the XY-plane may be made smaller by the number of inspection units 1041 stacked in the Z-axis direction.

Further, each of the plurality of inspection units 1041 has an inspection chamber (concave part) opening toward the +X-axis direction side, and a mounting plate 1042 is provided within the inspection chamber. The mounting plate 1042 protrudes from inside of the inspection chamber toward the robot 1001 side and recedes into the inspection chamber under the control of the inspection unit control apparatus. That is, the mounting plate 1042 is movable in the X-axis direction.

The upper surface of the mounting plate 1042 is a mounting surface 1421 parallel to the XY-plane on which objects may be mounted. The objects mounted on the mounting surface 1421 are inspected in the inspection unit 1041 after the mounting plate 1042 recedes into the inspection chamber.

In the plurality of inspection units 1041, different kinds of inspections are performed on the objects. That is, in the robot system 100 of the embodiment, a plurality of inspections in the number corresponding to the number of inspection units 1041 can be performed on the objects.

As above, the inspection apparatus 4 is explained. Note that, in the embodiment, the mounting plate 1042 is a plate-like member having the mounting surface 1421 parallel to the XY-plane, however, the configuration of the mounting plate 1042 is not particularly limited as long as the configuration may support or mount objects. For example, the mounting plate 1042 may have a configuration that supports objects by sandwiching.

In the embodiment, the inspection apparatus 4 has the 18 inspection units 1041, however, the number of inspection units 1041 is arbitrary more than one. Further, in the embodiment, the 18 inspection units 1041 are arranged in the matrix form with six rows in the Z-axis direction and three columns in the Y-axis direction, however, the respective numbers of rows and columns of the inspection units 1041 are arbitrary.

In the embodiment, the mounting plate 1042 is adapted to move under the control of the inspection unit control apparatus, however, for example, a lever (not shown) that moves the mounting plate 1042 may be provided in the inspection apparatus 4 and the worker or the robot 1001 may operate the lever.

Robot

The robot 1001 may perform works of feeding, removing, carrying, etc. of objects and, for example, select and feed the objects from the supply apparatus 1003, carry the objects to the inspection apparatus 4, and mount the objects on the inspection apparatus 4.

As shown in FIG. 22, the robot 1001 has a base 1011 and a robot arm 1010. The robot arm 1010 includes a first arm 1012 (n-th arm), a second arm 1013 ((n+1)th arm), a third arm 1014, a fourth arm 1015, a fifth arm 1016, and a sixth arm 1017 (six arms). That is, the robot 1001 is a vertical articulated (six-axis) robot in which the base 1011, the first arm 1012, the second arm 1013, the third arm 1014, the fourth arm 1015, the fifth arm 1016, and the sixth arm 1017 are sequentially coupled from the proximal end side toward the distal end side. As shown in FIG. 21, an end effector such as a hand 1091 that grasps an object may be detachably attached to the distal end of the sixth arm 1017. Further, as shown in FIG. 22, the robot 1001 includes a first drive source 1401, a second drive source 1402, a third drive source 1403, a fourth drive source 1404, a fifth drive source 1405, and a sixth drive source 1406 (six drive sources).

Furthermore, the robot 1001 has an imaging unit 192 and a force detector 193 provided in the distal end part of the robot arm 1010.

In addition, the robot 1001 includes a robot control apparatus (control unit) (not shown) that controls actions of the respective parts of the robot 1001. The robot control apparatus may be formed using e.g. a personal computer (PC) containing a CPU (Central Processing Unit) or the like. Note that the robot control apparatus may be built in the robot 1001 or provided separately from the robot 1001.

Hereinafter, the first arm 1012, the second arm 1013, the third arm 1014, the fourth arm 1015, the fifth arm 1016, and the sixth arm 1017 are respectively also referred to as "arm". The first drive source 1401, the second drive source 1402, the third drive source 1403, the fourth drive source 1404, the fifth drive source 1405, and the sixth drive source 1406 are respectively also referred to as "drive source (drive unit)".

Base

As shown in FIG. 22, the base 1011 is a part located lowermost in the robot 1001 as the so-called floor-standing vertical articulated robot and fixed (member attached) to the movement mechanism 5 in the embodiment. Further, in the embodiment, the base 1011 has a plate-like flange 1111 provided in the upper part thereof. Furthermore, a connector 191 (connecting part) that connects various wires etc. is provided under the base 1011.

Robot Arm

The robot arm 1010 shown in FIG. 22 is rotatably supported with respect to the base 1011 and the arms 1012 to 1017 are respectively supported to be independently displaceable with respect to the base 1011.

The first arm 1012 has a curving or bending shape. The first arm 1012 has a first portion 1121 provided on the base 1011 and extending in the horizontal direction (first direction), a second portion 1122 provided on the second arm 1013 and extending in the vertical direction (second direction different from the first direction), and a third portion 1123 located between the first portion 1121 and the second portion 1122 and extending in a direction tilted with respect to the horizontal direction and the vertical direction (direction different from the first direction and the second direction). More specifically, the first arm 1012 has the first portion 1121 connected to the base 1011 and extending upward in the vertical direction from the base 1011 and extending in the horizontal direction, the third portion 1123 extending upward in the vertical direction while inclining from an opposite end of the first portion 1121 to the connecting part to the base 1011 in a direction away from the first portion 1121, and the second portion 1122 extending upward in the vertical direction from the distal end of the third portion 1123. These first portion 1121, second portion 1122, and third portion 1123 are integrally formed. Further, the first portion 1121 and the second portion 1122 are nearly orthogonal (crossing) as seen from the near side of the paper surface of FIG. 22 (in a front view orthogonal to both a first rotation axis O11 and a second rotation axis O12, which will be described later).

The second arm 1013 has a longitudinal shape and is connected to the distal end of the first arm. 1012 (the opposite end of the second portion 1122 to the third portion 1123).

The third arm 1014 has a longitudinal shape and is connected to the opposite end of the second arm 1013 to the end to which the first arm 1012 is connected. The third arm 1014 has a first portion 1141 connected to the second arm 1013 and extending from the second arm 1013 in the horizontal direction and a second portion 1142 extending from the first portion 1141 in the vertical direction. These first portion 1141 and second portion 1142 are integrally formed. Further, the first portion 1141 and the second portion 1142 are nearly orthogonal (crossing) as seen from the near side of the paper surface of FIG. 22 (in a front view orthogonal to both a third rotation axis O13 and a fourth rotation axis O14, which will be described later).

The fourth arm 1015 is connected to the opposite end of the third arm 1014 to the end to which the second arm 1013 is connected. The fourth arm 1015 has a pair of supporting portions 1151, 1152 opposed to each other. The supporting portions 1151, 1152 are used for connection to the fifth arm 1016.

The fifth arm 1016 is located between the supporting portions 1151, 1152 and connected to the supporting portions 1151, 1152, and thereby, coupled to the fourth arm 1015. Note that the structure of the fourth arm 1015 is not limited to the structure, but may have a single supporting portion (cantilever), for example.

The sixth arm 1017 has a flat plate shape and is connected to the distal end of the fifth arm 1016. Further, the hand 1091 is detachably attached to the distal end of the sixth arm 1017 (the opposite end to the fifth arm 1016) (see FIG. 21). As shown in FIG. 21, in the embodiment, the hand 1091 having two finger portions that may grasp an object is used. Note that, in the embodiment, the hand 1091 is used as the end effector, however, the end effector may have any configuration that may grasp, suction, support an object, for example.

Each of the exteriors (the members forming the outer shapes) of the above described respective arms 1012 to 1017 may be formed by a single member or a plurality of members.

Next, referring to FIG. 23, the drive sources 1401 to 1406 with driving of the arms 1012 to 1017 will be explained.

As shown in FIG. 23, the base 1011 and the first arm 1012 are coupled via a joint (connecting part) 1171. The base 1011 may include the joint 1171 or not.

The joint 1171 has a mechanism that rotatably supports the first arm 1012 coupled to the base 1011 with respect to the base 1011. Thereby, the first arm 1012 is rotatable around the first rotation axis O11 (n-th rotation axis) in parallel to the vertical direction (about the first rotation axis O11) with respect to the base 1011. The first rotation axis O11 is a rotation axis on the most upstream side of the robot 1001. The rotation about the first rotation axis O11 is performed by driving of the first drive source 1401 having a motor 1401M. Further, the motor 1401M is electrically connected to a motor driver 1301 via a cable (not shown) and controlled by a control unit (not shown) via the motor driver 1301. Note that the first drive source 1401 may be adapted to transmit the drive power from the motor 1401M by a reducer (not shown) provided with the motor 1401M, or the reducer may be omitted.

The first arm 1012 and the second arm 1013 are coupled via a joint (connecting part) 1172. The joint 1172 has a mechanism that rotatably supports one of the first arm 1012 and the second arm 1013 coupled to each other with respect to the other. Thereby, the second arm 1013 is rotatable around the second rotation axis O12 ((n+1)th rotation axis) in parallel to the vertical direction (about the second rotation axis O12) with respect to the first arm 1012. The second rotation axis O12 is orthogonal to the first rotation axis O11. The rotation about the second rotation axis O12 is performed by driving of the second drive source 1402 having a motor 1402M. Further, the motor 1402M is electrically connected to a motor driver 1302 via a cable (not shown) and controlled by a control unit (not shown) via the motor driver 1302. Note that the second drive source 1402 may be adapted to transmit the drive power from the motor 1402M by a reducer (not shown) provided with the motor 1402M, or the reducer may be omitted. The second rotation axis O12 may be parallel to an axis orthogonal to the first rotation axis O11, or the second rotation axis O12 may be different in axis direction from the first rotation axis O11, not orthogonal thereto.

The second arm 1013 and the third arm 1014 are coupled via a joint (connecting part) 1173. The joint 1173 has a mechanism that rotatably supports one of the second arm 1013 and the third arm 1014 coupled to each other with respect to the other. Thereby, the third arm 1014 is rotatable around the third rotation axis O13 in parallel to the horizontal direction (about the third rotation axis O13) with respect to the second arm 1013. The third rotation axis O13 is parallel to the second rotation axis O12. The rotation about the third rotation axis O13 is performed by driving of the third drive source 1403 having a motor 1403M. Further, the motor 1403M is electrically connected to a motor driver 1303 via a cable (not shown) and controlled by a control unit (not shown) via the motor driver 1303. Note that the third drive source 1403 may be adapted to transmit the drive power from the motor 1403M by a reducer (not shown) provided with the motor 1403M, or the reducer may be omitted.

The third arm 1014 and the fourth arm 1015 are coupled via a joint (connecting part) 1174. The joint 1174 has a mechanism that rotatably supports one of the third arm 1014 and the fourth arm 1015 coupled to each other with respect to the other. Thereby, the fourth arm 1015 is rotatable around the fourth rotation axis O14 in parallel to the center axis direction of the third arm 1014 (about the fourth rotation axis O14) with respect to the third arm 1014. The fourth rotation axis O14 is orthogonal to the third rotation axis O13. The rotation about the fourth rotation axis O14 is performed by driving of the fourth drive source 1404 having a motor 1404M. Further, the motor 1404M is electrically connected to a motor driver 1304 via a cable (not shown) and controlled by a control unit (not shown) via the motor driver 1304. Note that the fourth drive source 1404 may be adapted to transmit the drive power from the motor 1404M by a reducer (not shown) provided with the motor 1404M, or the reducer may be omitted. The fourth rotation axis O14 may be parallel to an axis orthogonal to the third rotation axis O13, or the fourth rotation axis O14 may be different in axis direction from the third rotation axis O13, not orthogonal thereto.

The fourth arm 1015 and the fifth arm 1016 are coupled via a joint (connecting part) 1175. The joint 1175 has a mechanism that rotatably supports one of the fourth arm 1015 and the fifth arm 1016 coupled to each other with respect to the other. Thereby, the fifth arm 1016 is rotatable around a fifth rotation axis O15 orthogonal to the center axis direction of the fourth arm. 1015 (about the fifth rotation axis O15) with respect to the fourth arm 1015. The fifth rotation axis O15 is orthogonal to the fourth rotation axis O14. The rotation about the fifth rotation axis O15 is performed by driving of the fifth drive source 1405 having a motor 1405M. Further, the motor 1405M is electrically connected to a motor driver 1305 via a cable (not shown) and controlled by a control unit (not shown) via the motor driver 1305. Note that the fifth drive source 1405 may be adapted to transmit the drive power from the motor 1405M by a reducer (not shown) provided with the motor 1405M, or the reducer may be omitted. The fifth rotation axis O15 may be parallel to an axis orthogonal to the fourth rotation axis O14, or the fifth rotation axis O15 may be different in axis direction from the fourth rotation axis O14, not orthogonal thereto.

The fifth arm 1016 and the sixth arm 1017 are coupled via a joint (connecting part) 1176. The joint 1176 has a mechanism that rotatably supports one of the fifth arm 1016 and the sixth arm 1017 coupled to each other with respect to the other. Thereby, the sixth arm 1017 is rotatable around a sixth rotation axis O16 (about the sixth rotation axis O16) with respect to the fifth arm 1016. The sixth rotation axis O16 is orthogonal to the fifth rotation axis O15. The rotation about the sixth rotation axis O16 is performed by driving of the sixth drive source 1406 having a motor 1406M. Further, the motor 1406M is electrically connected to a motor driver 1306 via a cable (not shown) and controlled by a control unit (not shown) via the motor driver 1306. Note that the sixth drive source 1406 may be adapted to transmit the drive power from the motor 1406M by a reducer (not shown) provided with the motor 1406M, or the reducer may be omitted. The sixth rotation axis O16 may be parallel to an axis orthogonal to the fourth rotation axis O14, the sixth rotation axis O16 may be parallel to an axis orthogonal to the fifth rotation axis O15, or the sixth rotation axis O16 may be different in axis direction from the fifth rotation axis O15, not orthogonal thereto.

The robot 1001 driving in the above described manner controls the actions of the respective arms 1012 to 1017 etc. while grasping an object with the hand 1091 connected to the distal end of the sixth arm 1017, and thereby, may perform works including carrying of the object. The driving of the hand 1091 is controlled by the robot control apparatus.

Imaging Unit

The imaging unit 192 has a function of imaging e.g. an object grasped by the hand 1091, the inspection units 1041, the supply units 1031, etc.

The imaging unit 192 includes e.g. an imaging device such as a CCD, and is attached to the fifth arm 1016 for imaging in the distal end direction of the fifth arm 1016 as shown in FIG. 22. Further, imaging data imaged by the imaging unit 192 is input to the robot control apparatus.

For example, an object, the inspection units 1041, etc. are imaged by the imaging unit 192, and the robot 1001 may precisely select and feed a target object from the supply plate 1032 using the hand 1091 based on the imaging data. Further, the outer shape and the position of the object are measured, and thereby, the object may be fed to an accurate position without interferences with peripheral components. Furthermore, the work of mounting the fed object on the predetermined mounting surface 1421 may be properly performed.

Force Detector

The force detector 193 has a function of detecting an external force applied to the hand 1091.

As shown in FIG. 22, the force detector 193 is provided on the distal end of the sixth arm 1017. The force detector 193 includes e.g. a force sensor that detects forces in the respective axis directions and forces (moment) about the respective axes of three axes (x-axis, y-axis, z-axis) orthogonal to one another, and has e.g. a piezoelectric device (not shown) that outputs electric charge according to the applied external force. Further, the signal output from the force detector 193 is input to the robot control apparatus.

For example, the contact state of the hand 1091 with the object is detected by the force detector 193, and thereby, the robot 1001 may grasp the object with a proper grasping force based on the detection result (signal).

As above, the simple configuration of the robot 1001 is explained. The robot 1001 having the configuration is the vertical articulated robot having the six (plurality of) arms 1012 to 1017 as described above, and thereby, the drive range is wider and higher workability may be exerted.

For example, the robot 1001 has the plurality of arms 1012 to 1017 and may arbitrarily change the attitude of the distal end of the robot arm 1010. Accordingly, the robot 1001 arbitrarily changes the attitude of the distal end of the robot arm 1010 according to the shapes, the placements, etc. of the objects, and thereby, may perform works of selecting and feeding a target object from the supply unit 1031 by the hand 1091 and mounting the object to a target inspection unit 1041 etc.

Further, the robot 1001 has the plurality of arms 1012 to 1017 and may move the distal end of the robot arm 1010 in the respective directions of the directions in parallel to the XY-plane (horizontal directions) and the Z-axis directions (vertical directions). Accordingly, the robot 1001 may move the distal end of the robot arm 1010 closer to the plurality of inspection units 1041 arranged in the respective directions of the directions in parallel to the XY-plane and the Z-axis directions. Thereby, the robot 1001 may place objects for the more inspection units 1041 by the hand 1091.

Furthermore, as described above, in the robot 1001, the proximal end side of the first arm 1012 is attached to the base 1011, and thereby, the respective arms 1012 to 1017 may be rotated with respect to the base 1011. In addition, in the embodiment, the robot 1001 is the so-called floor-standing robot and the work range of the robot 1001 above the robot 1001 in the vertical direction may be made wider.

Next, referring to FIGS. 24 to 31, the relationships among the respective arms 1012 to 1017 of the robot 1001 will be explained.

Figure 24:
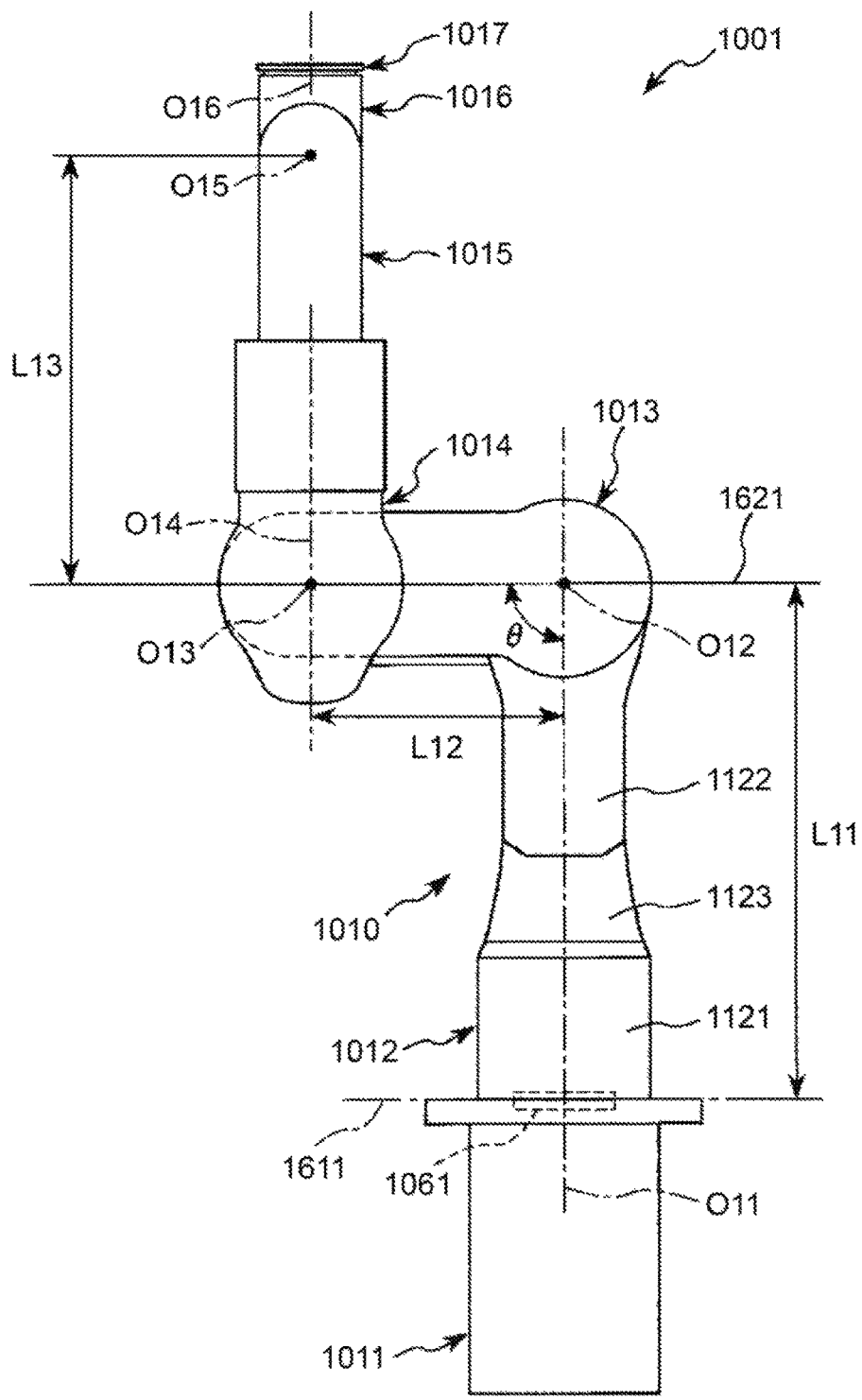
FIG. 24 is a schematic side view of a state in which a first arm, a second arm, and a third arm of the robot shown in FIG. 21 do not overlap.
Figure 25:
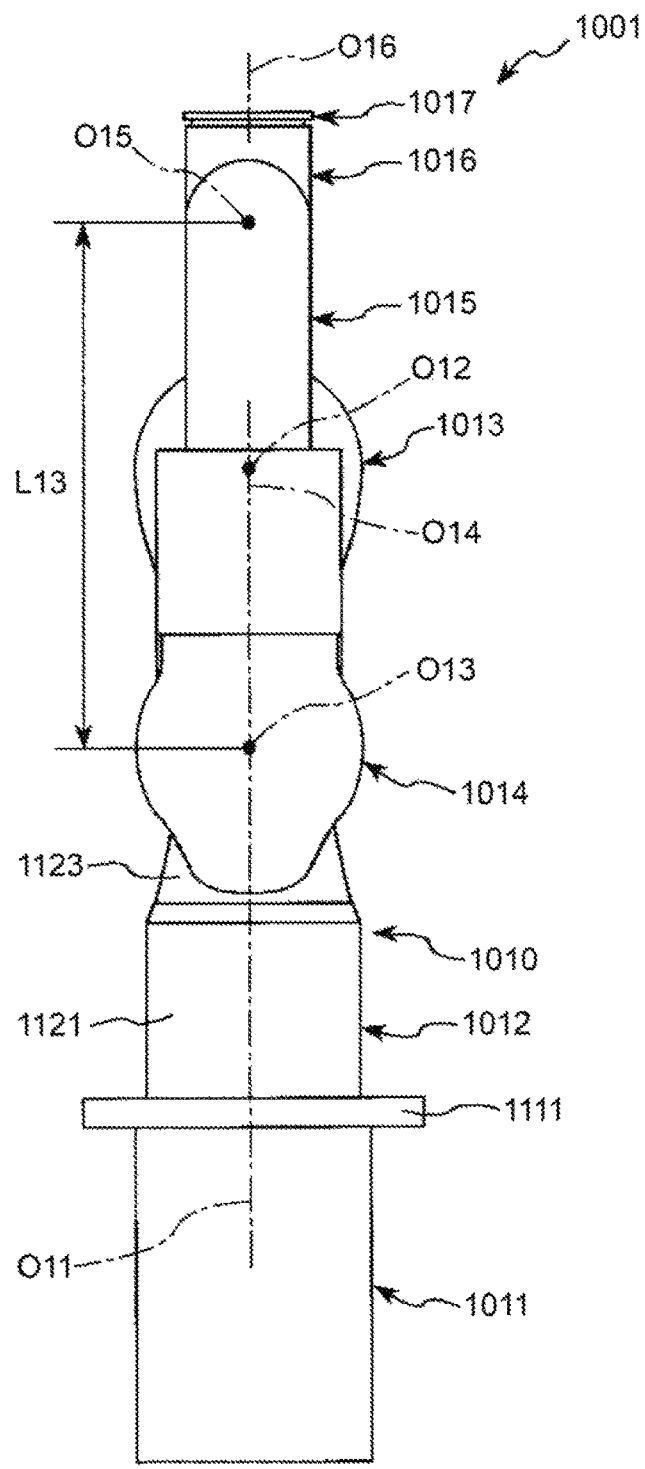
FIG. 25 is a schematic side view of a state in which the first arm, the second arm, and the third arm of the robot shown in FIG. 21 overlap.
Figure 26D:
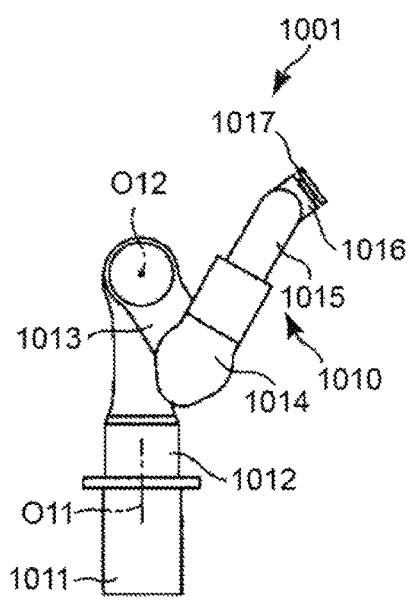
Figure 26E:
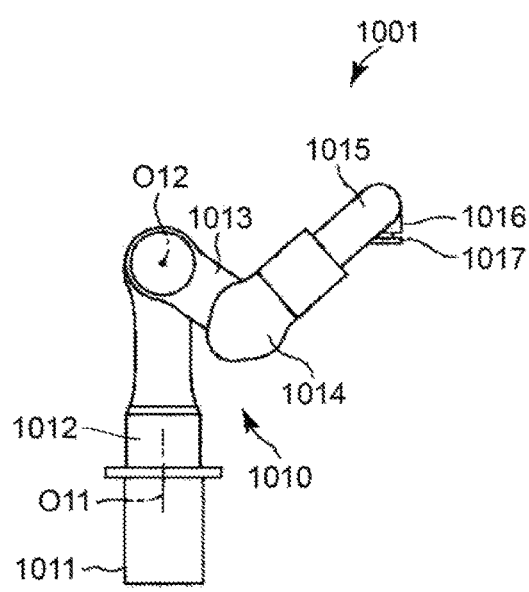
Figure 27:
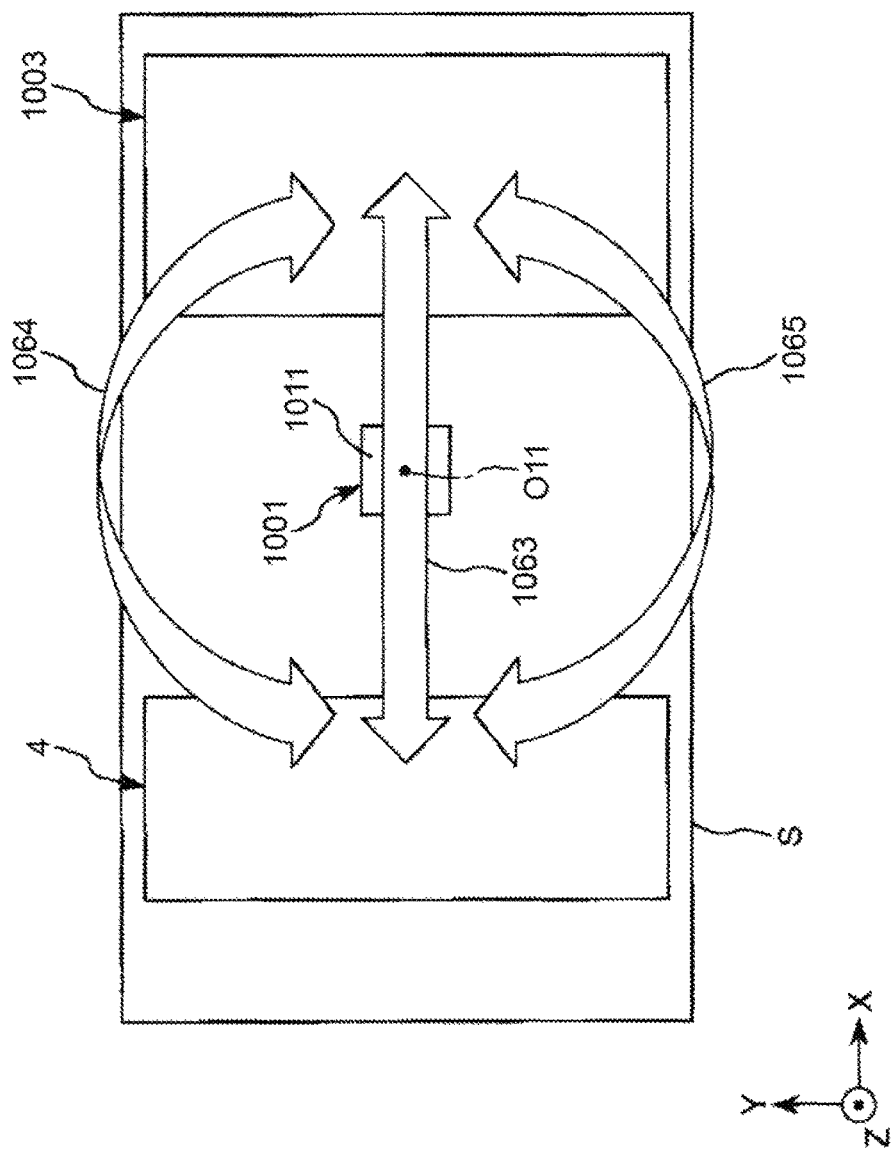
FIG. 27 shows movement paths of a hand in the actions of the robot shown in FIGS. 26A to 26E.
Figure 28:
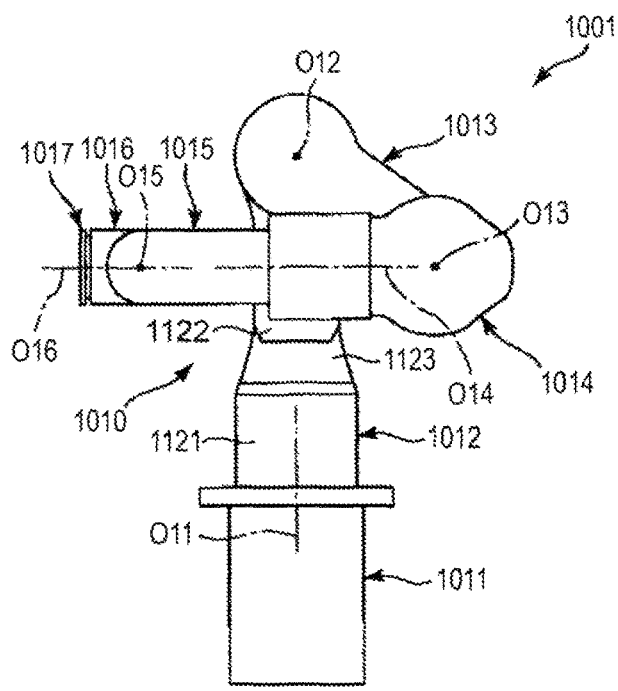
FIG. 28 is a schematic side view of a state in which the first arm and the third arm of the robot shown in FIG. 21 cross.
Figure 29:
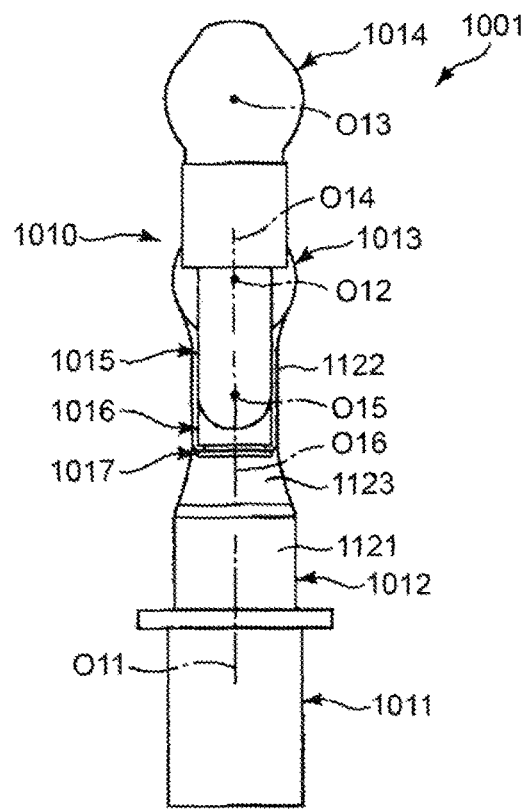
FIG. 29 is a schematic side view of a state in which the first arm and the third arm of the robot shown in FIG. 21 overlap.
Figure 30:
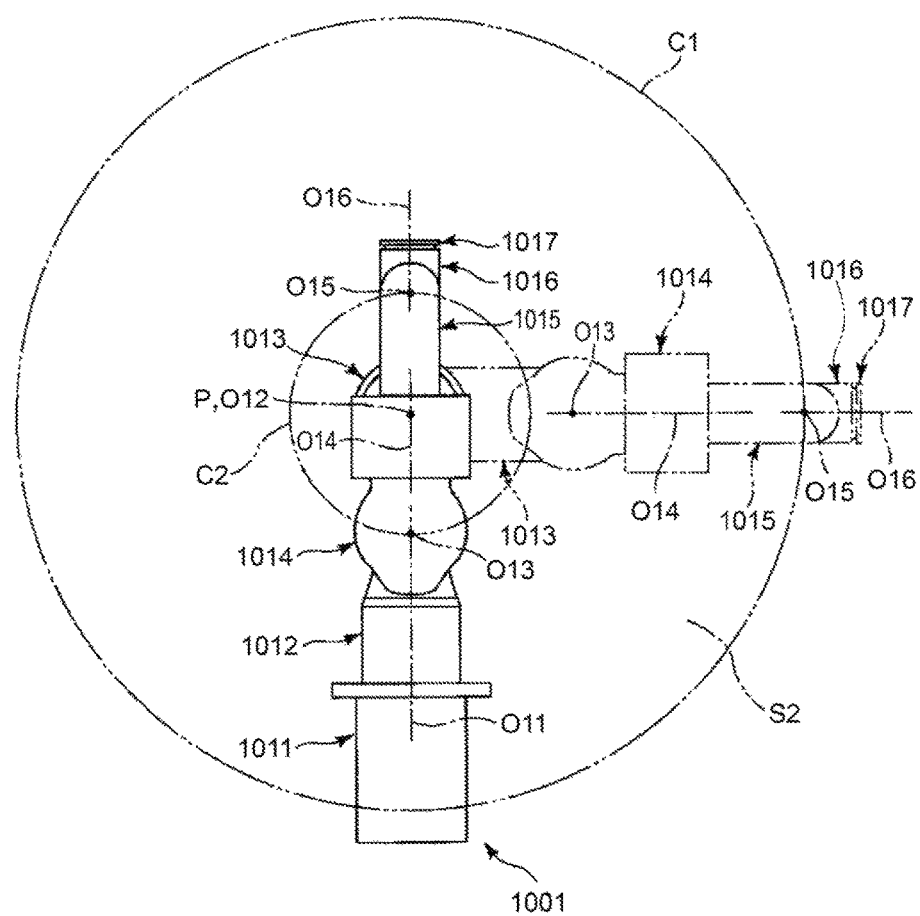
FIG. 30 is a diagram for explanation of a movable range of a distal end of the robot shown in FIG. 21.
Figure 31:
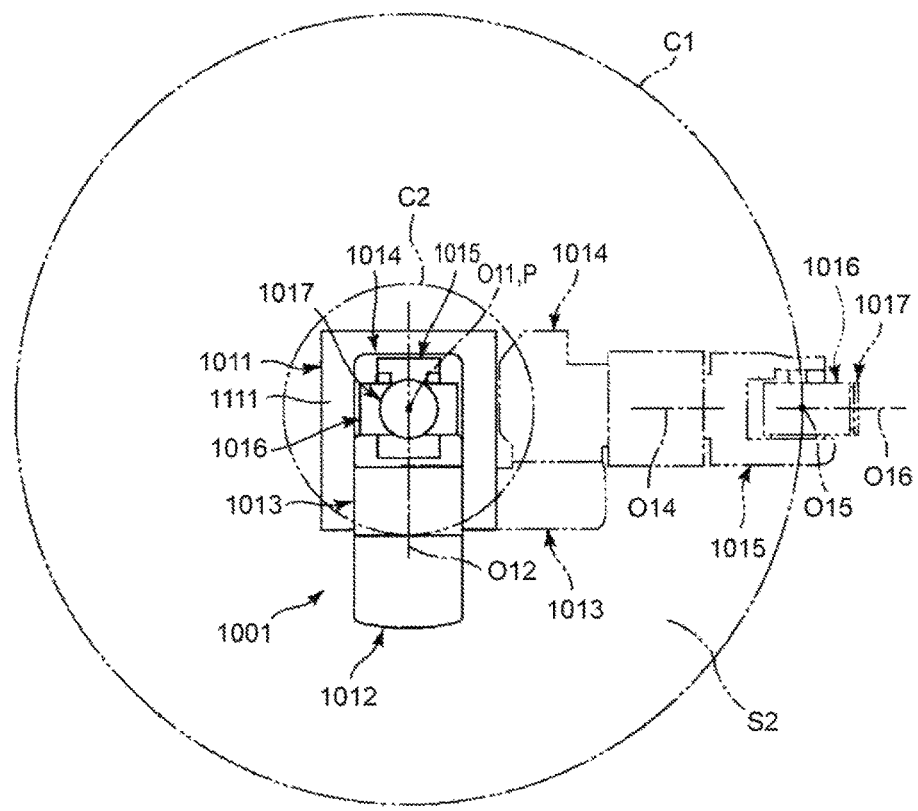
FIG. 31 is a diagram for explanation of the movable range of the distal end of the robot shown in FIG. 21.

FIG. 24 is a schematic side view of a state in which the first arm, the second arm, and the third arm of the robot shown in FIG. 21 do not overlap. FIG. 25 is a schematic side view of a state in which the first arm, the second arm, and the third arm of the robot shown in FIG. 21 overlap. FIGS. 26A to 26E are diagrams for explanation of actions of the robot shown in FIG. 21. FIG. 27 shows movement paths of the hand in the actions of the robot shown in FIGS. 26A to 26E. FIG. 28 is a schematic side view of a state in which the first arm and the third arm of the robot shown in FIG. 21 cross. FIG. 29 is a schematic side view of a state in which the first arm and the third arm of the robot shown in FIG. 21 overlap. FIGS. 30 and 31 are respectively diagrams for explanation of movable ranges of the distal end of the robot shown in FIG. 21.

In the following explanation, the third arm 1014, the fourth arm 1015, the fifth arm 1016, and the sixth arm 1017 are considered in a condition that the arms are stretched straight, in other words, in a condition that the fourth rotation axis O14 and the sixth rotation axis O16 are aligned or in parallel as shown in FIGS. 24 and 25.

First, as shown in FIG. 24, a length L11 of the first arm 1012 is set to be longer than a length L12 of the second arm 1013.

Here, the length L11 of the first arm 1012 is a distance between the second rotation axis O12 and a center line 1611 extending in the leftward and rightward directions in FIG. 24 of a bearing part 1061 (a member of the joint 1171) that rotatably supports the first arm 1012 as seen from the axis direction of the second rotation axis O12. Further, the length L12 of the second arm 1013 is a distance between the second rotation axis O12 and the third rotation axis O13 as seen from the axis direction of the second rotation axis O12.

Further, as shown in FIGS. 24 and 25, the robot 1001 is adapted so that an angle θ formed between the first arm 1012 and the second arm 1013 can be 0° as seen from the axis direction of the second rotation axis O12. That is, the robot 1001 is adapted so that the first arm 1012 and the second arm 1013 can overlap as seen from the axis direction of the second rotation axis O12. Particularly, as described above, the length L11 of the first arm 1012 is set to be longer than the length L12 of the second arm 1013, and the robot is adapted so that the second arm 1013 may not interfere with the first arm 1012 when the first arm 1012 and the second arm 1013 overlap as seen from the axis direction of the second rotation axis O12.

Here, the angle θ formed by the first arm 1012 and the second arm 1013 is an angle formed by a straight line 1621 passing through the second rotation axis O12 and the third rotation axis O13 (a center axis of the second arm 1013 as seen from the axis direction of the second rotation axis O12) and the first rotation axis O11 as seen from the axis direction of the second rotation axis O12 (see FIG. 24).

Further, as shown in FIG. 25, the robot 1001 is adapted so that the second arm 1013 and the third arm 1014 can overlap as seen from the axis direction of the second rotation axis O12. Therefore, the robot 1001 is adapted so that the first arm 1012, the second arm 1013, and the third arm 1014 can overlap at the same time as seen from the axis direction of the second rotation axis O12.

Furthermore, as shown in FIG. 24, a total length L13 of the third arm 1014, the fourth arm 1015, and the fifth arm 1016 is set to be longer than the length L12 of the second arm 1013. Thereby, as shown in FIG. 25, when the second arm 1013 and the third arm 1014 overlap as seen from the axis direction of the second rotation axis O12, the distal end of the robot arm 1010, i.e., the distal end of the sixth arm 1017 may be protruded from the second arm 1013. Therefore, interferences of the hand 1091 with the first arm 1012 and the second arm 1013 may be prevented.

Here, the total length L13 of the third arm 1014, the fourth arm 1015, and the fifth arm 1016 is a distance between the third rotation axis O13 and the fifth rotation axis O15 as seen from the axis direction of the second rotation axis O12 (see FIG. 24). In this case, regarding the third arm. 1014, the fourth arm 1015, and the fifth arm 1016, the fourth rotation axis O14 and the sixth rotation axis O16 are aligned or in parallel as shown in FIG. 24.

In the robot 1001 having the robot arm 1010, the above described relationships are satisfied, and thereby, as shown in FIGS. 26A to 26E, by rotation of the second arm 1013 and the third arm 1014 without rotation of the first arm 1012, the distal end of the robot arm 1010 may be moved to a position different by 180° about the first rotation axis O11 through the state in which the angle θ formed by the first arm 1012 and the second arm 1013 is 0° (the first arm 1012 and the second arm 1013 overlap) as seen from the axis direction of the second rotation axis O12.

By the driving of the robot arm 1010, as shown in FIG. 27, the robot 1001 may perform an action of moving the distal end of the robot arm 1010 and the hand 1091 as shown by an arrow 1063 without actions of moving the hand 1091 as shown by arrows 1064, 1065. That is, the robot 1001 may perform the action of moving the distal end of the robot arm 1010 and the hand 1091 linearly as seen from the axis direction of the first rotation axis O11. Thereby, the space for preventing interferences of the robot 1001 may be made smaller. Accordingly, the installation area S of the robot system 100 may be made relatively small.

Specifically, the installation area S of the robot system 100 is preferably from 0.5 m$^2$ to 4 m$^2$, more preferably from 1.0 m$^2$ to 3.5 m$^2$, and even more preferably from 1.5 m$^2$ to 3.0 m$^2$.

Even in the relatively small installation area S, the robot system 100 may sufficiently secure the number of mounting surfaces 1421 on which the robot 1001 may mount objects. In other words, the number of inspection units 1041 (the number of inspection items) may be sufficiently secured.

On the other hand, if the area is less than the lower limit value, it may be possible that the robot 1001 interferes with the supply apparatus 1003 and the inspection apparatus 4 when the robot 1001 performs the action depending on e.g. the shape of the hand 1091, the operation mode of the robot 1001, or the like. Or, if the area is more than the upper limit value, it may be possible that the robot system 100 becomes excessively larger and the location in which the robot system 100 may be installed is restricted.

Further, as described above, the robot 1001 may perform the action of moving the distal end of the robot arm 1010 and the hand 1091 linearly as seen from the axis direction of the first rotation axis O11, and thereby, the height of the robot system 100 (the height in the vertical direction) may be made relatively small.

Furthermore, the robot 1001 can perform the action of moving the hand 1091 linearly as seen from the axis direction of the first rotation axis O11, and thereby, when the hand 1091 is moved to a position different by 180° about the first rotation axis O11, for example, it may be possible that the first arm 1012 is not rotated or the rotation angle (amount of rotation) of the first arm 1012 is made smaller. In this manner, the rotation angle of the first arm 1012 about the first rotation axis O11 is made smaller, and thereby, the rotation of the first arm. 1012 having portions protruding outward than the base 1011 (the second portion 1122 and the third portion 1123) may be made smaller as seen from the axis direction of the first rotation axis O11, and interferences of the robot 1001 with e.g. the supply apparatus 1003, the inspection apparatus 4, the cover member 22, etc. may be prevented or reduced.

The robot 1001 can perform the action of linearly moving the hand 1091 as seen from the axis direction of the first rotation axis O11 and the movement of the robot 1001 may be reduced, and thereby, the hand 1091 may be efficiently moved from the supply apparatus 1003 to the inspection apparatus 4, for example. Accordingly, the takt time may be shortened and the work efficiency may be improved.

Further, the robot 1001 can perform the action of linearly moving the hand 1091 as seen from the axis direction of the first rotation axis O11 and the movement of the robot 1001 may be easily recognized.

Here, when the robot 1001 moves the hand 1091 to a position different by 180° about the first rotation axis O11, if the first arm 1012 is simply rotated about the first rotation axis O11 like the robot of related art, the robot 1001 may interfere with the supply apparatus 1003, the inspection apparatus 4, the cover member 22, etc., for example. Accordingly, it is necessary to teach the robot 1001 an evacuation point for avoiding the interferences with the supply apparatus 1003, the inspection apparatus 4, the cover member 22, etc. For example, as shown in FIG. 21, in the case where, when only the first arm 1012 is rotated to 90° about the first rotation axis O11 from the state in which the hand 1091 is located on the inspection apparatus 4 side, the robot 1001 interferes with the cover member 22 on the Y-axis side, it is necessary to teach the robot 1001 many evacuation points to prevent interferences of the robot 1001 with the cover member 22. As described above, it is necessary to teach many evacuation points when the first arm 1012 is rotated about the first rotation axis O11 as is the case of the robot of related art, an enormous number of evacuation points are necessary, and a lot of effort and time are taken for teaching.

On the other hand, in the robot 1001, when the hand 1091 is moved to a position different by 180° about the first rotation axis O11, the number of regions that may interfere may be reduced because the action of moving the hand 1091 linearly can be performed as seen from the axis direction of the first rotation axis O11. Accordingly, the number of evacuation points to teach may be reduced and effort and time taken for teaching may be reduced. That is, in the robot 1001, the number of evacuation points to teach may be about ⅓ of that of the robot of related art, for example, and teaching is dramatically easier.

In the robot 1001, a region (part) 1105 of the third arm 1014 and the fourth arm 1015 surrounded by a dashed-two dotted line on the left in FIG. 22 is a region (part) in which the robot 1001 does not or is hard to interfere with the robot 1001 itself or the other members. Accordingly, when a predetermined member is mounted on the region 1105, the member is hard to interfere with the robot 1001 and peripherals or the like. Therefore, in the robot 1001, a predetermined member can be mounted on the region 1105. Particularly, the case where the predetermined member is mounted on the region of the third arm 1014 on the left in FIG. 22 of the region 1105 is more effective because the probability that the member interferes with the supply apparatus 1003, the inspection apparatus 4, etc. is lower.

Objects that can be mounted on the region 1105 include e.g. a controller for controlling driving of the above described imaging unit 192 or a solenoid valve for a suction mechanism, etc. For example, when an end effector having e.g. a suction mechanism in place of the hand 1091 is provided, if a solenoid valve for the suction mechanism or the like is provided in the region 1105, the solenoid valve causes no obstruction when the robot 1001 is driven. The region 1105 is highly convenient as described above.

Further, in the robot 1001, a region (part) 1106 between the base 1011 and the first arm 1012 surrounded by a dashed-two dotted line on the right in FIG. 22 is also a region (part) in which the robot 1001 does not or is hard to interfere with the robot 1001 itself or the other members like the above described region 1105. This is because, in the region 1106, the first arm 1012 has the third portion 1123.

As shown in FIG. 28, the robot 1001 is adapted so that the first arm 1012 and at least one of the third arm 1014, the fourth arm 1015, and the fifth arm 1016 can cross as seen from the axis direction of the third rotation axis O13.

Further, as shown in FIG. 29, the robot 1001 is adapted so that the first arm 1012 and at least one of the third arm 1014, the fourth arm 1015, and the fifth arm 1016 can overlap as seen from the axis direction of the third rotation axis O13.

As described above, in the robot 1001, at least one of the third arm 1014, the fourth arm 1015, and the fifth arm 1016 may cross or overlap with the first arm 1012 as seen from the axis direction of the second rotation axis O12. Thereby, the distal end of the robot arm 1010 may be moved closer to the second rotation axis O12. Accordingly, the work range of the robot 1001 in the region between the base 1011 and the second rotation axis O12 may be made wider.

As shown in FIGS. 30 and 31, the robot 1001 may move the distal end part of the robot arm 1010 along a spherical imaginary surface C1. FIG. 30 shows a side view of the robot 1001 and FIG. 31 shows a bottom view of the robot 1001.

The imaginary surface C1 is a spherical surface around an intersection point P of the first rotation axis O11 and the second rotation axis O12 and formed by an aggregation of trajectories drawn by the fifth rotation axis O15 when the robot arm 1010 is driven in a state in which the distance between the intersection point P and the fifth rotation axis O15 is the maximum (a state of the robot 1001 shown by the two-dashed dotted lines in FIGS. 30 and 31). Therefore, the imaginary surface C1 shows the maximum movable range of the distal end part of the robot arm 1010 (specifically, the fifth rotation axis O15).

Further, as shown in FIGS. 30 and 31, the robot 1001 may move the distal end part of the robot arm 1010 along a spherical imaginary surface C2.

The imaginary surface C2 is a spherical surface around the intersection point P and formed by an aggregation of trajectories drawn by the fifth rotation axis O15 when the robot arm 1010 is driven in a state in which the distance between the intersection point P and the fifth rotation axis O15 is the minimum (a state of the robot 1001 shown by the solid lines in FIGS. 30 and 31). Therefore, the imaginary surface C2 shows the minimum movable range of the distal end part of the robot arm 1010 (specifically, the fifth rotation axis O15).

As described above, the robot 1001 can take various attitudes as shown in FIGS. 24, 25, 28, and 29. Accordingly, the distal end part of the robot arm 1010 may be moved within the range between the above described maximum movable range and minimum movable range. Therefore, the movable range of the distal end part of the robot arm 1010 is a space S2 between the imaginary surface C1 and the imaginary surface C2. Note that, in a precise sense, the movable range of the distal end part of the robot arm 1010 is a range except the base 1011 of the space S2 for preventing interferences of the robot arm 1010 with the base 1011.

In this manner, the robot 1001 may move the distal end part of the robot arm 1010 nearly spherically around the intersection point P.

Movement Mechanism 5

The movement mechanism 5 shown in FIG. 21 has a function of supporting the robot 1001 to be reciprocably movable in the Y-axis directions.

The movement mechanism 5 has e.g. a plate-like attachment part 50 for attaching the base 1011, a traveling axis 55 for reciprocating the attachment part 50 in the Y-axis directions, a drive source (not shown) that drives the traveling axis 55, and a movement mechanism control apparatus (not shown) that controls the respective parts of the movement mechanism 5.

The drive source includes e.g. a motor such as a servo motor, a stepping motor, or a linear motor, a hydraulic cylinder, a pneumatic cylinder, etc.

The robot 1001 may move in the Y-axis directions by the movement mechanism 5, and thus, the robot 1001 may perform works in the plurality of inspection units 1041 and the plurality of supply units 1031 provided over the wide range in the horizontal directions.

Further, as described above, the robot 1001 has the configuration in which the first arm 1012 and the second arm 1013 can overlap as seen from the axis direction of the second rotation axis O12, and thereby, the robot 1001 may reduce the amount of eccentricity of the position of the center of gravity of the robot arm 1010 with respect to the base 1011. As a result, load on the robot arm 1010 in yawing, pitching, and rolling directions may be reduced. Accordingly, the load on the attachment part 50 may be reduced and the traveling axis 55 supporting the attachment part 50 may be made smaller.

As above, the configuration of the robot system 100 is explained.

Next, examples of works of the robot 1001 in the robot system 100 will be explained with reference to FIGS. 32 to 34.

Figure 32:
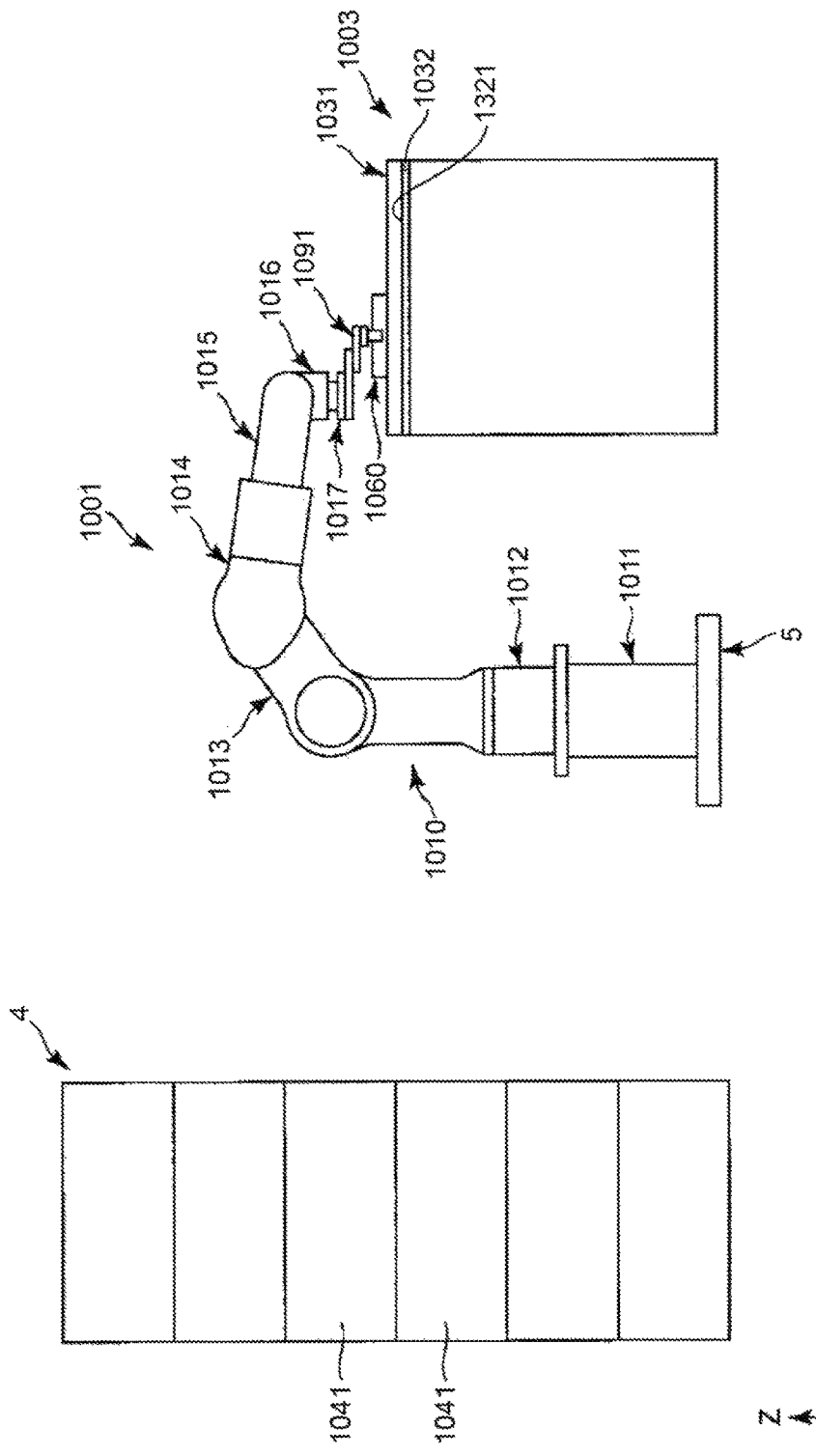
FIG. 32 is a diagram for explanation of an example of a work of the robot shown in FIG. 21.
Figure 33:
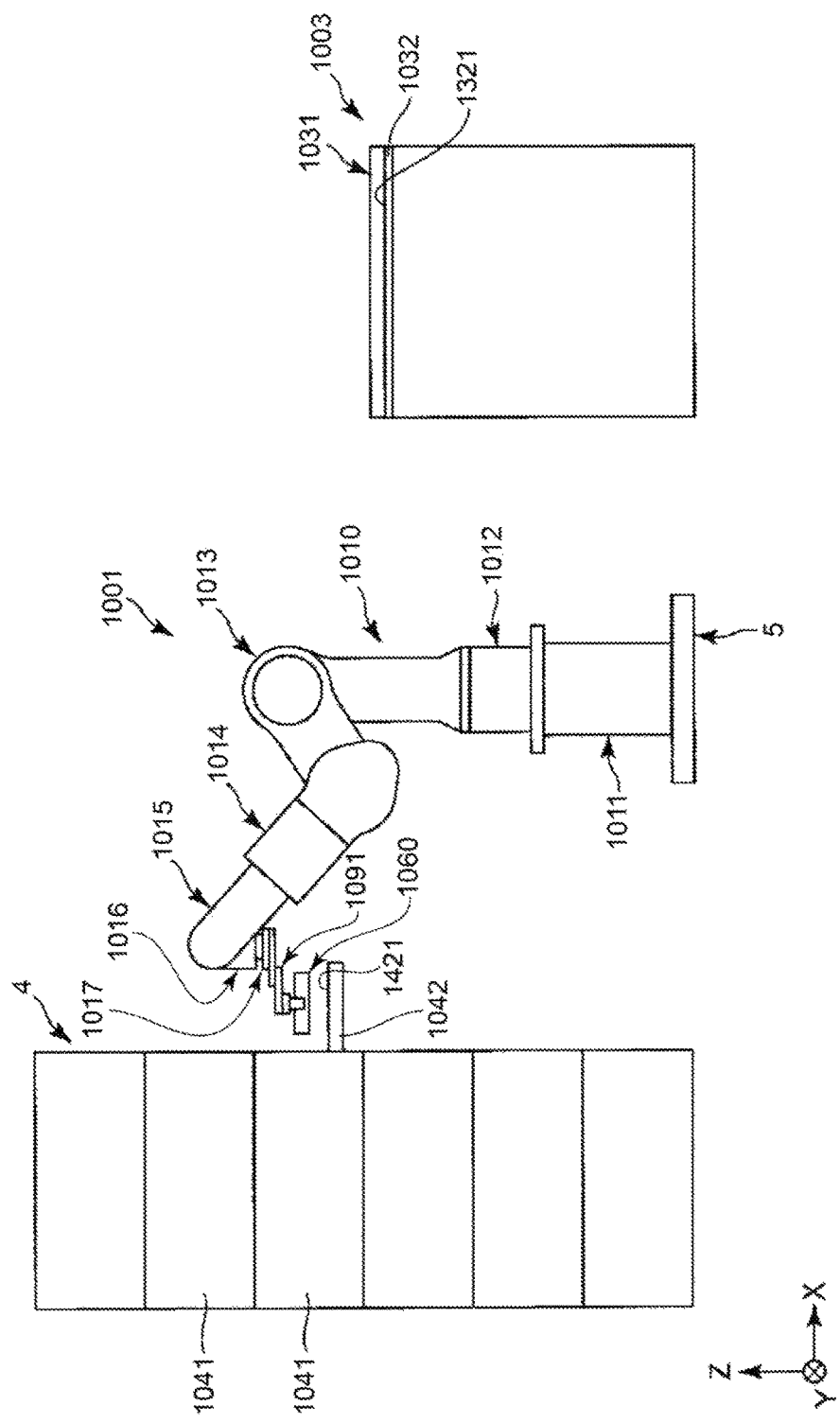
FIG. 33 is a diagram for explanation of an example of a work of the robot shown in FIG. 21.
Figure 34:
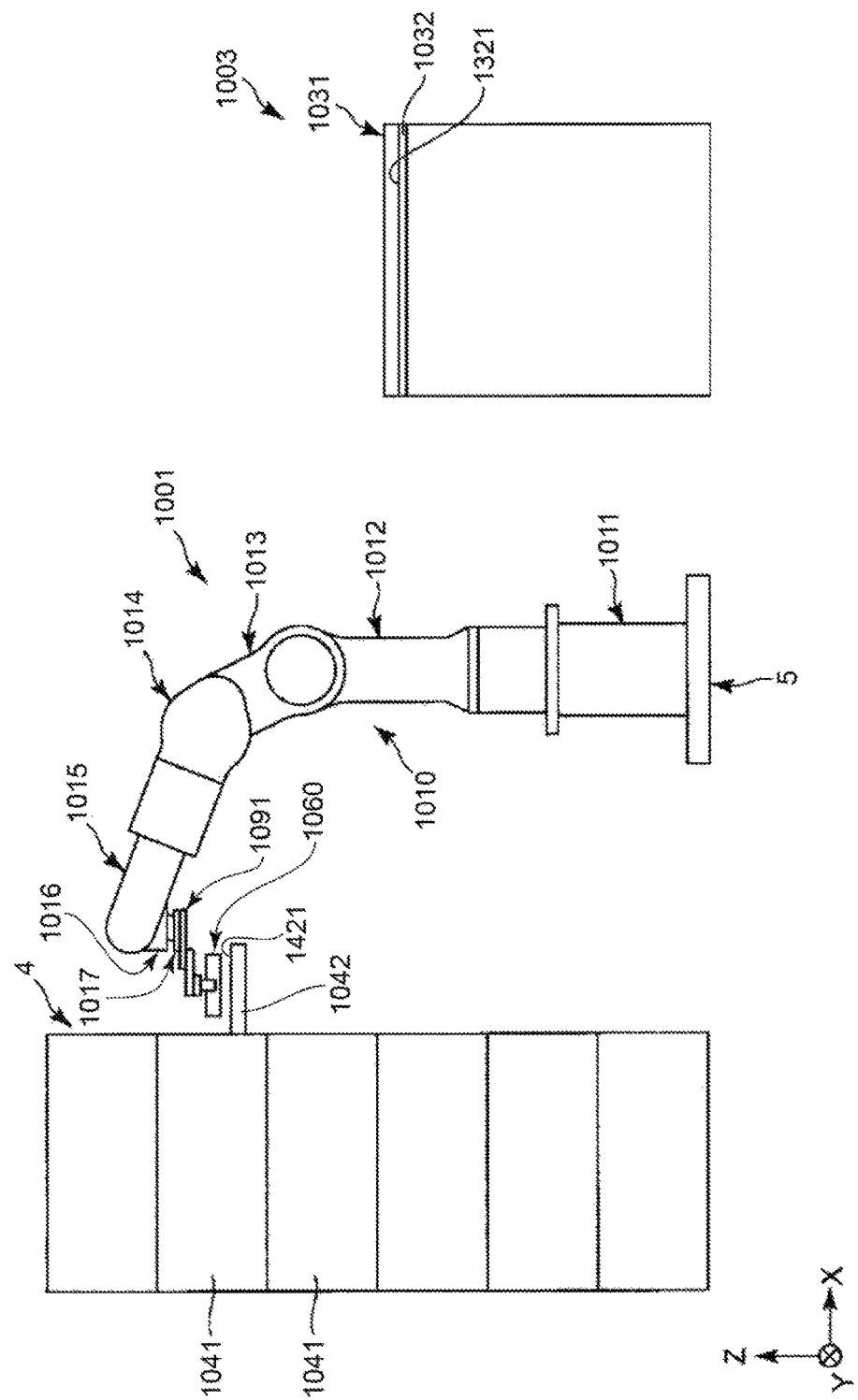
FIG. 34 is a diagram for explanation of an example of a work of the robot shown in FIG. 21.

FIGS. 32 to 34 are respectively diagrams for explanation of the examples of the works of the robot shown in FIG. 21.

For the following works of the robot 1001, the worker teaches the robot 1001 details of works performed by the robot 1001 and positions of the respective inspection units 1041 and the respective supply units 1031 with respect to the robot 1001 in advance.

First, as shown in FIG. 32, the robot 1001 grasps an object 1060 mounted on the supply plate 1032 from above the supply unit 1031 with the hand 1091, and selects and feeds the target object 1060 from the supply unit 1031. In this regard, the robot 1001 drives the robot arm 1010 and the hand 1091 based on the imaging data from the imaging unit 192 and the signal from the force detector 193. Thereby, the robot 1001 may properly select the target object and grasp the target object with a proper grasping force. Hereinafter, the same applies to the respective works of the robot 1001.

Next, the robot 1001 respectively rotates the second arm 1013 and the third arm 1014, and moves the hand 1091 to a position different by 180° about the first rotation axis O11 through the state in which the first arm 1012 and the second arm 1013 overlap as seen from the axis direction of the second rotation axis O12. Thereby, the robot 1001 carries the object 1060 from the supply unit 1031 to the inspection unit 1041.

Then, as shown in FIG. 33, the inspection apparatus protrudes the mounting plate 1042 from inside of the inspection chamber, and the robot 1001 mounts the object 1060 on the mounting surface 1421 of the mounting plate 1042. Then, the inspection apparatus 4 allows the mounting plate 1042 to recede into the inspection chamber and performs an inspection of the object 1060 in the inspection unit 1041. After the inspection of the object 1060 ends, the inspection apparatus protrudes the mounting plate 1042 from inside of the inspection chamber again. Then, the robot 1001 grasps the object 1060 on the mounting surface 1421 by the hand 1091.

Then, as shown in FIG. 34, the robot 1001 carries the object 1060 from the inspection unit 1041 to the inspection unit 1041 different from that inspection unit 1041. Then, in the same manner as that described above, the robot 1001 mounts the object 1060 on the mounting surface 1421 of the mounting plate 1042, and then, the inspection unit 1041 performs an inspection of the object 1060.

In this manner, the object 1060 is carried by the robot 1001 to the respective inspection units 1041, and the object is inspected by the respective inspection units 1041.

Then, after the respective inspections end, the robot 1001 carries the object 1060 to the supply unit 1031 again.

In the above described manner, the works of carrying etc. are performed by the robot 1001, and thereby, a plurality of inspections of the object 1060 may be performed in the robot system 100.

As described above, the robot 1001 of the embodiment may perform the action of moving the hand 1091 linearly as seen from the axis direction of the first rotation axis O11 because the first arm 1012 and the second arm 1013 can overlap as seen from the second rotation axis O12. Accordingly, even in the case where the distance of the robot 1001 with respect to the inspection apparatus 4 is relatively small, the robot 1001 may perform the work of mounting the object 1060 on the many inspection units 1041 arranged in the Z-axis direction by the hand 1091 or the like while avoiding interferences of the robot arm 1010 with the inspection apparatus 4. Further, similarly, even in the case where the distance of the robot 1001 with respect to the supply apparatus 1003 is relatively small, the robot 1001 may perform the work of selecting and feeding the object 1060 in the supply unit 1031 by the hand 1091 or the like while avoiding interferences of the robot arm 1010 with the supply apparatus 1003. Furthermore, even in the case where the respective distances of the robot 1001 with respect to the supply apparatus 1003 and the inspection apparatus 4 are relatively small, the robot may move the distal end of the robot arm 1010 to between the supply apparatus 1003 and the inspection apparatus 4 while avoiding interferences with the cover member 22 etc.

Fourth Embodiment

Next, the fourth embodiment of the invention will be explained.

Figure 35:
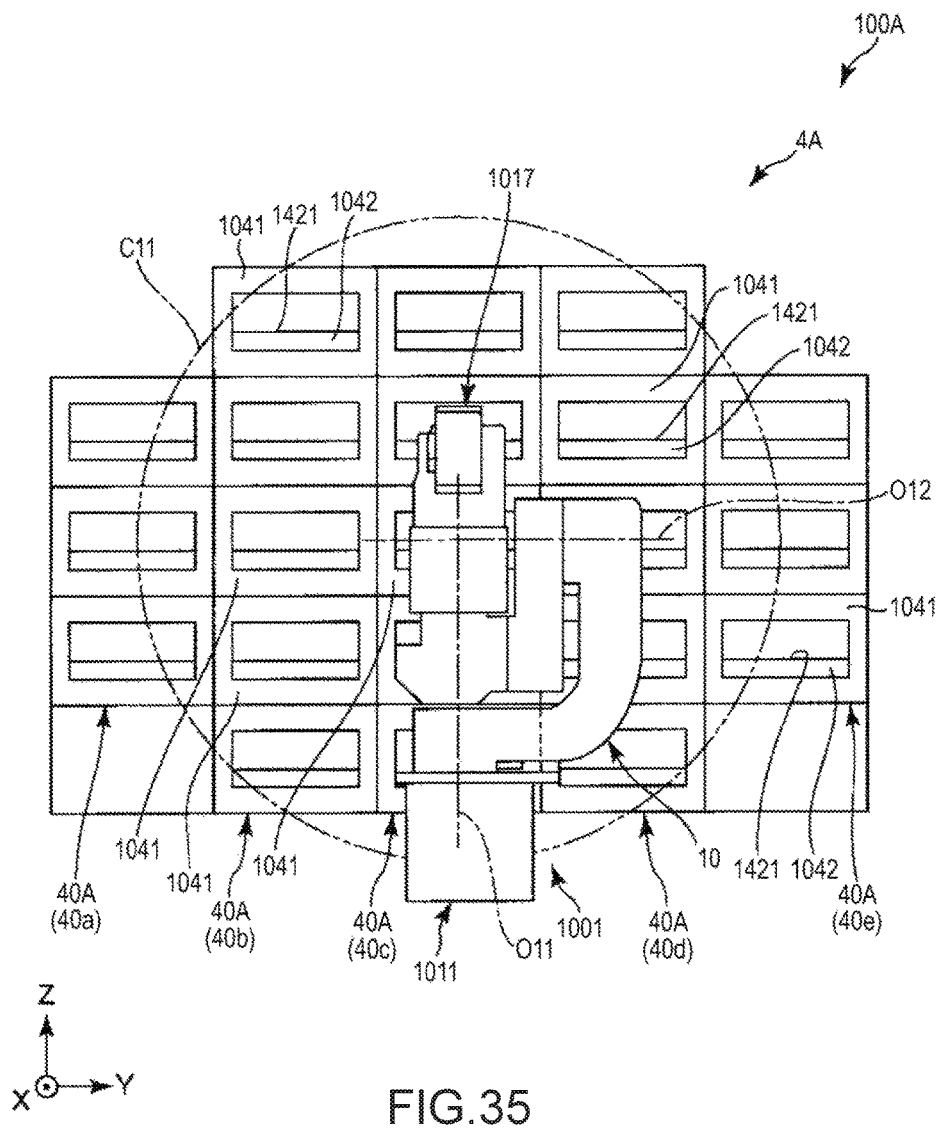
FIG. 35 is a schematic view showing a robot and an inspection apparatus of a robot system according to a fourth embodiment of the invention.

FIG. 35 is a schematic view showing a robot and an inspection apparatus of a robot system according to the fourth embodiment of the invention.

The robot system according to the embodiment is the same as that of the above described third embodiment except that the arrangement of the inspection units of the inspection apparatus is different.

In the following description, the fourth embodiment will be explained with a focus on differences from the above described embodiments and the explanation of the same items will be omitted. Further, the same configurations as those of the above described embodiments have the same signs in FIG. 35.

Inspection Apparatus

An inspection apparatus 4A of a robot system 100A shown in FIG. 35 has five mounting rows 40A. Hereinafter, the five mounting rows 40A are also referred to as "mounting row 40a", "mounting row 40b", "mounting row 40c", "mounting row 40d", "mounting row 40e" sequentially from the −Y-axis direction side toward the +Y-axis direction side.

Each of the mounting row 40b, the mounting row 40c, and the mounting row 40d has five inspection units 1041 arranged in the Z-axis direction. On the other hand, each of the mounting row 40a and the mounting row 40e has three inspection units 1041 arranged in the Z-axis direction. As described above, in the inspection apparatus 4A, the numbers of the respective inspection units 1041 of the mounting rows 40a, 40e provided in positions farthest from the first rotation axis O11 of the robot 1001 are smaller than the number of the respective inspection units 1041 of the mounting row 40c provided in a position closest to the first rotation axis O11 of the robot 1001.

Further, the respective three inspection units 1041 of the mounting rows 40a, 40e are arranged in the Y-axis direction with respect to the second to fourth three inspection units 1041 from the bottoms of the mounting row 40b, the mounting row 40c, and the mounting row 40d.

Here, as described above, the robot 1001 may move the distal end part of the robot arm 1010 within the spherical space S2 around the intersection point P. Note that a circle C11 shown by a two-dashed dotted line in FIG. 35 shows an outer circumference edge of the cross section of the spherical space S2 as a movable range of the robot 1001 cut along the surface of the inspection apparatus 4A on the robot 1001 side. Therefore, as seen from the X-axis direction, the robot 1001 may move the distal end of the robot arm 1010 to the region within the circle C11 with respect to the inspection apparatus 4A. In this manner, the plurality of inspection units 1041 are arranged in a form corresponding to the movable range of the robot 1001, and thereby, the plurality of inspection units 1041 may be efficiently placed in the range in which the distal end of the robot arm 1010 is movable. Accordingly, the compact robot system 100A having the larger number of inspection units 1041 may be realized.

According to the robot system 100A, the space for preventing interferences of the robot 1001 may be made smaller.

Fifth Embodiment

Next, the fifth embodiment of the invention will be explained.

Figure 36:
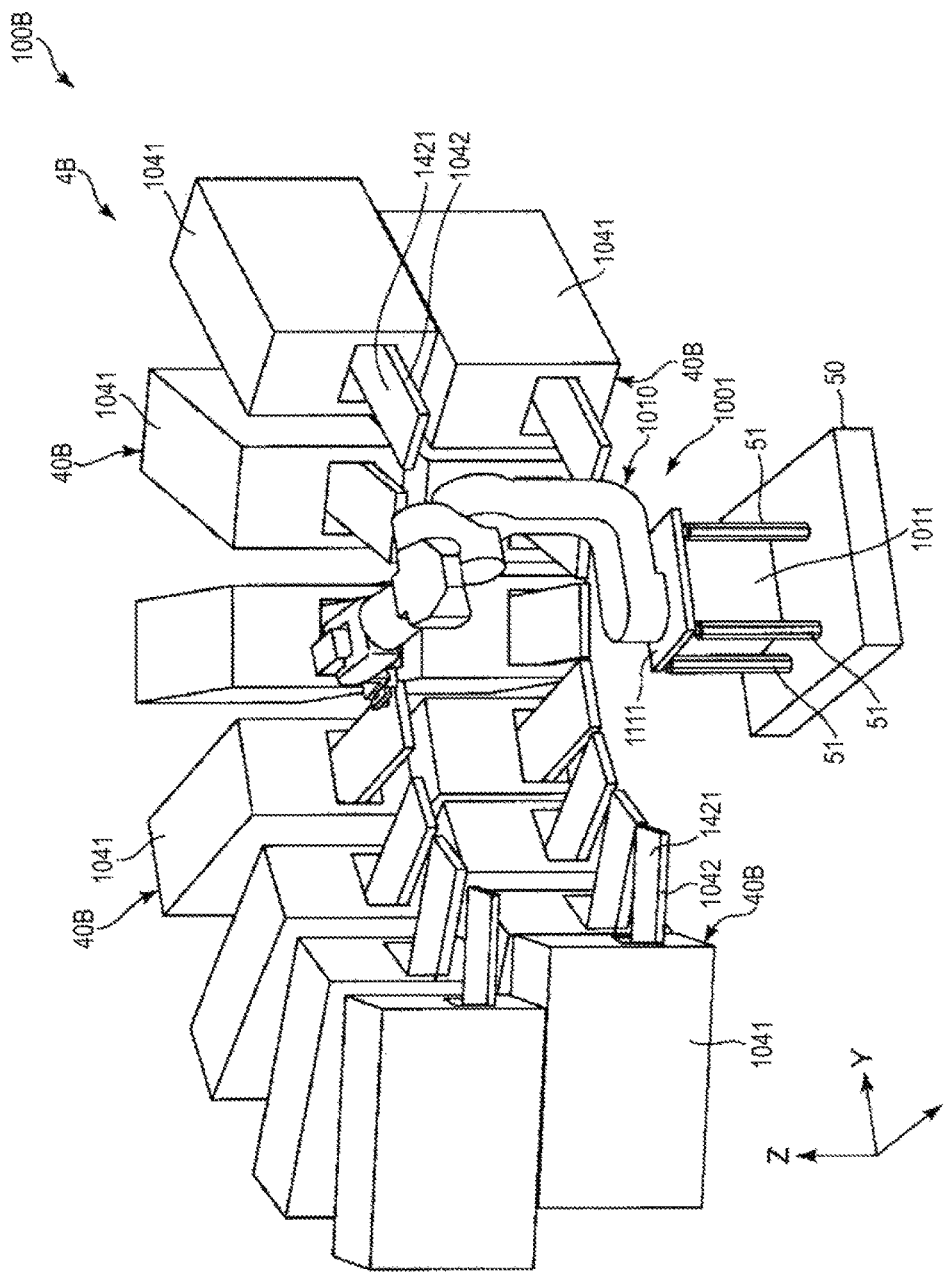
FIG. 36 is a perspective view showing a robot and an inspection apparatus of a robot system according to a fifth embodiment of the invention.
Figure 37:
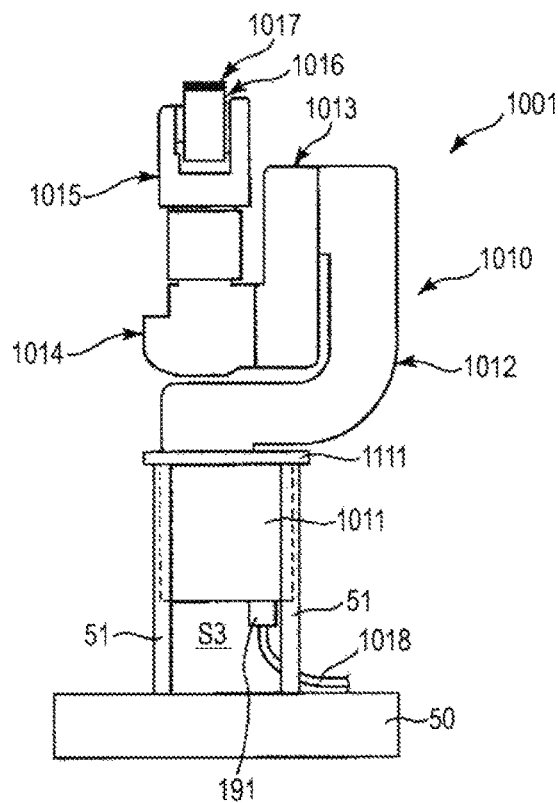
FIG. 37 is a diagram for explanation of a supporting part that supports the robot shown in FIG. 36.
Figure 38:
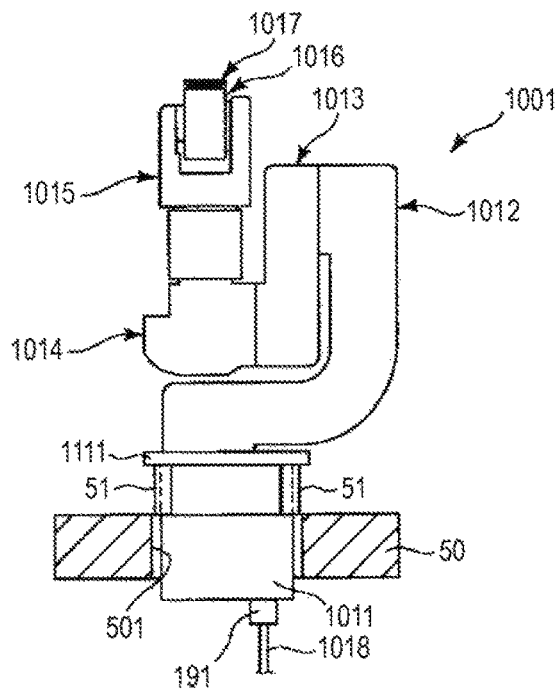
FIG. 38 is a diagram for explanation of a modified example of the supporting part that supports the robot shown in FIG. 36.

FIG. 36 is a perspective view showing a robot and an inspection apparatus of a robot system according to the fifth embodiment of the invention. FIG. 37 is a diagram for explanation of a supporting part that supports the robot shown in FIG. 36. FIG. 38 is a diagram for explanation of a modified example of the supporting part that supports the robot shown in FIG. 36.

The robot system according to the embodiment is the same as that of the above described third embodiment except that the arrangement of the inspection units of the inspection apparatus is different.

In the following description, the fifth embodiment will be explained with a focus on differences from the above described embodiments and the explanation of the same items will be omitted. Further, the same configurations as those of the above described embodiments have the same signs in FIGS. 36 to 38.

Inspection Apparatus

In an inspection apparatus 4B of a robot system 100B shown in FIG. 36, a plurality of inspection units 1041 are arranged in an arc form as seen from the Z-axis direction. More specifically, the inspection apparatus 4B has a plurality of mounting rows 40B with two inspection units 1041, and the plurality of mounting rows 40B are arranged in the arc form around the first rotation axis O11 of the robot 1001 as seen from the Z-axis direction. Further, regarding the plurality of mounting rows 40B, respectively, the lower inspection units 1041 are located closer to the +X-axis direction side than the upper inspection units 1041.

Here, as described above, the robot 1001 may move the distal end part of the robot arm 1010 within the spherical space S2 around the intersection point P. Therefore, the plurality of inspection units 1041 are arranged in the arc form corresponding to the movable range of the robot 1001, and thereby, the plurality of inspection units 1041 may be efficiently placed in the range in which the distal end of the robot arm 1010 is movable. Accordingly, the compact robot system 100B having the larger number of inspection units 1041 may be realized.

Supporting Members

As shown in FIG. 36, the robot system 100B has four supporting members 51 that support the base 1011 with respect to the attachment part 50 of the movement mechanism 5.

Each of the four supporting members 51 is a rod-like member having a cross section in a nearly hexagonal shape. One end of the supporting member 51 is connected to the corner part of the lower surface of the flange 1111 and the other end is connected to the attachment part 50.

Further, as shown in FIG. 37, the respective supporting members 51 are longer than the length of the base 1011 along the first rotation axis O11, and support the base 1011 with respect to the attachment part 50 in a state in which the base 1011 and the attachment part 50 are separated. Furthermore, a space S3 is formed between the base 1011 and the attachment part 50. Thereby, a wire 1018 connected to the connector 191 provided on the base 1011 or the like may be placed in the space S3, and bending of the wire 1018 beyond necessity may be reduced.

In the above described explanation, the supporting members 51 support the base 1011 in the state in which the base 1011 and the attachment part 50 are separated, however, as shown in FIG. 38, the supporting members 51 may support the base 1011 with respect to the attachment part 50 in a state in which the base 1011 penetrates into a through hole 501 formed in the attachment part 50. That is, the base 1011 is attached to the attachment part 50, and thereby, the height of the structure including the robot 1001 and the movement mechanism 5 may be reduced.

Note that the shapes, the arrangement, and the number of the supporting members 51 are not particularly limited as long as the members may support the base 1011 with respect to the attachment part 50. For example, the cross section shapes of the respective supporting members 51 may be circular shapes or other polygonal shapes such as square shapes than the hexagonal shapes.

According to the robot system 100B, the space for preventing interferences of the robot 1001 may be made smaller.

Sixth Embodiment

Next, the sixth embodiment of the invention will be explained.

Figure 39:
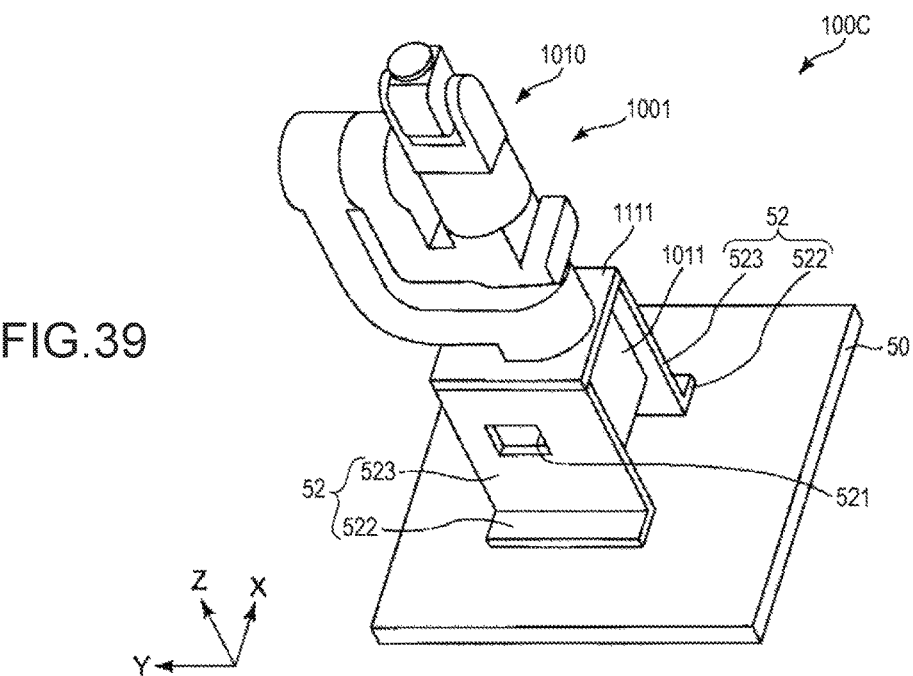
FIG. 39 is a perspective view showing a supporting part of a robot system according to a sixth embodiment of the invention.

FIG. 39 is a perspective view showing a supporting part of a robot system according to the sixth embodiment of the invention.

The robot system according to the embodiment is the same as that of the above described third embodiment except that the supporting members are provided.

In the following description, the sixth embodiment will be explained with a focus on differences from the above described embodiments and the explanation of the same items will be omitted. Further, the same configurations as those of the above described embodiments have the same signs in FIG. 39.

A robot system 100C shown in FIG. 39 has two supporting members 52 that support the base 1011 with respect to the attachment part 50 of the movement mechanism 5.

Each of the two supporting members 52 is a plate-like member bending in a nearly L-shape as seen from the Y-axis direction. The supporting member 52 has a portion 522 attached to the attachment part 50 and a portion 523 extending from the attachment part 50 in the Z-axis direction. Further, an end of the portion 522 on the +Z-axis direction side is attached to the flange 1111.

The portion 523 of each supporting member 52 is longer than the length of the base 1011 along the first rotation axis O11, and the supporting members 52 support the base 1011 with respect to the attachment part 50 in a state in which the base 1011 and the attachment part 50 are separated. By the supporting members 52, a space may be formed between the base 1011 and the attachment part 50 like the above described fourth embodiment.

Further, in the portion 523 of the supporting member 52, a hole 521 penetrating in the thickness direction thereof (X-axis direction) is provided. The hole 521 enables easy access to the base 1011 at maintenance of the base 1011 or the like. For example, when a battery box (not shown) or the like is provided on the side of the base 1011, it is preferable to provide the hole 521 near the battery box.

Note that, in the above described explanation, the hole 521 penetrating the portion 523 is provided in the portion 523, however, in place of the hole 521, e.g. a cutout, an openable and closable door, or the like may be provided.

According to the robot system 100C, the space for preventing interferences of the robot 1001 may be made smaller.

Seventh Embodiment

Next, the seventh embodiment of the invention will be explained.

Figure 40:
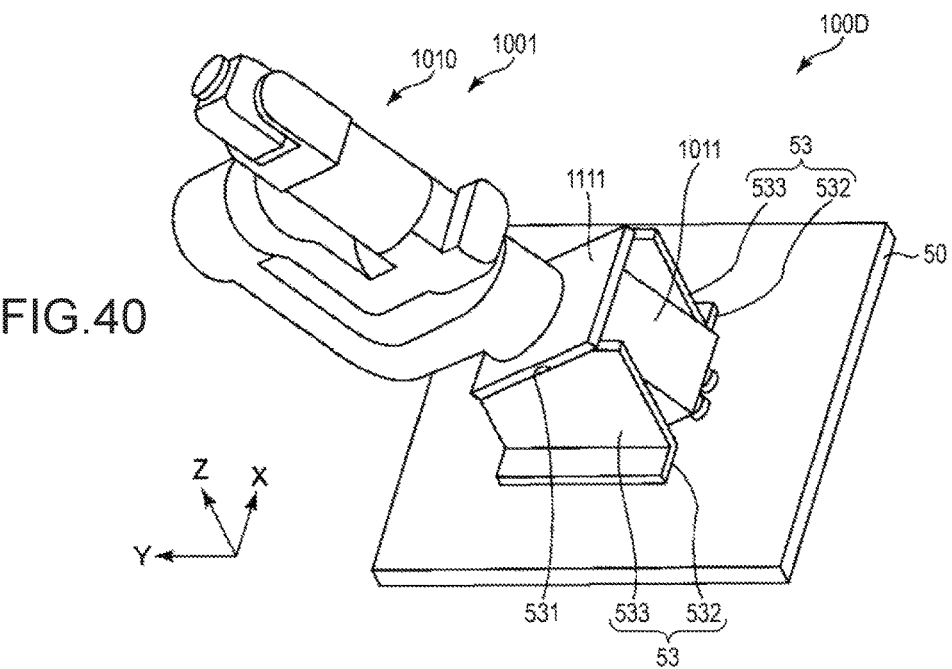
FIG. 40 is a perspective view showing a supporting part of a robot system according to a seventh embodiment of the invention.

FIG. 40 is a perspective view showing a supporting part of a robot system according to the seventh embodiment of the invention.

The robot system according to the embodiment is the same as that of the above described sixth embodiment except that the configurations of the supporting members are different.

In the following description, the seventh embodiment will be explained with a focus on differences from the above described embodiments and the explanation of the same items will be omitted. Further, the same configurations as those of the above described embodiments have the same signs in FIG. 40.

A robot system 100D shown in FIG. 40 has two supporting members 53 that support the base 1011 with respect to the attachment part 50 of the movement mechanism 5.

Each of the two supporting members 53 is a plate-like member bending in a nearly L-shape as seen from the Y-axis direction. The supporting member 53 has a portion 532 attached to the attachment part 50 and a portion 533 extending from the portion 532 in the Z-axis direction. Further, a surface 531 on an end of the portion 533 on the +Z-axis direction side is attached to the flange 1111. The surface 531 is formed by cutting out in a direction tilted with respect to the horizontal plane. Therefore, the robot 1001 is attached to the attachment part 50 in the tilted condition with respect to the first rotation axis O11 horizontal plane by the supporting members 53.

As described above, the robot 1001 is attached to the attachment part 50 in a condition according to the configurations of the supporting members 53. Accordingly, the supporting members 53 having the configurations in consideration of the placement (angle etc.) of the robot 1001 with respect to the attachment part 50 is used, and thereby, the placement of the robot 1001 with respect to the attachment part 50 may be easily set.

According to the robot system 100D, the space for preventing interferences of the robot 1001 may be made smaller.

Eighth Embodiment

Next, the eighth embodiment of the invention will be explained.

Figure 41:
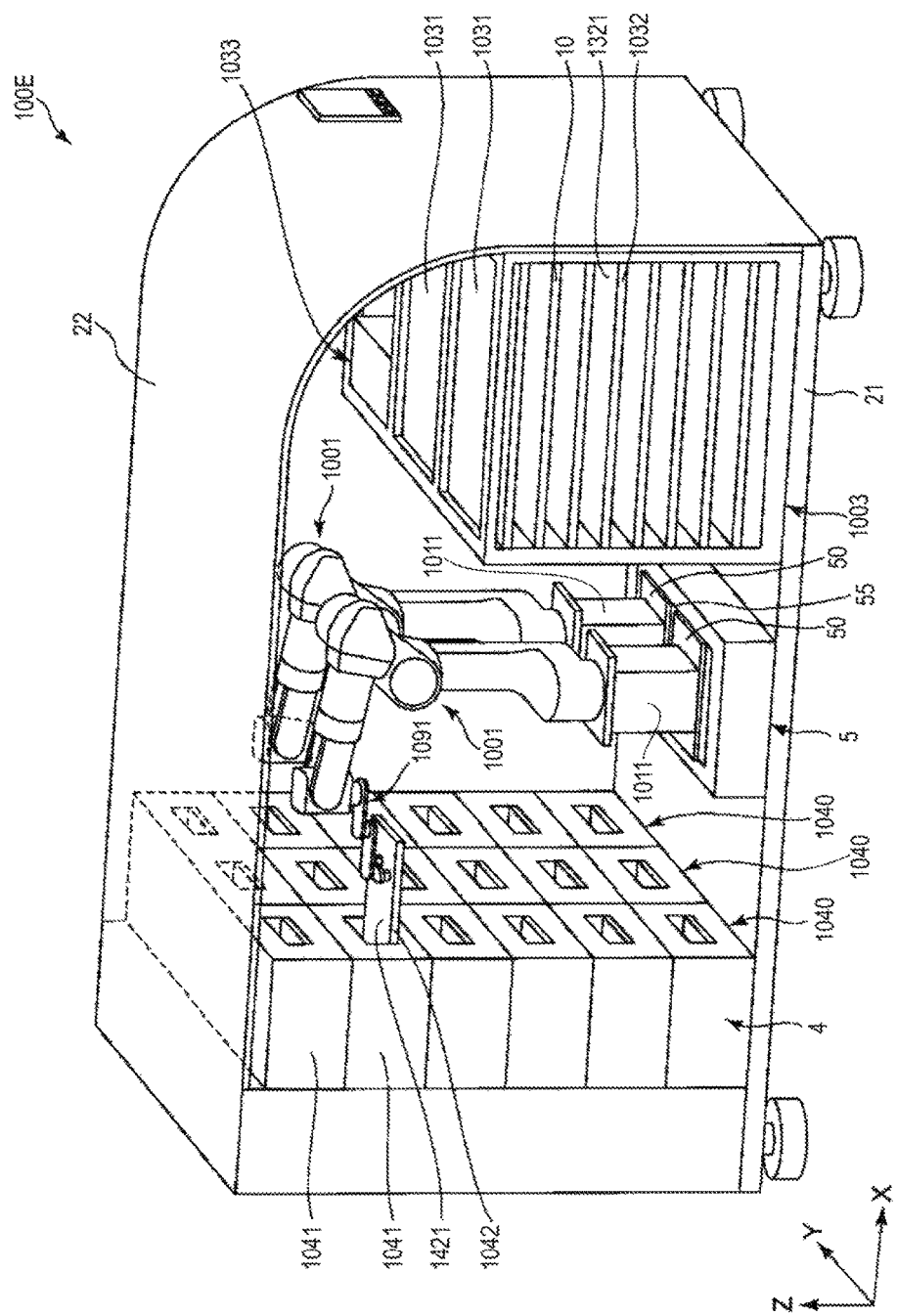
FIG. 41 is a perspective view showing a robot system according to an eighth embodiment of the invention.

FIG. 41 is a perspective view showing a robot system according to the eighth embodiment of the invention.

The robot system according to the embodiment is the same as that of the above described third embodiment except that a plurality of robots are provided.

In the following description, the eighth embodiment will be explained with a focus on differences from the above described embodiments and the explanation of the same items will be omitted. Further, the same configurations as those of the above described embodiments have the same signs in FIG. 41.

A robot system 100E shown in FIG. 41 has two robots 1001. The two robots 1001 are provided side by side in the Y-axis direction, and respectively connected to the movement mechanism 5. These two robots 1001 may respectively independently move. Further, the two robots 1001 may perform works in cooperation with each other. For example, the two robots 1001 may perform carrying of different objects from each other or the like at times when the robots do not interfere with each other based on a preset program. Further, for example, the two robots 1001 may perform a work by one robot 1001 grasping an object and the other robot 1001 incorporating a component into the object.

As described above, the two robots 1001 are provided, and thereby, various works may be performed on objects by the respective robots 1001 and the robot system 100E with the larger number of works per unit time (higher work efficiency) may be realized.

Further, as described above, the robot 1001 is adapted so that the first arm 1012 and the second arm 1013 can overlap as seen from the axis direction of the second rotation axis O12, and thereby, even when the two robots 1001 are placed close to each other, interferences with each other may be avoided. Accordingly, the installation space of the two robots 1001 may be made smaller, and thus, the installation area of the robot system 100E may be made smaller.

According to the robot system 100E, the space for preventing interferences of the robot 1001 may be made smaller.

Ninth Embodiment

Next, the ninth embodiment of the invention will be explained.

Figure 42:
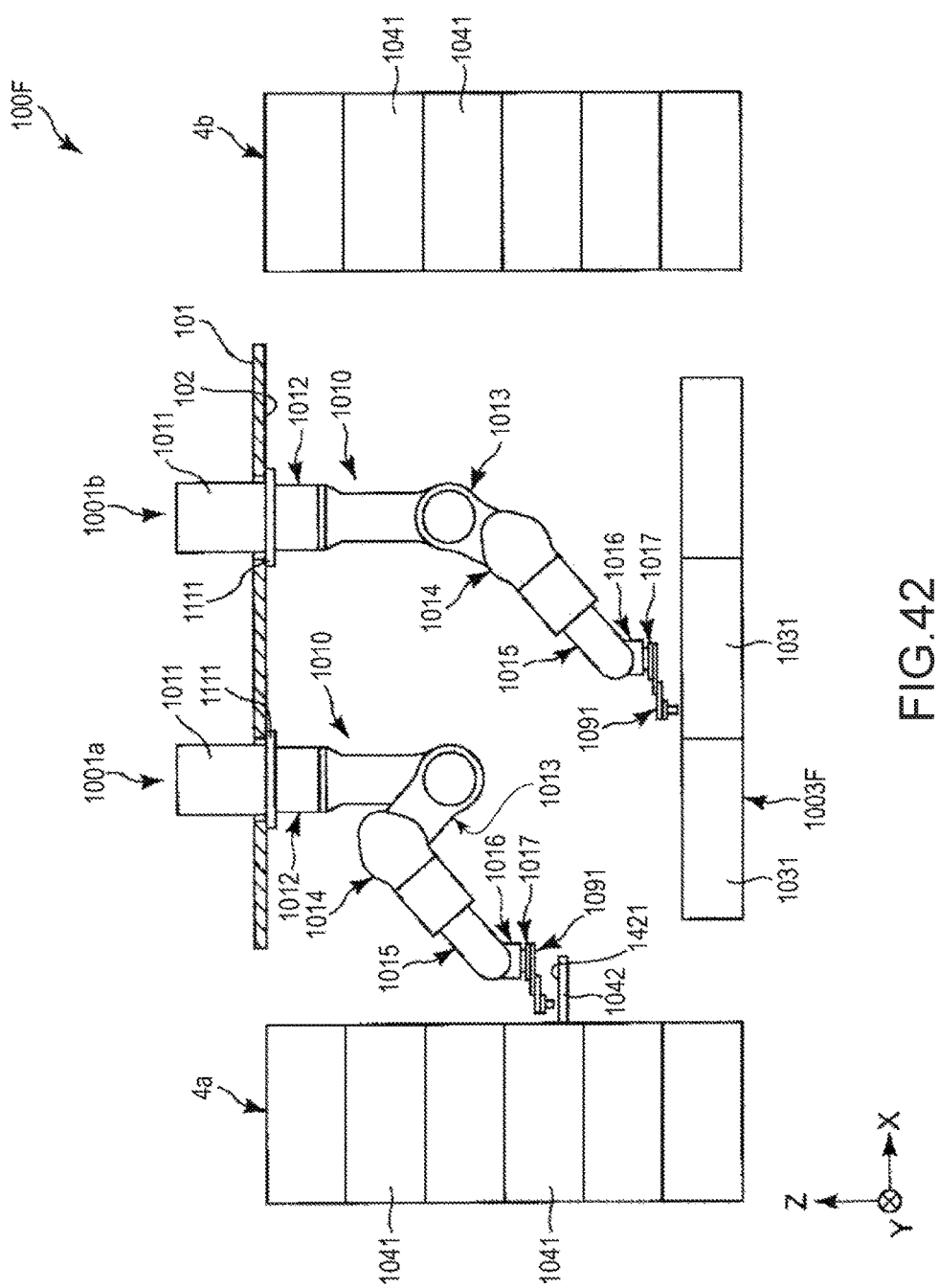
FIG. 42 is a schematic view showing a robot system according to a ninth embodiment of the invention.

FIG. 42 is a schematic view showing a robot system according to the ninth embodiment of the invention.

The robot system according to the embodiment is the same as that of the above described third embodiment except that placement of the robot, a plurality of robots are provided, and respective placements, numbers, etc. of the inspection apparatus and the supply apparatus are different.

In the following description, the ninth embodiment will be explained with a focus on differences from the above described embodiments and the explanation of the same items will be omitted. Further, the same configurations as those of the above described embodiments have the same signs in FIG. 42.

A robot system 100F shown in FIG. 42 has two inspection apparatuses 4a, 4b, a supply apparatus 1003F, and two robots 1001a, 1001b.

The inspection apparatus 4a, the robot 1001a, the robot 1001b, and the inspection apparatus 4b are arranged in this order from the −X-axis side toward the +X-axis side. Further, the supply apparatus 1003F is provided below the robot 1001a and the robot 1001b.

The inspection apparatuses 4a, 4b respectively have the same configurations as that of the inspection apparatus 4 in the third embodiment except that the inspection apparatus 4 and the placement in the robot system 100E in the third embodiment are different.

The supply apparatus 1003F has three supply units 1031, and these supply units 1031 are provided side by side in the X-axis direction.

The robots 1001a, 1001b are the so-called suspended robots with the flanges 1111 of the bases 1011 attached to the attachment surface (ceiling surface) 102 of the ceiling (ceiling part) 101 and the first arms 1012 located vertically below the bases 1011. Further, the robots 1001a, 1001b have the same configurations as that of the robot 1001 in the third embodiment except that the robots are the so-called suspended robots. The robots 1001a, 1001b are the so-called suspended robots, and thereby, the work ranges of the respective robots 1001a, 1001b vertically below may be made wider.

The two robots 1001a, 1001b may respectively perform works in cooperation with each other like the two robots 1001 of the above described eighth embodiment. For example, the robot 1001a may perform carrying of objects between the inspection apparatus 4a and the supply apparatus 1003F and the robot 1001b may perform carrying of objects between the inspection apparatus 4b and the supply apparatus 1003F.

The robot system 100F is effective particularly when inspection units 1041 that perform inspections having relatively long inspection times (e.g. inspections taking about several tens of minutes) are provided.

Note that, for example, in the robot system 100F shown in FIG. 42, in place of the inspection apparatuses 4a, 4b, supply apparatuses (equipment supply apparatuses to which objects are supplied by a worker) may be provided in positions in which the inspection apparatuses 4a, 4b are placed, and, in place of the supply apparatus 1003F, an assembly apparatus in which the robots 1001a, 1001b perform assembly of components etc. may be provided in the position of the supply apparatus 1003F. In other words, the robot system 100F may be used as an assembly system that performs assembly of components.

According to the robot system 100F, the space for preventing interferences of the robots 1001a, 1001b may be made smaller.

Tenth Embodiment

Next, the tenth embodiment of the invention will be explained.

FIG. 43 is a schematic view showing a robot system according to the tenth embodiment of the invention.

The robot system according to the embodiment is the same as that of the above described ninth embodiment except that numbers, placements, etc. of the inspection apparatus and the supply apparatus are different.

In the following description, the tenth embodiment will be explained with a focus on differences from the above described embodiments and the explanation of the same items will be omitted. Further, the same configurations as those of the above described embodiments have the same signs in FIG. 43.

A robot system 100G shown in FIG. 43 has an inspection apparatuses 4G, two supply apparatuses 1003a, 1003b, and two robots 1001a, 1001b.

The supply apparatus 1003a, the robot 1001a, the robot 1001b, and the supply apparatus 1003b are arranged in this order from the −X-axis side toward the +X-axis side. Further, the inspection apparatus 4G is provided below the robots 1001a, 1001b.

The inspection apparatus 4G has five inspection units 1041 and these inspection units 1041 are provided side by side in the X-axis direction.

The supply apparatuses 1003a, 1003b respectively have the same configurations as that of the supply apparatus 1003 in the third embodiment except that the supply apparatus 1003 and the placement in the robot system 100 in the third embodiment are different.

The robots 1001a, 1001b may respectively perform works in cooperation with each other like the two robots 1001 of the above described eighth embodiment. For example, the robot 1001a may perform carrying of objects between the inspection apparatus 4G and the supply apparatus 1003a and the robot 1001b may perform carrying of objects between the inspection apparatus 4G and the supply apparatus 1003b.

The robot system 100G is effective particularly when inspection units 1041 that perform inspections having relatively short inspection times (e.g. inspections taking about several tens of minutes) are provided.

According to the robot system 100G, the space for preventing interferences of the robot 1001 may be made smaller.

As above, the robot and the robot system according to the invention are explained according to the illustrated embodiments, however, the invention is not limited to those and the configurations of the respective parts may be replaced by arbitrary configurations having the same functions. Further, other arbitrary configurations may be added. Furthermore, the invention may include a combination of two or more arbitrary configurations (features) of the above described respective embodiments.

In the above described embodiments, the number of rotation axes of the robot arm of the robot is six, however, the invention is not limited to that. The number of rotation axes of the robot arm may be e.g. two, three, four, five, seven, or more. Further, in the above described embodiments, the number of arms of the robot is six, however, the invention is not limited to that. The number of arms of the robot may be e.g. two, three, four, five, seven, or more.

Furthermore, in the above described embodiments, the number of robot arms of the robot is one, however, the invention is not limited to that. The number of robot arms of the robot may be e.g. two or more. That is, the robot may be e.g. a multi-arm robot including a dual-arm robot.

As above, the robots according to the invention are explained according to the illustrated embodiments, however, the invention is not limited to those and the configurations of the respective parts may be replaced by arbitrary configurations having the same functions. Further, other arbitrary configurations may be added. Furthermore, the invention may include a combination of two or more arbitrary configurations (features) of the above described respective embodiments.

In the above described embodiments, the number of rotation axes of the robot arm of the robot is six, however, the invention is not limited to that. The number of rotation axes of the robot arm may be e.g. two, three, four, five, seven, or more. Further, in the above described embodiments, the number of arms of the robot is six, however, the invention is not limited to that. The number of arms of the robot may be e.g. two, three, four, five, seven, or more.

Furthermore, in the above described embodiments, the number of robot arms of the robot is one, however, the invention is not limited to that. The number of robot arms of the robot may be e.g. two or more. That is, the robot may be e.g. a multi-arm robot including a dual-arm robot.

In the above described first, second embodiments, the first member includes the single arm (first arm) and the second member includes the single arm (second arm), however, the first member may include two or more arms and the second member may include two or more arms depending on the number of arms of the robot, for example.

Further, in the above described first, second embodiments, the third member includes the two arms (third arm and fourth arm) and the fourth member includes the two arms (fifth arm and sixth arm), however, the third member may include one, three, or more arms and the fourth member may include one, three, or more arms depending on the number of arms of the robot, for example.

In the above described first, second embodiments, the robot having the configuration in which, in the first state, as seen from the axis direction of the rotation axis of the first member, the second state in which the end effector provided on the distal end of the robot arm overlaps with the second member is assumed is explained as an example, however, a robot having a configuration in which, in the first state, as seen from the axis direction of the rotation axis of the first member, the second state in which the distal end of the robot arm overlaps with the second member is assumed may be employed. Even the robot assuming the second state in which the distal end of the robot arm overlaps with the second member may exert the same effects as those of the above described embodiments.

Further, In the above described first, second embodiments, the robot having the configuration in which the rotation axis of the first member (the first rotation axis of the first arm) with respect to the base and the rotation axis of the second member (the second rotation axis of the second arm) with respect to the first member cross is explained as an example, however, the robot according to the invention may be e.g. a robot having a configuration in which the rotation axis of the first member with respect to the base and the rotation axis of the second member with respect to the first member are in parallel.

In the above described third to tenth embodiments, regarding conditions (relationships) of an n-th rotation axis, an n-th arm, an (n+1)th rotation axis, and an (n+1)th arm, the case where n is one, i.e., the case where the first rotation axis, the first arm, the second rotation axis, and the second arm satisfy the conditions is explained, however, the invention is not limited to that. The n may be an integer equal to or more than one, and the same conditions as those in the case where n is one may be satisfied with respect to an arbitrary integer equal to or more than one. Therefore, for example, the case where n is two, i.e., the case where the second rotation axis, the second arm, the third rotation axis, and the third arm may satisfy the same conditions as those in the case where n is one, the case where n is three, i.e., the case where the third rotation axis, the third arm, the fourth rotation axis, and the fourth arm may satisfy the same conditions as those in the case where n is one, the case where n is four, i.e., the case where the fourth rotation axis, the fourth arm, the fifth rotation axis, and the fifth arm may satisfy the same conditions as those in the case where n is one, or, the case where n is five, i.e., the case where the fifth rotation axis, the fifth arm, the sixth rotation axis, and the sixth arm may satisfy the same conditions as those in the case where n is one.

Further, in the above described third to tenth embodiments, the case where the robot system according to the invention is the inspection apparatus as an apparatus that may perform inspections of objects is explained as an example, however, the robot system according to the invention may be used as e.g. an assembly system in which the robot performs assembly of components.

The entire disclosures of Japanese Patent Application Nos. 2015-213927, filed Oct. 30, 2015 and 2015-215952, filed Nov. 2, 2015 are expressly incorporated by reference herein.

What is claimed is:

1. A robot comprising a robot arm having:
   a first arm rotatably engaged with a base to rotate about a first rotation axis;
   a second arm different from the at least one arm of the first arm, the second arm being rotatably engaged with the first arm to rotate about a second rotation axis;
   a third arm and a fourth arm different from the first arm and the second arm, the third arm and the fourth arm being rotatably engaged with the second arm to rotate about a third rotation axis; and
   a fifth arm and a sixth arm different from the arm, the second arm, and the third arm and the fourth arm, the fifth arm and the sixth arm being rotatably engaged with the third arm and the fourth arm to rotate about a fourth rotation axis,
   wherein the fifth arm and the sixth arm are rotatable about a fifth rotation axis in an axis direction different from an axis direction of the first rotation axis of the first arm with respect to the base,
   as seen from an axis direction of the second rotation axis of the second arm with respect to the first arm, the third arm and the second arm overlap the first arm, in a first state,
   as seen from the axis direction of the first rotation axis of the first arm with respect to the base, at least one of a distal end of the robot arm and an end effector provided on the distal end of the robot arm overlaps with the second arm in a second state while the second arm and the third arm remain overlapped with the first arm in the first state, and during the second state, the distal end of the robot arm, the end effector, or the distal end and the end effector overlap with the second arm by rotating the fifth arm.

2. The robot according to claim 1, wherein the fifth arm is rotatably provided on the fourth arm and the sixth arm is rotatably provided on the fifth arm, in the second state, the first rotation axis of the first arm and a sixth rotation axis of the sixth arm with respect to the fifth arm are orthogonal, and when the rotation axis of the first arm and the rotation axis of the sixth arm are orthogonal, a distance between the second arm and at least one of the sixth arm and the end effector is Y, and a relationship of 3 [mm]≤Y is satisfied.

3. The robot according to claim 2, wherein a relationship of 5 [mm]≤Y is satisfied.

4. The robot according to claim 2, wherein, letting a length of the third arm and the fourth arm in the axis direction of the rotation axis of the first arm be R3, a relationship of Y≤(R3/2) is satisfied.

5. The robot according to claim 1, wherein a length of the first arm in the axis direction of the rotation axis of the first arm is longer than a length of the second arm in the axis direction of the rotation axis of the first arm.

6. The robot according to claim 1, wherein a length of the third arm and the fourth arm in the axis direction of the rotation axis of the first arm is longer than a length of the second arm in the axis direction of the rotation axis of the first arm.

7. The robot according to claim 6, wherein the length of the third arm and the fourth arm is twice or more of the length of the second arm.

8. The robot according to claim 1, wherein the first arm has a first portion extending in a direction different from that of the rotation axis of the first arm, a second portion extending in a direction along the rotation axis of the first arm, and a third portion extending in a direction different from those of the first portion and the second portion.

9. The robot according to claim 1, wherein the robot arm has a concave opening or through-hole to which a plate member is attached.

10. The robot according to claim 1, wherein when seen from an axis direction of the second rotation axis of the second arm with respect to the first arm, the second arm and the third arm completely overlap the first arm in the first state.

11. The robot according to claim 1, wherein in the first state, the third arm and the fourth arm are closer to the first rotation axis than the second arm.

12. A robot comprising:

a first arm rotatable about a first rotation axis;

a second arm rotatable about a second rotation axis having an axis direction different from an axis direction of the first rotation axis;

a third arm rotatable about a third rotation axis having an axis direction parallel to the axis direction of the second rotation axis;

a fourth arm rotatable about a fourth rotation axis having an axis direction different from the axis direction of the third rotation axis;

a fifth arm rotatable about a fifth rotation axis having an axis direction different from the axis direction of the fourth rotation axis; and a sixth arm rotatable about a sixth rotation axis having an axis direction different from the axis direction of the fifth rotation axis, wherein when seen from the axis direction of the second rotation axis, the second arm and the third arm overlap the first arm in a first state, and as seen from the axis direction of the first rotation axis, at least one of a distal end of the sixth arm and an end effector provided on the distal end of the sixth arm overlaps with the second arm in a second state while the second arm and the third arm remain overlapped with the first arm in the first state, and during the second state, the distal end of the sixth arm, the end effector or the distal end and the end effector overlap with the second arm by rotating the fifth arm.

* * * * *